United States Patent
Wu et al.

(10) Patent No.: US 12,328,220 B2
(45) Date of Patent: Jun. 10, 2025

(54) VARIABLE-TO-FIXED DISTRIBUTION MATCHING FOR PROBABILISTIC CONSTELLATION SHAPING IN WIRELESS COMMUNICATIONS

(71) Applicant: QUALCOMM Incorporated, San Diego, CA (US)

(72) Inventors: Liangming Wu, Beijing (CN); Kexin Xiao, Shanghai (CN); Changlong Xu, Beijing (CN); Wei Liu, Beijing (CN); Hao Xu, Beijing (CN); Thomas Joseph Richardson, South Orange, NJ (US); Ori Shental, Marlboro, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 18/557,037

(22) PCT Filed: Jun. 16, 2021

(86) PCT No.: PCT/CN2021/100257
§ 371 (c)(1),
(2) Date: Oct. 24, 2023

(87) PCT Pub. No.: WO2022/261845
PCT Pub. Date: Dec. 22, 2022

(65) Prior Publication Data
US 2024/0214256 A1    Jun. 27, 2024

(51) Int. Cl.
*H04L 27/36* (2006.01)
*H04L 1/00* (2006.01)
*H04L 27/34* (2006.01)

(52) U.S. Cl.
CPC ......... *H04L 27/362* (2013.01); *H04L 1/0058* (2013.01); *H04L 27/3411* (2013.01)

(58) Field of Classification Search
CPC ... H04L 27/362; H04L 1/0058; H04L 27/3411
See application file for complete search history.

(56) References Cited

U.S. PATENT DOCUMENTS 10,516,503 B1 * 12/2019 Millar .................. H04L 1/0048
10,742,472 B1    8/2020 Van Nee
(Continued)

FOREIGN PATENT DOCUMENTS

WO    WO-2019034780 A1 *  2/2019 .......... H04L 1/0042
WO    WO-2020108771 A1    6/2020

OTHER PUBLICATIONS

Cho J., "Prefix-Free Code Distribution Matching for Probabilistic Constellation Shaping", arxiv.org, Cornell University Library, 201 Olin Library Cornell University Ithaca, NY 14853, Oct. 4, 2018 (Oct. 4, 2018), XP081057702, "Introduction", p. 1, pp. 1-13.
(Continued)

*Primary Examiner* — Freshteh N Aghdam
(74) *Attorney, Agent, or Firm* — Holland & Hart LLP/Qualcomm Incorporated

(57) ABSTRACT

Methods, systems, and devices for wireless communications are described. A transmitting device may perform distribution matching on at least a first subset of a set of bits, such as the bits of transport block. The distribution matching may include a variable-to-fixed (v2f) distribution matching procedure in which a ratio between a quantity of input bits to output interim symbols for the v2f distribution matching procedure is variable. The distribution matching include evaluating, after each instance of the v2f distribution matching procedure, whether additional bits remain for distribution matching, and if so, whether to perform an additional instance of the v2f distribution matching procedure or an alternative distribution matching procedure on the remaining bits. Corresponding techniques for a receiving device are
(Continued)

also described, including distribution dematching techniques based on a v2f distribution dematching procedure.

30 Claims, 20 Drawing Sheets

(56) References Cited

U.S. PATENT DOCUMENTS

| | | | |
|---|---|---|---|
| 10,826,648 B2* | 11/2020 | Böcherer | ............... H03M 7/40 |
| 11,012,187 B1 | 5/2021 | Kim et al. | |
| 2025/0055510 A1* | 2/2025 | Yang | ................... H04L 1/0003 |

OTHER PUBLICATIONS

International Search Report and Written Opinion—PCT/CN2021/100257—ISA/EPO—Dec. 6, 2021.
International Search Report and Written Opinion—PCT/CN2021/100268—ISA/EPO—Nov. 30, 2021.

* cited by examiner

VARIABLE-TO-FIXED DISTRIBUTION MATCHING FOR PROBABILISTIC CONSTELLATION SHAPING IN WIRELESS COMMUNICATIONS

CROSS REFERENCE

The present application is a 371 national stage filing of International PCT Application No. PCT/CN2021/100257 by WU et al. entitled "VARIABLE-TO-FIXED DISTRIBUTION MATCHING FOR PROBABILISTIC CONSTELLATION SHAPING IN WIRELESS COMMUNICATIONS," filed Jun. 16, 2021, which is assigned to the assignee hereof, and which is expressly incorporated by reference in its entirety herein.

FIELD OF TECHNOLOGY

The following relates to wireless communications, including variable-to-fixed (v2f) distribution matching for probabilistic constellation shaping (PCS) in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support variable-to-fixed (v2f) distribution matching for probabilistic constellation shaping (PCS) in wireless communications. Generally, the described techniques provide for a transmitting device to take an iterative approach to distribution matching. For example, the transmitting device may perform a v2f distribution matching procedure on at least a first portion of a set of bits (e.g., bits of a transport block (TB)) to obtain a first length-n output sequence, then determine whether to perform an additional distribution matching procedure based on whether any of the set of bits remain for distribution matching. If the transmitting device determines to perform an additional distribution matching procedure (e.g., because some of the set of bits remain for distribution matching), the transmitting device may select between the v2f distribution matching procedure and an alternative distribution matching procedure. For example, the selection may be based on whether the quantity of remaining bits satisfies a condition (e.g., an overflow condition). The transmitting device may then perform the selected distribution matching procedure on at least a second portion of the set of bits (e.g., on at least a portion of the bits remaining after the initial v2f distribution matching procedure).

The transmitting device may continue performing distribution matching procedures on some or all of any remaining bits, selecting each additional distribution matching procedure similarly (based on evaluating, after each additional distribution matching procedure, whether an updated quantity of remaining bits for distribution matching satisfies the same condition), until all bits of the set of bits have been subjected to distribution matching via either the v2f distribution matching procedure or the alternative distribution matching procedure. In some cases, the transmitting device may transmit symbols representative of the TB to the receiving device after performing the distribution matching.

A method for wireless communications at a transmitting device is described. The method may include identifying a set of bits corresponding to a TB for communication to a receiving device, performing a first type of distribution matching on a first bit group within the set of bits to obtain a first sequence of interim symbols, where the first type of distribution matching is based on a first non-uniform probability distribution and is associated with a variable ratio of input bits to interim symbols, determining, based on performing the first type of distribution matching on the first bit group, a quantity of remaining bits for distribution matching, the quantity of remaining bits included in the set of bits, selecting, based on the quantity of remaining bits, a type of distribution matching from among at least the first type of distribution matching and a second type of distribution matching, where the second type of distribution matching is based on a second probability distribution and is associated with a fixed ratio of input bits to interim symbols, performing the selected type of distribution matching on a second bit group within the set of bits to obtain a second sequence of interim symbols, and transmitting symbols representative of the TB to the receiving device, where the symbols are based on the first sequence of interim symbols and the second sequence of interim symbols.

An apparatus for wireless communications at a transmitting device is described. The apparatus may include a processor, memory coupled with the processor, and instructions stored in the memory. The instructions may be executable by the processor to cause the apparatus to identify a set of bits corresponding to a TB for communication to a receiving device, perform a first type of distribution matching on a first bit group within the set of bits to obtain a first sequence of interim symbols, where the first type of distribution matching is based on a first non-uniform probability distribution and is associated with a variable ratio of input bits to interim symbols, determine, based on performing the first type of distribution matching on the first bit group, a quantity of remaining bits for distribution matching, the quantity of remaining bits included in the set of bits, select, based on the quantity of remaining bits, a type of distribution matching from among at least the first type of distribution matching and a second type of distribution matching, where the second type of distribution matching is based on a second probability distribution and is associated with a fixed ratio of input bits to interim symbols, perform the selected type of distribution matching on a second bit group within the set of bits to obtain a second sequence of interim symbols, and transmit symbols representative of the TB to the receiving device, where the symbols are based on the first sequence of interim symbols and the second sequence of interim symbols.

Another apparatus for wireless communications at a transmitting device is described. The apparatus may include means for identifying a set of bits corresponding to a TB for communication to a receiving device, means for performing a first type of distribution matching on a first bit group within the set of bits to obtain a first sequence of interim symbols, where the first type of distribution matching is based on a first non-uniform probability distribution and is associated with a variable ratio of input bits to interim symbols, means for determining, based on performing the first type of distribution matching on the first bit group, a quantity of remaining bits for distribution matching, the quantity of remaining bits included in the set of bits, means for selecting, based on the quantity of remaining bits, a type of distribution matching from among at least the first type of distribution matching and a second type of distribution matching, where the second type of distribution matching is based on a second probability distribution and is associated with a fixed ratio of input bits to interim symbols, means for performing the selected type of distribution matching on a second bit group within the set of bits to obtain a second sequence of interim symbols, and means for transmitting symbols representative of the TB to the receiving device, where the symbols are based on the first sequence of interim symbols and the second sequence of interim symbols.

A non-transitory computer-readable medium storing code for wireless communications at a transmitting device is described. The code may include instructions executable by a processor to identify a set of bits corresponding to a TB for communication to a receiving device, perform a first type of distribution matching on a first bit group within the set of bits to obtain a first sequence of interim symbols, where the first type of distribution matching is based on a first non-uniform probability distribution and is associated with a variable ratio of input bits to interim symbols, determine, based on performing the first type of distribution matching on the first bit group, a quantity of remaining bits for distribution matching, the quantity of remaining bits included in the set of bits, select, based on the quantity of remaining bits, a type of distribution matching from among at least the first type of distribution matching and a second type of distribution matching, where the second type of distribution matching is based on a second probability distribution and is associated with a fixed ratio of input bits to interim symbols, perform the selected type of distribution matching on a second bit group within the set of bits to obtain a second sequence of interim symbols, and transmit symbols representative of the TB to the receiving device, where the symbols are based on the first sequence of interim symbols and the second sequence of interim symbols.

Some examples of the method, apparatuses, and non-transitory computer-readable medium described herein may further include operations, features, means, or instructions for performing one or more additional distribution matching procedures on respective additional bit groups within the set of bits to obtain additional sequences of interim symbols and selecting each of the one or more additional distribution matching procedures based on a respective quantity of remaining bits for distribution matching, where selecting each of the one or more additional distribution matching procedures may be from among at least the first type of distribution matching and the second type of distribution matching.

In some examples of the method, apparatuses, and non-transitory computer-readable medium described herein, selecting the type of distribution matching may include operations, features, means, or instructions for determining whether a condition may be satisfied, the condition based on the quantity of remaining bits, a minimum quantity of input bits associated with the first type of distribution matching, a difference between a quantity of interim symbols obtained after performing the first type of distribution matching and a target quantity of interim symbols, a quantity of interim symbols associated with one iteration of the first type of distribution matching, a modulation order of the interim symbols, or any combination thereof.

Some examples of the method, apparatuses, and non-transitory computer-readable medium described herein may further include operations, features, means, or instructions for determining, after performing the selected type of distribution matching, that a quantity of interim symbols in a set of interim symbols may be less than a target quantity of interim symbols, the set of interim symbols including the first sequence of interim symbols and the second sequence of interim symbols and adding one or more additional interim symbols to the set of interim symbols to satisfy the target quantity of interim symbols.

In some examples of the method, apparatuses, and non-transitory computer-readable medium described herein, each of the one or more additional interim symbols includes a respective instance of a first candidate symbol included in a pool of candidate interim symbols and the first candidate symbol may have a smaller amplitude than each other candidate symbol included in the pool of candidate interim symbols.

In some examples of the method, apparatuses, and non-transitory computer-readable medium described herein, the target quantity of interim symbols may be based on a quantity of resource elements used to transmit the symbols, a quantity of transmission layers used to transmit the symbols, a forward error correction coding rate, or any combination thereof.

Some examples of the method, apparatuses, and non-transitory computer-readable medium described herein may further include operations, features, means, or instructions for dividing the set of bits into a first subset of bits and a second subset of bits, the first subset of bits for distribution matching and including the first bit group and the second bit group, generating a bit sequence based on a sequence of interim symbols corresponding to the first subset of bits, the sequence of interim symbols including the first sequence of interim symbols and the second sequence of interim symbols, and mapping the bit sequence and the second subset of bits to the symbols based on a symbol constellation, where the symbol constellation may be based on amplitude and sign, and where the symbols may have amplitudes based on the bit sequence and signs based on the second subset of bits.

Some examples of the method, apparatuses, and non-transitory computer-readable medium described herein may further include operations, features, means, or instructions for dividing the bit sequence into a set of multiple first code block (CB) portions, dividing the second subset of bits into a set of multiple second CB portions, where a quantity of first CB portions in the set of multiple first CB portions may be equal to a quantity of second CB portions in the set of multiple second CB portions, and generating a set of CBs for the TB, where each CB of the set of CBs includes a respective first CB portion and a respective second CB portion.

Some examples of the method, apparatuses, and non-transitory computer-readable medium described herein may further include operations, features, means, or instructions for performing forward error correction encoding on each CB of the set of CBs to obtain a set of encoded CBs, where, each encoded CB of the set of encoded CBs includes a respective first set of systematic bits corresponding to the respective first CB portion of a corresponding CB, a respective second set of systematic bits corresponding to the respective second CB portion of the corresponding CB, a respective third set of systematic bits corresponding to an error detection code for the corresponding CB, and one or more respective parity bits, mapping the bit sequence and the second subset of bits to the set of symbols includes mapping each encoded CB of the set of encoded CBs to a respective subset of the symbols, symbols within the respective subset of the symbols having, amplitudes based on the respective first set of systematic bits for the corresponding encoded CB, and signs based on the respective second set of systematic bits for the corresponding encoded CB, the respective third set of systematic bits for the corresponding encoded CB, the one or more respective parity bits for the corresponding encoded CB, or any combination thereof.

Some examples of the method, apparatuses, and non-transitory computer-readable medium described herein may further include operations, features, means, or instructions for generating an error detection code for the TB before performing the first type of distribution matching, where the error detection code may be based on a portion of the set of bits, and where the error detection code may be included in the set of bits.

Some examples of the method, apparatuses, and non-transitory computer-readable medium described herein may further include operations, features, means, or instructions for generating an error detection code for the TB after performing the selected type of distribution matching, where the error detection code may be based on a bit sequence that corresponds to a sequence of interim symbols, the sequence of interim symbols including the first sequence of interim symbols and the second sequence of interim symbols.

In some examples of the method, apparatuses, and non-transitory computer-readable medium described herein, the symbols may have signs based on one or more bits included in the error detection code for the TB.

In some examples of the method, apparatuses, and non-transitory computer-readable medium described herein, a quantity of bits in the set of bits may be based on a quantity of resource elements used to transmit the symbols, a quantity of transmission layers used to transmit the symbols, a modulation order for the symbols, a forward error correction coding rate, an average coding rate associated with the first type of distribution matching and the second type of distribution matching, or any combination thereof.

In some examples of the method, apparatuses, and non-transitory computer-readable medium described herein, the second probability distribution includes a second non-uniform probability distribution.

In some examples of the method, apparatuses, and non-transitory computer-readable medium described herein, the second probability distribution includes a uniform probability distribution.

A method for wireless communications at a receiving device is described. The method may include receiving symbols corresponding to a TB, the TB corresponding to a set of bits, mapping the symbols to a bit sequence and a second subset of bits, converting the bit sequence to a sequence of interim symbols, performing a first type of distribution dematching on a first sequence of interim symbols within the sequence of interim symbols to obtain a first bit group, where the first type of distribution dematching is based on a first non-uniform probability distribution and is associated with a variable ratio of interim symbols to output bits, determining, based on performing the first type of distribution dematching on the first sequence of interim symbols, a quantity of remaining bits based on a difference between a target quantity of bits and a first quantity of bits within the first bit group, selecting, based on the quantity of remaining bits, a type of distribution dematching from among at least the first type of distribution dematching and a second type of distribution dematching, where the second type of distribution dematching is based on a second probability distribution and is associated with a fixed ratio of interim symbols to output bits, performing the selected type of distribution matching on a second sequence of interim symbols within the sequence of interim symbols to obtain a second bit group, and combining the first bit group and the second bit group with the second subset of bits to obtain at least a portion of the set of bits corresponding to the TB.

An apparatus for wireless communications at a receiving device is described. The apparatus may include a processor, memory coupled with the processor, and instructions stored in the memory. The instructions may be executable by the processor to cause the apparatus to receive symbols corresponding to a TB, the TB corresponding to a set of bits, map the symbols to a bit sequence and a second subset of bits, convert the bit sequence to a sequence of interim symbols, perform a first type of distribution dematching on a first sequence of interim symbols within the sequence of interim symbols to obtain a first bit group, where the first type of distribution dematching is based on a first non-uniform probability distribution and is associated with a variable ratio of interim symbols to output bits, determine, based on performing the first type of distribution dematching on the first sequence of interim symbols, a quantity of remaining bits based on a difference between a target quantity of bits and a first quantity of bits within the first bit group, select, based on the quantity of remaining bits, a type of distribution dematching from among at least the first type of distribution dematching and a second type of distribution dematching, where the second type of distribution dematching is based on a second probability distribution and is associated with a fixed ratio of interim symbols to output bits, perform the selected type of distribution matching on a second sequence of interim symbols within the sequence of interim symbols to obtain a second bit group, and combine the first bit group and the second bit group with the second subset of bits to obtain at least a portion of the set of bits corresponding to the TB.

Another apparatus for wireless communications at a receiving device is described. The apparatus may include means for receiving symbols corresponding to a TB, the TB corresponding to a set of bits, means for mapping the symbols to a bit sequence and a second subset of bits, means for converting the bit sequence to a sequence of interim symbols, means for performing a first type of distribution dematching on a first sequence of interim symbols within the sequence of interim symbols to obtain a first bit group, where the first type of distribution dematching is based on a first non-uniform probability distribution and is associated with a variable ratio of interim symbols to output bits, means for determining, based on performing the first type of distribution dematching on the first sequence of interim symbols, a quantity of remaining bits based on a difference between a target quantity of bits and a first quantity of bits within the first bit group, means for selecting, based on the quantity of remaining bits, a type of distribution dematching from among at least the first type of distribution dematching and a second type of distribution dematching, where the second type of distribution dematching is based on a second probability distribution and is associated with a fixed ratio of interim symbols to output bits, means for performing the selected type of distribution matching on a second sequence of interim symbols within the sequence of interim symbols to obtain a second bit group, and means for combining the first bit group and the second bit group with the second subset of bits to obtain at least a portion of the set of bits corresponding to the TB.

A non-transitory computer-readable medium storing code for wireless communications at a receiving device is described. The code may include instructions executable by a processor to receive symbols corresponding to a TB, the TB corresponding to a set of bits, map the symbols to a bit sequence and a second subset of bits, convert the bit sequence to a sequence of interim symbols, perform a first type of distribution dematching on a first sequence of interim symbols within the sequence of interim symbols to obtain a first bit group, where the first type of distribution dematching is based on a first non-uniform probability distribution and is associated with a variable ratio of interim symbols to output bits, determine, based on performing the first type of distribution dematching on the first sequence of interim symbols, a quantity of remaining bits based on a difference between a target quantity of bits and a first quantity of bits within the first bit group, select, based on the quantity of remaining bits, a type of distribution dematching from among at least the first type of distribution dematching and a second type of distribution dematching, where the second type of distribution dematching is based on a second probability distribution and is associated with a fixed ratio of interim symbols to output bits, perform the selected type of distribution matching on a second sequence of interim symbols within the sequence of interim symbols to obtain a second bit group, and combine the first bit group and the second bit group with the second subset of bits to obtain at least a portion of the set of bits corresponding to the TB.

Some examples of the method, apparatuses, and non-transitory computer-readable medium described herein may further include operations, features, means, or instructions for performing one or more additional distribution dematching procedures on one more additional sequences of interim symbols within the sequence of interim symbols to obtain one or more additional bit groups and selecting each of the one or more additional distribution dematching procedures based on a respective quantity of remaining bits, where selecting each of the one or more additional distribution dematching procedures may be from among at least the first type of distribution dematching and the second type of distribution dematching.

In some examples of the method, apparatuses, and non-transitory computer-readable medium described herein, selecting the type of distribution dematching may include operations, features, means, or instructions for determining whether a condition may be satisfied, the condition based on the quantity of remaining bits, a minimum quantity of output bits associated with the first type of distribution dematching, a difference between a quantity of interim symbols within the sequence of interim symbols and a quantity of interim symbols within the first sequence of interim symbols, a quantity of interim symbols associated with one iteration of the first type of distribution dematching, a modulation order of the sequence of interim symbols, or any combination thereof.

Some examples of the method, apparatuses, and non-transitory computer-readable medium described herein may further include operations, features, means, or instructions for determining, after performing the selected type of distribution matching, that a quantity of output bits in a set of output bits satisfies the target quantity of bits, the set of output bits including the first bit group and the second bit group and discarding one or more additional interim symbols within the sequence of interim symbols based on the quantity of output bits satisfying the target quantity of bits.

Some examples of the method, apparatuses, and non-transitory computer-readable medium described herein may further include operations, features, means, or instructions for combining the first bit group with the second bit group to obtain at least a portion of a first subset of bits, where, the first subset of bits may be within the set of bits and corresponds to the bit sequence, and combining the first bit group and the second bit group with the second subset of bits includes combining the first subset of bits with the second subset of bits based on a bit order for the set of bits.

In some examples of the method, apparatuses, and non-transitory computer-readable medium described herein, the mapping may be based on a symbol constellation that may be based on amplitude and sign and the symbols may have amplitudes based on the bit sequence and signs based on the second subset of bits.

Some examples of the method, apparatuses, and non-transitory computer-readable medium described herein may further include operations, features, means, or instructions for checking an error detection code for the TB after performing the selected type of distribution dematching, where the error detection code may be included in the set of bits.

Some examples of the method, apparatuses, and non-transitory computer-readable medium described herein may further include operations, features, means, or instructions for checking an error detection code for the TB before performing the first type of distribution dematching, where the symbols may have signs based on the error detection code for the TB.

In some examples of the method, apparatuses, and non-transitory computer-readable medium described herein, mapping the symbols to the bit sequence and the second subset of bits may include operations, features, means, or instructions for dividing the symbols into subsets of symbols each corresponding to a respective CB of a set of CBs for the TB and mapping each of the subsets of symbols to bits corresponding to the respective CB of the set of CBs, where each CB of the set of CBs includes a respective portion of the bit sequence and a respective portion of the second subset of bits.

Some examples of the method, apparatuses, and non-transitory computer-readable medium described herein may further include operations, features, means, or instructions for performing forward error correction decoding on each encoded CB of a set of encoded CBs to obtain the set of CBs, where and each encoded CB of the set of encoded CBs includes a respective first set of systematic bits corresponding to the respective first CB portion of a corresponding CB, a respective second set of systematic bits corresponding to the respective second CB portion of the corresponding CB, a respective third set of systematic bits corresponding to an error detection code for the corresponding CB, and one or more respective parity bits.

DETAILED DESCRIPTION

Figure 1:
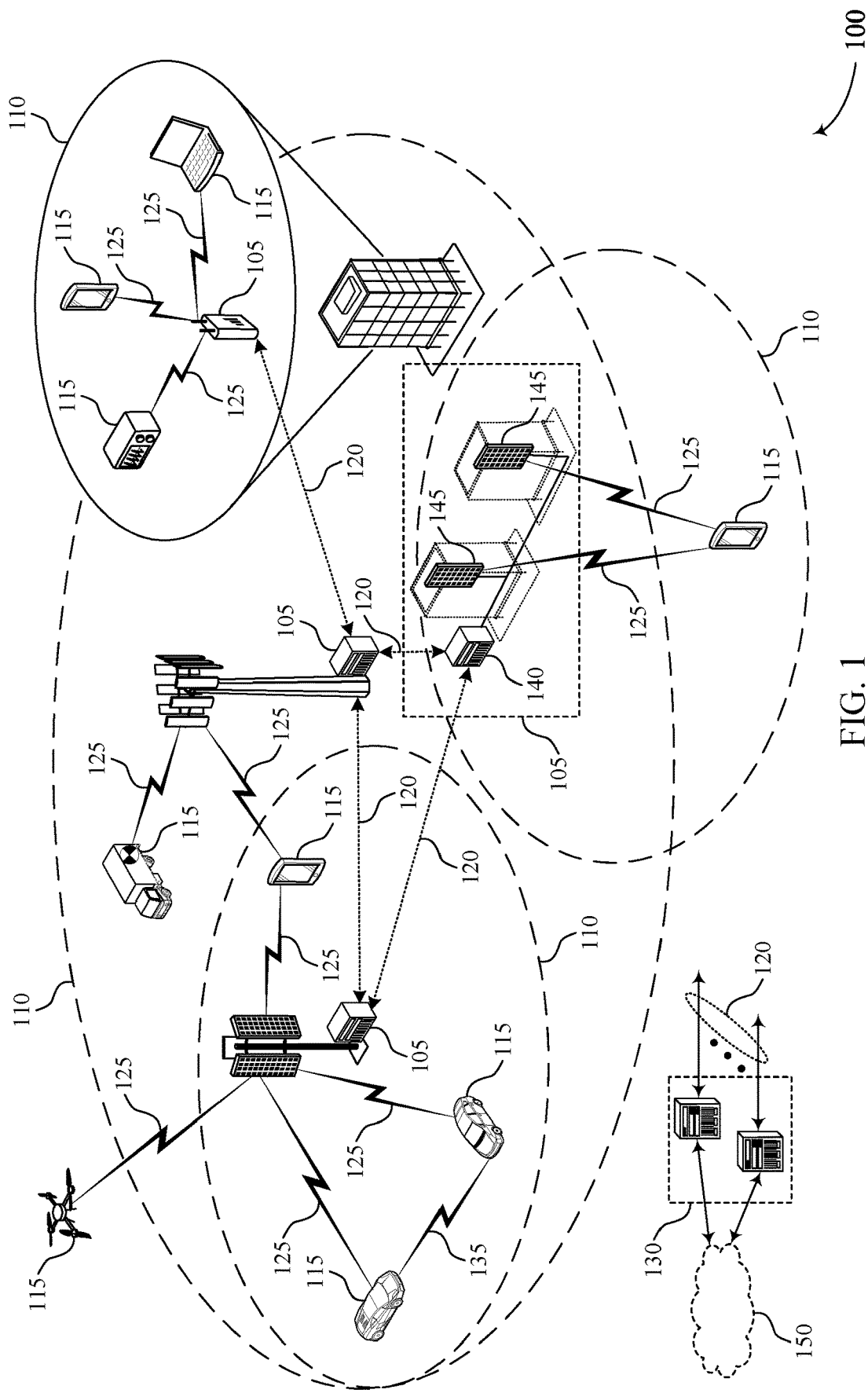
FIGS. 1 and 2 illustrate examples of wireless communications systems that support variable-to-fixed (v2f) distribution matching for probabilistic constellation shaping (PCS) in wireless communications in accordance with aspects of the present disclosure.

In some wireless communications systems, a transmitting device may perform probabilistic constellation shaping (PCS). PCS may involve mapping bits to modulation symbols (e.g., quadrature amplitude modulation (QAM) symbols) such that some modulation symbols of a symbol constellation may be more likely to be mapped to, and thus transmitted over the air, than others. For example, modulation symbols associated with lower amplitudes may be selected with greater likelihood (and thus more often over time or in connection with a given set of bits) than modulation symbols associated with lower amplitudes, which may provide power savings, improved spectral efficiency, or other benefits.

To support PCS, the transmitting device may perform distribution matching on a set of bits for which constellation mapping (e.g., the selection of corresponding modulation symbols from a symbol constellation) is to be performed. It may be assumed that, prior to distribution matching, the set of bits are uniformly (e.g., randomly) distributed, such that each individual bit may have an equal likelihood of being a 0 or a 1. Distribution matching may include converting the set of bits (e.g., k input bits) into a corresponding sequence of symbols (e.g., n symbols), where different symbols within a pool of possible symbols have different likelihoods of being included in the corresponding sequence of symbols—that is, the different possible symbols may have different associated probabilities of selection in accordance with a non-uniform probability distribution. For example, where different symbols correspond to different amplitudes (e.g., where the symbols are amplitude-shift keying (ASK) symbols), some amplitudes may be more likely to be included in the sequence than others based on the non-uniform probability distribution.

Thus, whereas an input set of k bits may be uniformly distributed, a corresponding sequence of n symbols obtained via distribution matching may be non-uniformly distributed, with some symbols more likely be to be included in the sequence of n symbols (e.g., appearing more often with the sequence) than others. A non-uniform sequence of symbols obtained via distribution matching may be converted to a corresponding bit sequence, and the corresponding bit sequence may be used for constellation mapping (e.g., mapping to the modulation symbols, such as QAM symbols, to achieve PCS). Symbols obtained via distribution matching may in some cases be referred to herein as interim symbols (e.g., as opposed to modulation symbols, which may be transmitted over the air). Similarly, at a receiving device, symbols subjected to distribution dematching (which may be an inverse process with respect to distribution matching) in order to obtain a corresponding bit sequence may in some cases be referred to herein as interim symbols.

For some distribution matching procedures, the ratio of input bits to output symbols (e.g., the ratio k:n) may be variable. For example, a distribution matching procedure may produce output symbol sequences each having a same fixed length (e.g., the value of n may be fixed), but different output symbol sequences may correspond to different quantities of input bits (e.g., the value of k may vary, depending on which particular symbols are included in a length-n symbol sequence output by the distribution matching procedure). Such distribution matching procedures may be referred to as variable-to-fixed (v2f) distribution matching procedures. The use of a v2f distribution matching procedure may introduce complexities, including when a transport block (TB) includes a fixed quantity of bits (e.g., though different TBs may be of different sizes, the quantity of bits corresponding to any one TB may be fixed or otherwise set to a particular value).

As described herein, a transmitting device may take an iterative approach to distribution matching (e.g., when employing v2f distribution matching). For example, the transmitting device may perform a v2f distribution matching procedure on at least a first portion of a set of bits (e.g., bits of a TB) to obtain a first length-n output sequence, then determine whether to perform an additional distribution matching procedure based on whether any of the set of bits remain for distribution matching. If the transmitting device determines to perform an additional distribution matching procedure (e.g., because some of the set of bits remain for distribution matching), the transmitting device may select between the v2f distribution matching procedure and an alternative distribution matching procedure. For example, the selection may be based on whether the quantity of remaining bits satisfies a condition (e.g., an overflow condition). The transmitting device may then perform the selected distribution matching procedure on at least a second portion of the set of bits (e.g., on at least a portion of the bits remaining after the initial v2f distribution matching procedure).

The transmitting device may continue performing distribution matching procedures on some or all of any remaining bits, selecting each additional distribution matching procedure similarly (based on evaluating, after each additional distribution matching procedure, whether an updated quantity of remaining bits for distribution matching satisfies the same condition), until all bits of the set of bits have been subjected to distribution matching via either the v2f distribution matching procedure or the alternative distribution matching procedure. In some cases, the transmitting device may transmit symbols representative of the TB to the receiving device after performing the distribution matching.

Aspects of the disclosure, including techniques for both transmitting devices and receiving devices, are initially described in the context of wireless communications systems. Aspects of the disclosure are further described in the context of encoding diagrams, resource diagrams, and process flows. Aspects of the disclosure are further illustrated by and described with reference to apparatus diagrams, system diagrams, and flowcharts that relate to v2f distribution matching for wireless communications.

FIG. 1 illustrates an example of a wireless communications system 100 that supports v2f distribution matching for PCS in wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications systems may employ distribution matching and PCS techniques as described herein. For example, transmitting and receiving devices may exchange information in the form of TBs, where a TB may refer to a payload passed from a MAC layer to a physical layer at a transmitting device or from a physical layer to a MAC layer at a receiving device. A transmitting device may encode a set of bits corresponding to (e.g., included in, assigned to) a TB using one or more distribution matchers prior to transmitting the TB (e.g., a set of modulation symbols representing the TB) to a receiving device using PCS. The receiving device may decode and otherwise process the TB using corresponding techniques (e.g., distribution dematching).

In some examples, a transmitting device may divide a set of bits of a TB into two subsets. A first subset of the TB bits may be subjected to distribution matching and may be used to determine the amplitudes of over-the-air modulation symbols. A second subset of the TB bits may not be subjected to distribution matching and may be used to determine the signs (e.g., phases) of the modulation symbols. The transmitting device may perform distribution matching on the first subset of bits to obtain a shaped bit sequence based on a non-uniform probability distribution. In some examples, the transmitting device may map the shaped bit sequence and the unshaped second subset of bits to modulation symbols based on a symbol constellation, where the non-uniform probability distribution associated with the distribution matching may influence which modulation symbols are mapped to (e.g., selected). The transmitting device may transmit signaling based on the selected modulation symbols, and therefore representative of the TB, to the receiving device.

For some distribution matching procedures, the ratio of input bits to output symbols (and hence the length of a resulting bit sequence, as the output symbols may then be converted to a bit sequence) may be variable. For example, a distribution matching procedure may produce output symbol sequences each having a same fixed length, but different output symbol sequences may correspond to different quantities of input bits (e.g., depending on which particular output symbols are included in a given output symbol sequence, a different number of input bits may be accepted as inputs for the corresponding distribution matching procedure). Such distribution matching procedures may be referred to as v2f distribution matching procedures. The use of a v2f distribution matching procedure may introduce complexities, including when an individual TB may be of a fixed size (e.g., may include a set quantity of bits).

As described herein, a transmitting device may take an iterative approach to distribution matching. For example, the transmitting device may perform a v2f distribution matching procedure on a first portion of the first subset of bits (the first subset of the TB, where the first subset is to be subjected to distribution matching) to obtain a first length-n output sequence, then determine whether to perform an additional distribution matching procedure based on whether any of the first subset of bits remain for distribution matching (e.g., based on whether the value of k corresponding to the first length-n output sequence was less than the total quantity of bits within the first subset of TB bits). If the transmitting device determines to perform an additional distribution matching procedure, the transmitting device may select between the v2f distribution matching procedure and an alternative distribution matching procedure, with the selecting based on whether the quantity of remaining bits satisfies a particular condition (e.g., an overflow condition). The transmitting device may then perform the selected distribution matching procedure on at least a second portion of the first subset of bits. The transmitting device may continue performing distribution matching procedures as necessary, selecting each additional distribution matching procedure based on the same condition, until all bits of the first subset of bits have been subjected to distribution matching via either the v2f distribution matching procedure or the alternative distribution matching procedure.

Figure 2:
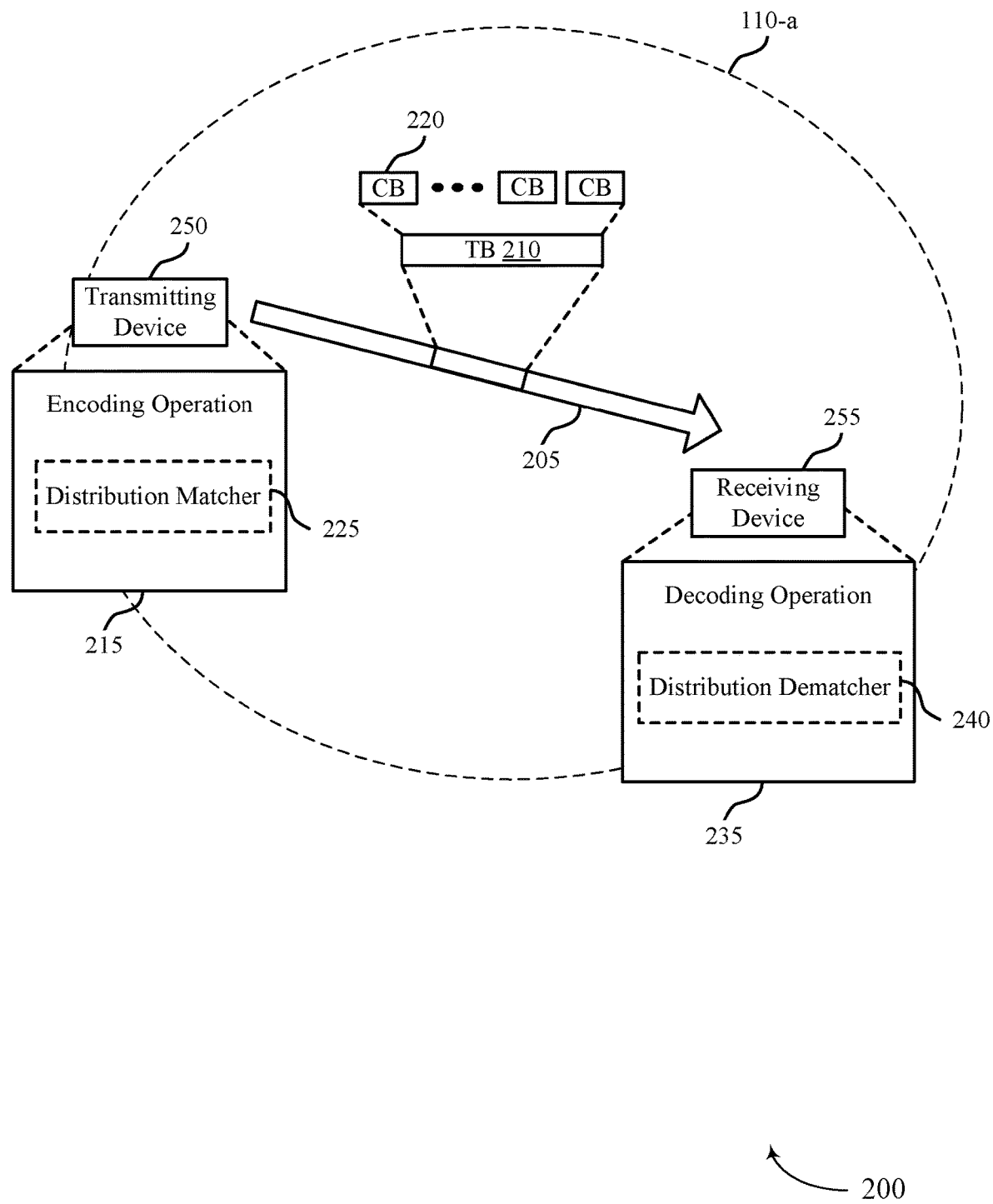

FIG. 2 illustrates an example of a wireless communications system 200 that supports v2f distribution matching for PCS in wireless communications in accordance with aspects of the present disclosure. In some examples, the wireless communications system 200 may implement aspects of wireless communications system 100. The wireless communications system 200 may include a transmitting device 250, which may be an example of a base station 105, UE 115, or any other device capable of transmitting wireless signals (e.g., as described with reference to FIG. 1). The wireless communications system 200 may also include a receiving device 255, which may be an example of a base station 105, UE 115, or any other device capable of receiving wireless signals (e.g., as described with reference to FIG. 1).

In some examples, a transmitting device 250 may communicate information to a receiving device, such as UE 115-a, via a communication link 205, which may be an example of a communication link 125 as described with reference to FIG. 1. For example, the transmitting device 250 may process bits of a TB 210 to obtain a corresponding set of modulation symbols, and transmitting device 250 may transmit, via the communication link 205, signaling that is based on (e.g., includes or is otherwise modulated based on) the set of modulation symbols, in order to communicate the TB 210 to the receiving device 255.

In some examples, a transmitting device 250 may perform an encoding operation 215 on a TB 210. For example, the transmitting device 250 may encode the set of bits corresponding to a TB 210 in order to obtain a set of modulation symbols (e.g., QAM symbols) representative of the TB 210, and the transmitting device 250 may transmit the TB 210 to a receiving device 255 by transmitting the corresponding set of modulation symbols. In some examples, the encoding operation 215 may include several stages, such as attaching one or more CRC bits to the set of bits, encoding (e.g., low-density parity-check code (LDPC) encoding, forward error correction or other channel coding, or any combination thereof) as described in more detail with reference to FIG. 3 and FIG. 4, and constellation mapping (e.g., mapping bits or groups of bits to corresponding modulation symbols), among other possible stages.

A transmitting device 250 may modulate a transmission according to a modulation format to represent the information conveyed by the transmission. For example, OFDM modulation may be based on modulating various subcarriers (e.g., using QAM modulation) and transmitting the modulated subcarriers in parallel (e.g., concurrent) using FDM techniques. Regardless of the specific modulation format used, modulation symbols corresponding to a TB 210 may be obtained and transmitted by the transmitting device 250 to convey the information represented by the bits of the TB 210. In some examples, modulation symbols may refer to symbols based on any type of modulation, such as QAM symbols, binary phase shift keying (BPSK) symbols, quadrature phase shift keying (QPSK) symbols, amplitude and phase shift keying (APSK) symbols, or the like.

In some cases, the transmitting device 250 may implement PCS, which may provide advantages when compared with other unshaped modulation types. For example, when unshaped modulation is used, each modulation symbol of a corresponding symbol constellation may be equally likely to be used and hence, over time, may be used equally often. Unshaped modulation may be described as based on a uniform probability distribution, as the probability of use is uniform across the different symbols of the symbol constellation. When PCS is used, however, different modulation symbols of a corresponding symbol constellation may have different probabilities of use-hence, the probability of use may be non-uniform across the different symbols of the symbol constellation. PCS may improve spectral efficiency and allow communications to more closely approach the Shannon capacity (e.g., a theoretical maximum amount of information or data capacity that can be sent over a channel or medium). Additionally or alternatively, PCS may improve power consumption—for example, modulation symbols with smaller amplitudes may be used more frequently than modulation symbols with larger amplitudes.

The transmitting device 250 may identify a set of source information bits, which may be a set of bits corresponding to (e.g., included in or otherwise represented by) the TB 210. The transmitting device 250 may divide the set of source information into a first subset of bits, upon which distribution matching may be performed, and a second subset of bits, upon which distribution matching may not be performed. The first subset of bits may be processed by the transmitting device 250 to obtain a corresponding set of shaped (e.g., distribution matched) bits, and the transmitting device 250 may perform constellation mapping such that the amplitudes of modulation symbols sent via communication link 205 for the TB 210 are based on the shaped bits, and the signs of the modulation symbols sent via communication link 205 for the TB 210 are based on the unshaped second subset of bits.

In some examples, the transmitting device 250 may implement a distribution matcher 225 to perform distribution matching (e.g., as part of the encoding operation 215). The distribution matcher 225 may perform any quantity of distribution matching procedures, each of which may accept as an input a uniformly distributed bit sequence with length n and output a symbol sequence of length k with a non-uniform probability distribution, as described in further detail with respect to FIG. 3, for example. The non-uniform probability distribution may be, for example, a probability mass function (PMF). In some examples, the rate loss of a message sent via communication link 205 may vary as a function of k/n. Thus, for a given probability distribution, the rate loss may decrease with an increase of n. However, the encoding and decoding complexity and latency may increase with the increase of n. In some cases, a transmitting device 250 may divide a set of bits for distribution matching (e.g., the first subset of the TB 210 bits) into multiple bit groups and perform separate distribution matching procedures on the different bit groups (e.g., the distribution matcher 225 may perform multiple distribution matching procedures as part of processing a single TB 210), which may be advantageous in view of such tradeoffs.

The transmitting device 250 may generate a CRC for the TB 210 (which may be referred to as a TB CRC), and there may be multiple options for the processing stage at which the transmitting device generates and attaches the TB CRC (e.g., as part of the encoding operation 215). For example, the transmitting device 250 may generate and attach the TB CRC prior to distribution matching or after distribution matching. If the transmitting device 250 generates and attaches the TB CRC prior to distribution matching, then the receiving device 255 may perform distribution matching prior to checking the TB CRC. And if the transmitting device 250 generates and attaches the TB CRC prior to distribution matching, then the receiving device 255 may perform distribution matching prior to checking the TB CRC.

In some examples, the transmitting device 250 may transmit the TB 210 by transmitting a corresponding set of CBs 220, each which may correspond to a portion of the TB 210. In some cases, a first portion of each CB 220 may be based on a corresponding portion of the shaped bits of the TB 210, and a second portion of each CB 220 may be based on a corresponding portion of the unshaped bits of the TB 210. The quantity of CBs 220 may be equal to the quantity of bit groups into which the first subset of bits is divided for distribution matching purposes (e.g., the quantity of CBs 220 for the TB 210 may be equal to the quantity of distribution matching procedures performed for the TB 210). Alternatively, the quantity of CBs 220 may be greater than or less than the quantity of bit groups into which the first subset of bits is divided for distribution matching purposes (e.g., the quantity of CBs 220 for the TB 210 may be greater than or less than the quantity of distribution matching procedures performed for the TB 210).

In some cases, a distribution matcher 225 may perform a fixed-to-fixed (121) distribution matching procedure, in which the values of k and n are both fixed (e.g., each input set of bits includes a same quantity of bits, and each output set of interim symbols includes a same quantity of output symbols). In other cases, a distribution matcher 225 may perform a variable-to-fixed (v2f) distribution matching procedure, in which the value of n is fixed, but the value of k is variable (e.g., each output set of interim symbols includes a same quantity of output symbols, but the quantity of input bits upon which an output set of interim symbols is based may be variable). Thus, the quantity of bits that a v2f distribution matching procedure handles (e.g., processes) may vary from one instance of the v2f distribution matching procedure to another—e.g., the value of k may depend on which particular interim symbols are included in an output sequence of n interim symbols. For a single TB 210, a distribution matcher 225 may perform one or more f2f distribution matching procedures, one or more v2f distribution matching procedures, or any combination thereof.

The transmitting device 250 may transmit the modulation symbols corresponding to the TB 210 over communication link 205, and the receiving device 255 may thereby receive the modulation symbols corresponding to the TB 210. The receiving device 255 perform a decoding operation 235 to process the TB 210 (e.g., to obtain the bits of the TB 210 based on the corresponding modulation symbols). The decoding operation 235 performed by the receiving device 255 may be an inverse of the encoding operation 215 performed by the transmitting device 250. For example, the decoding operation 235 may include one or more distribution dematching procedures. A distribution dematching procedure may accept an input sequence of interim symbols (e.g., n interim symbols) and output a corresponding set of bits (e.g., k bits). To perform distribution dematching, the receiving device 255 may include any quantity of distribution dematchers 240, which may be f2f, v2f, or any combination thereof. An f2f distribution dematcher 240 may accept a fixed quantity of interim symbols as an input sequence (e.g., n may be fixed) and may output a corresponding set of bits, where the quantity of bits in the corresponding set of bits is also fixed (e.g., k may be fixed). A v2f distribution dematcher 240 may accept a fixed quantity of interim symbols as an input sequence (e.g., n may be fixed) and may output a corresponding set of bits, where the quantity of bits in the corresponding set of bits is variable (e.g., k may be variable), with the quantity of bits in the corresponding set of bits depending on the particular interim symbols included in the input sequence of interim symbols.

The transmitting device 250 may determine a size of the TB 210 (e.g., a quantity of bits included in the TB 210) based on one or more factors. For example, the transmitting device 250 may determine a size of the TB 210 based on a quantity of resource elements to which the TB 210 may be mapped, a quantity of transmission layers (e.g., MIMO layers) via which the TB 210 may be transmitted, a modulation and coding scheme for transmitting the TB 210 (e.g., a modulation order of the modulation symbols for transmitting the TB 210, a coding rate-such as a forward error correcting (FEC) or other channel coding rate for transmitting the TB 210), a rate associated with the distribution matching for the TB 210 (e.g., a ratio of k:n for each of the one or more distribution matching procedures performed by the distribution matcher 225), or any combination thereof. In examples in which one or more v2f distribution matching procedures are performed, an average (e.g., long-term average) rate associated with the distribution matching may be used to determine the size of the TB 210.

In some cases, a transmitting device 250 may determine the total quantity of shaped bits for a TB 210 (e.g., quantity of bits in the first subset of TB bits that are identified upon which distribution matching is performed) and additionally or alternatively a total quantity of interim symbols for the TB 210 based on the quantity of resource elements to which the TB 210 may be mapped, the quantity of transmission layers via which the TB 210 may be transmitted, the modulation order of the modulation symbols for transmitting the TB 210, or any combination thereof. Additionally or alternatively, a transmitting device 250 may determine the total quantity of unshaped bits for a TB 210 (e.g., quantity of bits in the second subset of TB bits upon which distribution matching is not performed) based on the quantity of resource elements to which the TB 210 may be mapped, the quantity of transmission layers via which the TB 210 may be transmitted, the modulation order of the modulation symbols for transmitting the TB 210, the coding rate (e.g., an FEC or other channel coding rate) for transmitting the TB 210, or any combination thereof.

The receiving device 255 may determine (e.g., calculate) the size of the TB 210, the total quantity of shaped bits, total quantity of interim symbols, and total quantity of unshaped bits for the TB 210 in the same manner as the transmitting device 250—e.g., based on the same factors, which may be separately communicated to the receiving device 255 (e.g., via higher-layer signaling) or otherwise known to the receiving device 255 (e.g., based on being specified in one or more communication standards or otherwise preconfigured).

In some examples, if the transmitting device and receiving device support the use of multiple distribution or dematching procedures per TB 210, a maximum quantity of input or output bits per distribution matching or dematching procedure (e.g., a maximum value of k), a maximum quantity of interim symbols per distribution matching or dematching procedure (e.g., a maximum value of n), or both, may be defined. The maximum quantity of input or output bits per distribution matching or dematching procedure may be referred to as $D_{MAX}$. The maximum quantity of interim symbols per distribution matching or dematching procedure may be referred to as $N_{MAX}$. In some cases, $D_{MAX}$, $N_{MAX}$, or both may be configured by a base station 105 and communicated to a UE 115 (e.g., via RRC or other higher-layer signaling).

If $D_{MAX}$ is defined, the quantity of distribution matching or dematching procedures performed for a TB 210 may be calculated according to Equation 2:

$$D = \lceil N_{AMP}/D_{MAX} \rceil,$$

where D is the quantity of distribution matching or dematching procedures performed for the TB 210, and where $N_{AMP}$ is the total quantity of amplitude bits for the TB 210 (e.g., a quantity of bits in the first subset of the TB bits upon which distribution matching is to be performed).

If $N_{MAX}$ is defined the quantity of distribution matching or dematching procedures performed for a TB 210 may be calculated according to Equation 3:

$$D = \lceil 2N_{RE}/N_{MAX} \rceil,$$

where D is the quantity of distribution matching or dematching procedures performed for the TB 210, and where $N_{RE}$ is the quantity of resource elements to which the TB 210 is to be mapped. Multiplying by 2 or some other factor may relate to a translation between the modulation symbols (e.g., as mapped to resource elements) and interim symbols, such as a translation between respective quantities of dimensions associated with the two types of symbols (e.g., translating between wo-dimensional QAM symbols, which may have both an in-phase and quadrature component and hence be considered two-dimensional, and ASK symbols, which may be considered one-dimensional). Additionally or alternatively, in some cases, the total quantity of modulation symbols for a TB 210 may be equal to $2N_{RE} \times v$, where v is the quantity of spatial layers used to transmit the TB 210, and hence in some cases the numerator of Equation 3 above may further include a multiplication by v.

Figure 3:
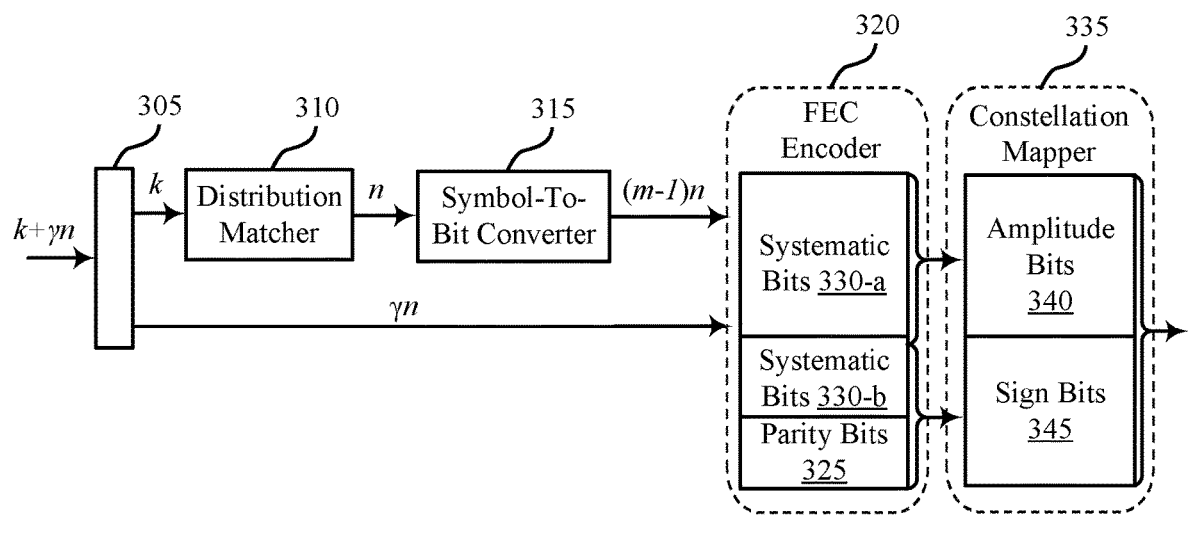
FIGS. 3 and 4 illustrate examples of encoding processes that support v2f distribution matching for PCS in wireless communications in accordance with aspects of the present disclosure.

FIG. 3 illustrates an example of an encoding process 300 that supports v2f distribution matching for PCS in wireless communications in accordance with aspects of the present disclosure. In some examples, encoding process 300 may be implemented by aspects of wireless communications system 100 and wireless communications system 200. For example, a transmitting device (e.g., a transmitting device 250) may encode a message for transmission to a receiving device (e.g., a receiving device 260) using PCS according to encoding process 300. In some examples, the receiving device may perform a decoding operation comprising inverse operations corresponding to the operations of encoding process 300. Encoding process 300 may include aspects of an encoding operation 215.

In some examples, a transmitting device may encode a set of bits (e.g., a TB or a CB), then transmit corresponding modulation symbols to a receiving device. The quantity of bits included in the set of bits may be represented as k+γn, where k may represent the quantity of bits within a first subset of the bits and γn may represent the quantity of bits within a second subset of the bits. The k bits in the first subset may be subjected to distribution matching (e.g., may be referred to as shaped bits, or alternatively referred to as amplitude bits), and the yn bits in the second subset may not be subjected to distribution matching (e.g., may be referred to as unshaped bits, or alternatively referred to as sign bits).

The transmitting device may input the k bits of the first subset to a distribution matcher 310, which may be an example of a distribution matcher 225 as described with reference to FIG. 2. The distribution matcher 310 may be a constant-composition distribution matcher (CCDM), a multiset-partition distribution matcher (MPDM), or may use sphere shaping, among other possible distribution matching techniques. The distribution matcher 310 may transform k input bits into n intermediate or interim symbols. For example, sequences within the k input bits may each be mapped to one or more corresponding interim symbols within the n-length sequence of interim symbols. Thus, in some cases, each interim symbol may represent multiple input bits. Based on a non-uniform probability distribution associated with (e.g., used by) the distribution matcher 310, different interim symbols within a pool of possible (e.g., candidate) interim symbols may not be equally likely to be included in the n-length sequence of interim symbols—that is, some interim symbols may be more likely to be included than others. In some cases, the interim symbols may be ASK symbols.

The transmitting device may input the n interim symbols into a symbol-to-bit converter 315. The symbol-to-bit converter 315 may convert the interim symbols into bits. In some cases, because the interim symbols are non-uniformly distributed, the bits output by the symbol-to-bit converter 315 may not be the same as the bits input to the distribution matcher 310. For example, the symbol-to-bit converter 315 may output a bit sequence that includes quantity (m−1)n of bits, where m is a modulation order of the interim symbols (e.g., the quantity of different interim symbols within the pool of possible interim symbols may be equal to $2^m$).

In some examples, the transmitting device may input the (m−1)n-length bit sequence output by the symbol-to-bit converter 315 and the yn unshaped bits to an FEC encoder 320. The FEC encoder 320 may support error correction for the subsequent transmission based on encoding redundancy into the transmission. Based on the bits input to the FEC encoder 320, the FEC encoder 320 may generate systematic bits 330 and parity bits 325. For example, for every (m−1+γ) input bits, the FEC encoder 320 may generate m bits, where the extra bits may be parity bits 325. Thus, in some examples, the rate of encoding at the FEC encoder 320 may be calculated based on Equation 1:

$$Rate_{FEC} = \frac{m-1+\gamma}{m}.$$

In some cases, the transmitting device may determine γ based on the $Rate_{FEC}$.

In some examples, at 335, the transmitting device may input the bits output from the FEC encoder 320 to a constellation mapper 335, which may perform constellation mapping (e.g., map the bits input to the constellation mapper 335 to corresponding modulation symbols, based on a symbol constellation associated with the modulation symbols). A subset of the bits input to the constellation mapper 335 may be used to determine the amplitudes of the mapped-to modulation symbols, and these bits may be referred to as amplitude bits 340. Another subset of the bits input to the constellation mapper 335 may be used to determine the signs (e.g., polarities, phases, or both) of the mapped-to modulation symbols, and these bits may be referred to as sign bits 345. The amplitude bits 340 may include a first set of systematic bits 330-a, which may correspond to the shaped bits (bit sequence) output by the symbol-to-bit converter 315 and thus the k bits subjected to distribution matching. The sign bits 345 may include a second set of systematic bits 330-b, which may correspond to the unshaped γn bits, along with the parity bits 325. The γn bits and the parity bits 325 may be unshaped and thus uniformly distributed (e.g., each such bit may be equally likely to be a 1 or a 0).

Because a portion of the bits input to the constellation mapper 335 have been shaped, different modulation symbols within the symbol constellation used by the constellation mapper 335 may have different likelihoods of being mapped to and transmitted over the air, and thus PCS may be implemented. For example, because the amplitude bits 340 are based on the kbits subjected to distribution matching by the distribution matcher 310, the likelihood of a modulation symbol being mapped to may depend on the amplitude of the modulation symbol (e.g., lower amplitude modulation symbols, which may be nearer to a center of the symbol constellation, may be more likely to be mapped to than higher amplitude modulation symbols, which may be further from the center of the symbols constellation). In some case, the transmitting device may multiply the amplitude bits 340 with the sign bits 345 and map the resulting products to the modulation symbols.

Figure 4:
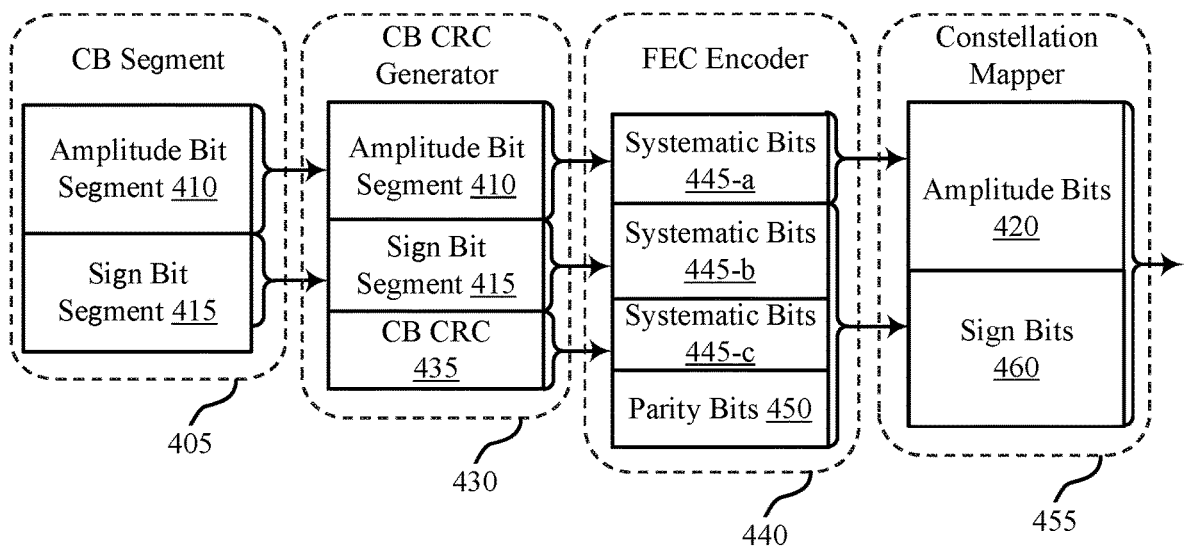

FIG. 4 illustrates an example of an encoding process 400 that supports v2f distribution matching for PCS in wireless communications in accordance with aspects of the present disclosure. In some examples, encoding process 400 may be implemented by aspects of wireless communications system 100 or wireless communications system 200. For example, a transmitting device (e.g., a transmitting device 250) may encode a message for transmission to a receiving device (e.g., a receiving device 260) using PCS according to encoding process 400. In some examples, the receiving device may perform a decoding operation comprising inverse operations corresponding to the operations of encoding process 400. Encoding process 400 may include aspects of an encoding operation 215, an encoding process 300, or both.

In some examples, a transmitting device may transmit a TB as a set of code blocks (CB), where each CB may correspond to a portion of the bits of the TB. The transmitting device may process each CB individually according to encoding process 400.

As described elsewhere herein, including with reference to FIG. 3, a transmitting device may divide a set of bits for a TB into a first subset of bits (e.g., k bits) for distribution matching and a second subset of bits (e.g., γn bits) that are not to be distribution matched. Based on the first subset of bits, the transmitting device may obtain a corresponding set of shaped bits (e.g., a corresponding sequence of (m−1)n shaped bits), which may alternatively be referred to as amplitude bits. In some cases, the transmitting device may divide the amplitude bits into a set of amplitude bit segments 410. The transmitting device may also divide the second set of bits (e.g., the unshaped bits, which may also be referred to as sign bits), into a set of sign bit segments 415. The transmitting device may allocate one amplitude bit segment 410 and one sign bit segment 415 to each CB for the TB. Thus, each CB may include at least some amplitude bits and at least some sign bits. The amplitude bit segment 410 and sign bit segment 415 for a CB may collectively be referred to as a CB segment 405.

The transmitting device may input a CB segment into a CB CRC generator 430, which may generate a CRC for the CB (e.g., based on the bits of the CB segment 405), which may be referred to as a CB CRC 435. The transmitting device may input the amplitude bit segment 410, sign bit segment 415, and CB CRC 435 for the CB into an FEC encoder 440, which may be an example of an FEC encoder 320 as described with reference to FIG. 3. The FEC encoder 440 may generate (e.g., calculate or otherwise obtain) a first set of systematic bits 445-$a$ corresponding to the amplitude bit segment 410, a second set of systematic bits 445-$b$ corresponding to the sign bit segment 415, a third set of systematic bits 445-$c$ corresponding to the CB CRC 435, and one or more parity bits 450.

The transmitting device may also input the first set of systematic bits 445-$a$, second set of systematic bits 445-$b$, third set of systematic bits 445-$c$, and one or more parity bits 450 into constellation mapper 455, which may be an example of a constellation mapper 335 as described with reference to FIG. 3. The constellation mapper 335 may treat the first set of systematic bits 445-$a$ as amplitude bits 420 and may treat the second set of systematic bits 445-$b$, third set of systematic bits 445-$c$, and one or more parity bits 450 each as sign bits 460. Thus, the constellation mapper 455 may select (e.g., map to) modulation symbols for the CB with amplitudes based on the corresponding amplitude bit segment 410 and signs based on the corresponding sign bit segment 415.

In some examples, the transmitting device may determine the size of the TB based on a number of resource elements, a layer number or quantity of transmission layers used to transmit the symbols, the modulation and coding scheme (MCS), the FEC encoding rate, the distribution matching rate, the probability distribution, spectral efficiency, or a combination thereof. Additionally or alternatively, the transmitting device may determine the total number of amplitude bits input to the TB segmentation (e.g., output from a fixed-to-fixed distribution matcher or a variable-to-fixed distribution matcher) based on the number of resource elements, the layer number, or the MCS. In some examples, the transmitting device may determine the total number of sign bits input to the TB segmentation based on the number of resource elements, the modulation order, the rate of FEC encoding, or a combination thereof. In some cases, the transmitting device may calculate a number of CBs (e.g., according to one or more CB segmentation rules). Additionally or alternatively, the transmitting device may calculate a number of bits input to the FEC encoder.

Figure 5:
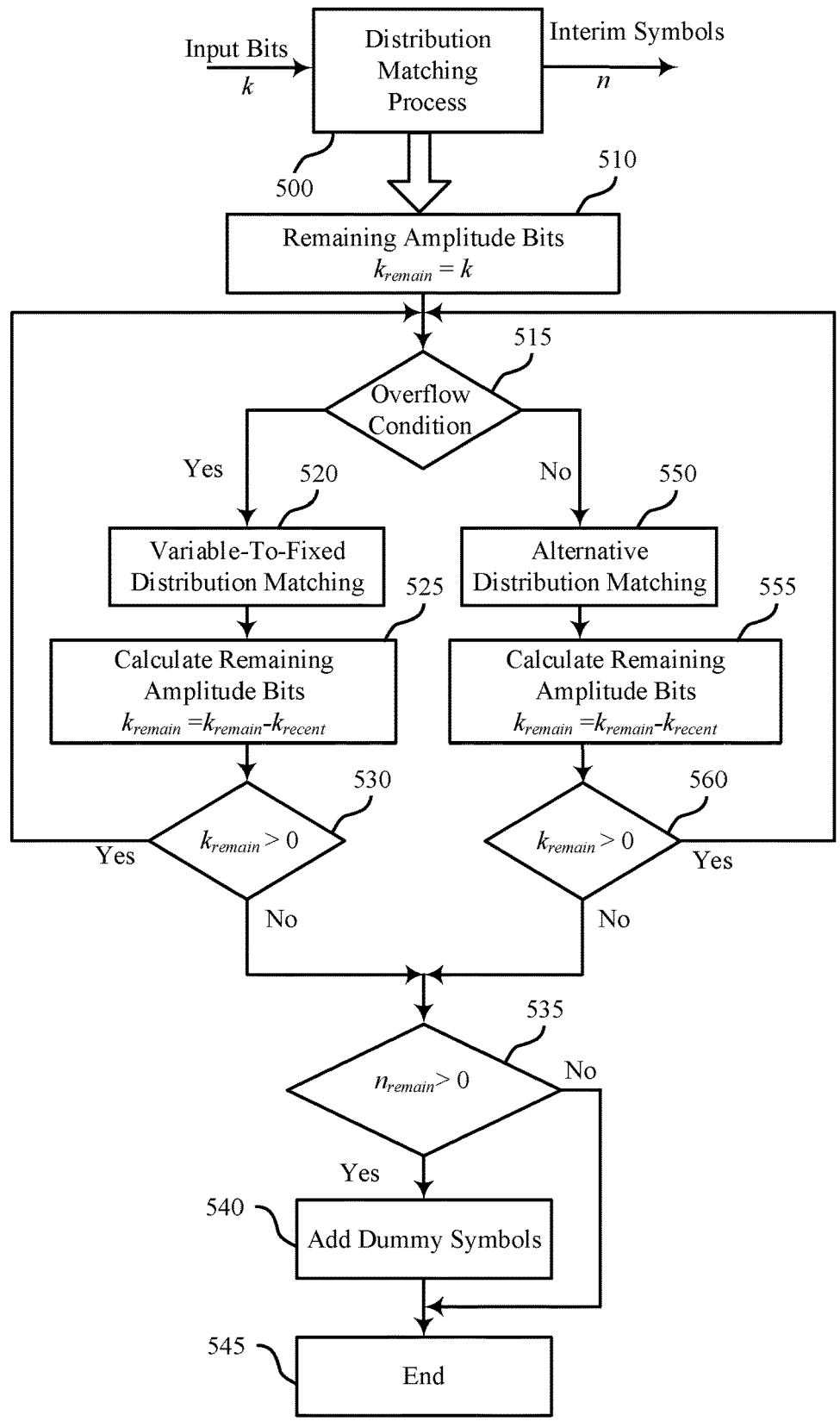
FIG. 5 illustrates an example of a distribution matching process that supports v2f distribution matching for PCS in wireless communications in accordance with aspects of the present disclosure.

FIG. 5 illustrates an example of a distribution matching process 500 that supports v2f distribution matching for PCS in wireless communications in accordance with aspects of the present disclosure. In some examples, distribution matching process 500 may be implemented by aspects of wireless communications system 100 or wireless communications system 200. For example, a transmitting device (e.g., a distribution matcher 225 or a distribution matcher 310 at a transmitting device 250) may perform distribution matching process 500. Distribution matching process 500 may be an example of an iterative distribution matching process that includes at least one v2f distribution matching procedure.

A transmitting device may identify a set of input bits for distribution matching using distribution matching process 500. The set of input bits may be a first subset of a set of bits of a TB, where the transmitting device may perform distribution matching on the first subset of the TB bits, and where the transmitting device may not perform distribution matching on a second subset of the TB bits. In the context of distribution matching process 500, k may represent a quantity of bits included in the set of bits for distribution matching. The transmitting device may determine k as equal to a total quantity of shaped bits for the TB, which may be determined as described elsewhere herein. Additionally or alternatively, transmitting device may determine k based on a total quantity of interim symbols for the TB, which may be determined as described elsewhere herein.

Distribution matching process 500 may be an iterative process involving one or more distribution matching procedures. For example, the transmitting device may perform a v2f distribution matching procedure on at least a portion of the k bits obtain a sequence of interim symbols. The v2f distribution matching procedure may be based on a non-uniform probability distribution. Once the transmitting device performs the initial v2f distribution matching procedure, the transmitting device may determine whether to perform an additional distribution matching procedure based on whether any of the k bits were not distribution matched as part of the initial v2f distribution matching procedure. If the transmitting device determines to perform an additional distribution matching procedure, the transmitting device may select a type of distribution matching procedure for the additional distribution matching procedure (e.g., may select between the type of v2f distribution matching procedure initially performed and at least one alternative distribution matching procedure, such as an f2f distribution matching procedure, a distribution matching procedure based on a uniform probability distribution, or any combination thereof) based on an overflow condition, which may relate to a quantity of remaining bits for distribution matching. The transmitting device may perform the additional distribution matching procedure using the selected type of distribution matching procedure, and then again evaluate whether any bits remain for distribution matching and, if so, select a type of distribution matching procedure to use for further distribution matching on the remaining bits. The transmitting device may continue in like fashion until distribution matching has been performed on all k of the input bits.

For example, at 510, the transmitting device may determine a remaining quantity of bits for distribution matching ($k_{remain}$). Before any distribution matching has been performed on the k input bits, the value of $k_{remain}$ may be equal to k.

At 515, the transmitting device may evaluate an overflow condition based on the value of $k_{remain}$. In some cases, the transmitting device may evaluate the overflow condition according to Equation 4:

$$0 \le k_{remain} - l(b)_{min} \le (n_{remain} - l(s)) \times \log_2(M)$$

where $l(b)_{min}$ is the minimum quantity of input bits for one instance (e.g., iteration) of the v2f distribution matching procedure at 520, $n_{remain}$ is a quantity of remaining interim symbols to obtain via distribution matching process 500, $l(s)$ is the length (e.g., fixed length) of each interim symbol sequence obtained via one instance of the v2f distribution matching procedure at 520, and M is the modulation order of each interim symbol to be obtain via distribution matching process 500. The transmitting device may determine a target quantity of interim symbols to obtain via distribution matching process 500 as equal to a total quantity of interim symbols for the TB, which may be determined as described elsewhere herein. Thus, the transmitting device may determine whether the overflow condition is satisfied based on the quantity of remaining bits for distribution matching, a minimum quantity of input bits for v2f distribution matching, a difference between a target quantity of interim symbols and a quantity of interim symbols obtained so far, a quantity of interim symbols produced from one iteration of a v2f distribution matching procedure, a modulation order of the associated interim symbols, or any combination thereof.

If the overflow condition is satisfied as evaluated at 515, the transmitting device may at 520 perform a v2f distribution matching procedure on at least a portion of the $k_{remain}$ bits (where the $k_{remain}$ bits may initially be all k of the input bits). The v2f distribution matching procedure may, based on at least the portion of the $k_{remain}$ bits and a non-uniform probability distribution, generate (e.g., calculate or otherwise obtain) a sequence of interim symbols of length l(s)— that is, a sequence of interim symbols that includes a quantity l(s) of interim symbols. The value of l(s) may be fixed such that every instance of the v2f distribution matching procedure may generate a sequence of interim symbols of the same length l(s). The quantity of input bits corresponding to the sequence of interim symbols of length l(s) may, however, be variable (e.g., depending on which particular interim symbols are included in the sequence of interim symbols, a different quantity of input bits may be distribution matched). The quantity of input bits that are distribution matched using a most recent distribution matching procedure may be referred to as $k_{recent}$.

At 525, after performing the v2f distribution matching procedure at 520, the transmitting device may calculate a remaining quantity of bits for distribution matching (e.g., an updated value of $k_{remain}$). For example, the transmitting device may calculate an updated remaining quantity of bits for distribution matching as $k_{remain}=k_{remain}-k_{recent}$. In some cases, the transmitting device may also (e.g., at 525) calculate an updated quantity of remaining interim symbols to obtain (e.g., as $n_{remain}=n_{remain}-l(s)$).

At 530, the transmitting device may evaluate whether any bits remain for distribution matching (e.g., if $k_{remain}$ is still greater than zero). If so, then the distribution matching process 500 may return to 515, and the transmitting device may re-evaluate the overflow condition based on the current values of $k_{remain}$ and $n_{remain}$. If the overflow condition is satisfied, the distribution matching process 500 may again proceed to 520. If, however, the overflow condition is not satisfied, the distribution matching process 500 may proceed to 550.

At 550, the transmitting device may perform an alternative distribution matching procedure (e.g., a distribution matching procedure of a different type than the v2f distribution matching procedure performed at 520). The alternative distribution matching procedure may be an f2f distribution matching procedure. Additionally or alternatively, the alternative distribution matching procedure may be based on a different probability distribution (e.g., a uniform probability distribution or a different non-uniform probability distribution) relative to the v2f distribution matching procedure performed at 520.

At 555, after performing the alternative distribution matching procedure at 550, the transmitting device may calculate a remaining quantity of bits for distribution matching (e.g., an updated value of $k_{remain}$). For example, the transmitting device may calculate an updated remaining quantity of bits for distribution matching as $k_{remain}=k_{remain}-k_{recent}$, where $k_{recent}$ is equal to the quantity of bits for which distribution matching was most recently performed at 550 (e.g., which may be a fixed quantity). In some cases, the transmitting device may also (e.g., at 555) calculate an updated quantity of remaining interim symbols to obtain (e.g., as $n_{remain}=n_{remain}-l(s)$), where l(s) is equal to the quantity of interim symbols obtained via the alternative distribution matching procedure most recently performed at 550 (e.g., which may be a fixed quantity).

At 560, the transmitting device may evaluate whether any bits remain for distribution matching (e.g., if $k_{remain}$ is still greater than zero). If so, then the distribution matching process 500 may return to 515, and the transmitting device may re-evaluate the overflow condition based on the current values of $k_{remain}$ and $n_{remain}$. The distribution matching process 500 may then proceed to either 520 or 550 again, depending on whether the overflow condition is satisfied.

If, at either 530 or 560, no bits remain for distribution matching (e.g., if $k_{remain}$ is zero), then the distribution matching process 500 may proceed to 535. At 535, the transmitting device may determine whether the target quantity of interim symbols has been obtained as a result of one or more distribution matching procedures performed at 520 or 550 (e.g., the transmitting device may determine whether $n_{remain}$ is greater than zero). If the target quantity of interim symbols has not been obtained (e.g., if the current value of $n_{remain}$ is zero), then the transmitting device may proceed to 545. If the target quantity of interim symbols has not been obtained (e.g., if the current value of $n_{remain}$ is greater than zero), then the transmitting device may proceed to 540.

At 540, the transmitting device may identify one or more dummy symbols so as to achieve the target quantity of interim symbols (e.g., may identify a quantity of dummy symbols equal to the value of $n_{remain}$ as evaluated at 535). In some cases, the pool of candidate interim symbols may include interim symbols of different amplitudes (e.g., ASK symbols of different amplitudes), and the transmitting device may select a lowest-amplitude candidate interim symbol for each of the dummy symbols, which may support power savings when modulation symbols are later selected based on the one or more dummy symbols as part of a constellation mapping process. From 540, the distribution matching process 500 may proceed to 545.

At 545, the distribution matching process 500 may end. The transmitting device may concatenate each sequence of interim symbols obtained via the one or more distribution matching procedures performed at 520 or 550, along with the dummy bits added at 540 (if any), to obtain a sequence of interim symbols of length n—that is, a sequence that includes n interim symbols. In some cases, each sequence of interim symbols obtained via a single distribution matching procedures performed at 520 or 550 may be referred to as a subsequence of interim symbols, and each set of input bits distribution matched via a single distribution matching procedures performed at 520 or 550 may be referred to as a bit group.

Figure 6:
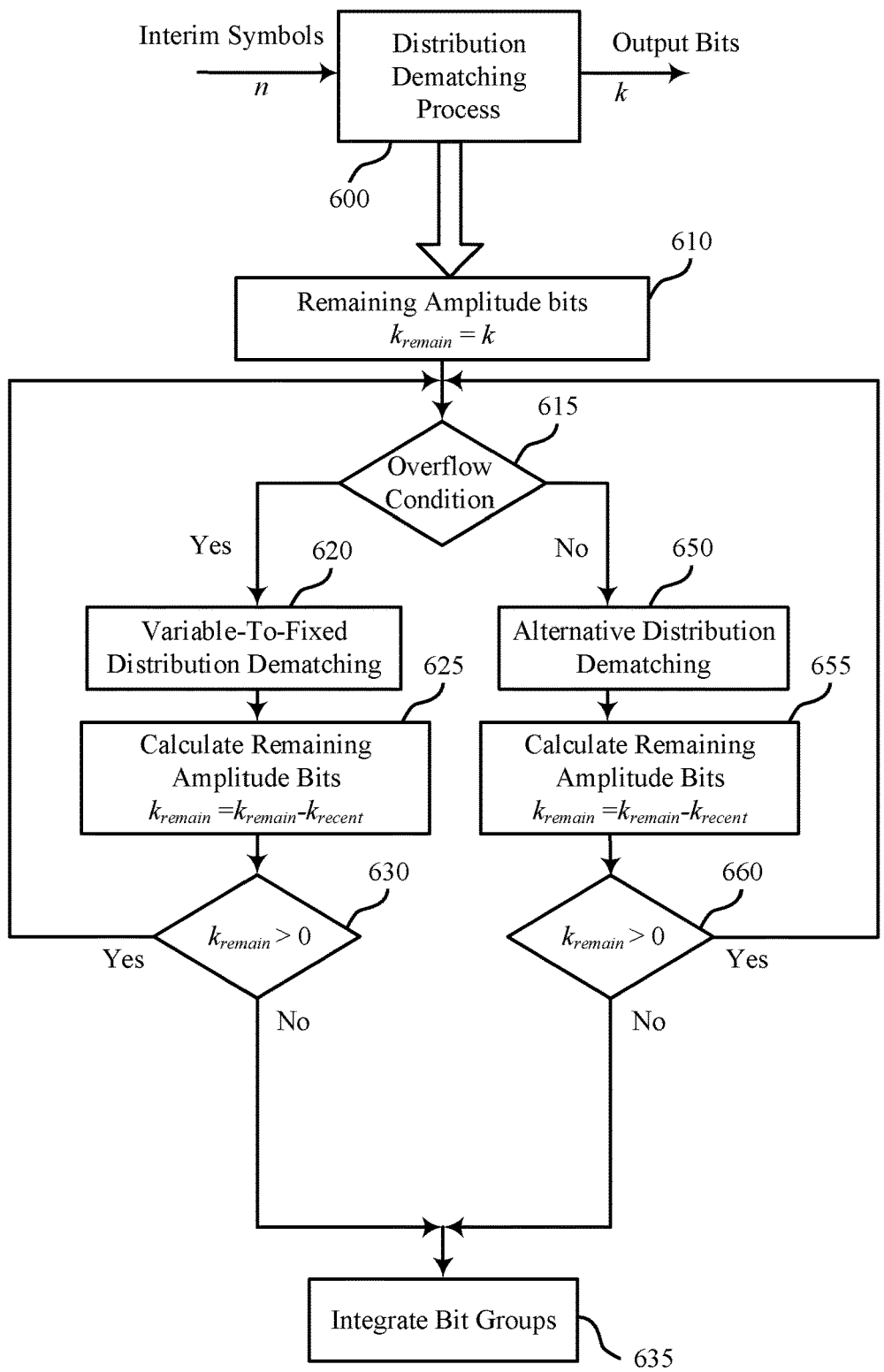
FIG. 6 illustrates an example of a distribution dematching process that supports v2f distribution matching for PCS in wireless communications in accordance with aspects of the present disclosure.

FIG. 6 illustrates an example of a distribution dematching process 600 that supports v2f distribution matching for PCS in wireless communications in accordance with aspects of the present disclosure. In some examples, distribution dematching process 600 may be implemented by aspects of wireless communications system 100 or wireless communications system 200. For example, a receiving device (e.g., a distribution dematcher 240 at a receiving device 255) may perform distribution dematching process 600. Distribution dematching process 600 may be an example of an iterative distribution dematching process that includes at least one v2f distribution dematching procedure.

A receiving device may identify a set of interim symbols for distribution dematching using distribution dematching process 600. The set of interim symbols may correspond to a first subset of a set of bits of a TB, where the transmitting device may have performed distribution dematching on the first subset of the TB bits, and where the transmitting device may not have performed distribution dematching on a second subset of the TB bits. For example, the receiving device may determine a bit sequence based on the amplitudes of a set of modulation symbols received for the TB, and the receiving device may determine the set of interim symbols based on the bit sequence.

In the context of distribution dematching process 600, n may represent a quantity of interim symbols included in the set of interim symbols for distribution dematching. The receiving device may determine n as equal to a total quantity of interim symbols for the TB, which may be determined as described elsewhere herein. Additionally or alternatively, receiving device may determine n based on a total quantity of shaped bits for the TB (e.g., quantity of bits in the first subset), which may be determined as described elsewhere herein. Also, in the context of distribution dematching process 600, k may represent a target quantity of bits to be obtained via distribution matching. The transmitting device may determine k as equal to a total quantity of shaped bits for the TB, which may be determined as described elsewhere herein.

Distribution dematching process 600 may be an iterative process involving one or more distribution dematching procedures. For example, the receiving device may perform a v2f distribution dematching procedure on at least a portion of the n interim symbols to obtain a corresponding group of output bits, which may be referred to as a bit group. The v2f distribution dematching procedure may be based on a nonuniform probability distribution. Once the receiving device performs the initial v2f distribution dematching procedure, the receiving device may determine whether to perform an additional distribution dematching procedure based on whether the target quantity of bits has been obtained. If the receiving device determines to perform an additional distribution dematching procedure, the receiving device may select a type of distribution dematching procedure for the additional distribution dematching procedure (e.g., may select between the type of v2f distribution dematching procedure initially performed and at least one alternative distribution dematching procedure, such as an f2f distribution dematching procedure, a distribution dematching procedure based on a uniform probability distribution, or any combination thereof) based on an overflow condition, which may relate to a quantity of remaining bits to obtain via distribution dematching. The receiving device may perform the additional distribution dematching procedure using the selected type of distribution dematching procedure, and then again evaluate whether the target quantity of bits has been obtained and, if not, select a type of distribution dematching procedure to use for further distribution dematching on the remaining interim symbols. The receiving device may continue in like fashion until the target quantity of bits has been obtained via the distribution dematching process 600.

For example, at 610, the receiving device may determine a remaining quantity of bits to obtain via distribution dematching ($k_{remain}$). Before any distribution dematching has been performed on the n interim symbols, the value of $k_{remain}$ may be equal to k.

At 615, the receiving device may evaluate an overflow condition based on the value of $k_{remain}$. In some cases, the receiving device may evaluate the overflow condition according to Equation 4, which is repeated here:

$$0 \leq k_{remain} - l(b)_{min} \leq (n_{remain} - l(s)) \times \log(M)$$

where $l(b)_{min}$ is the minimum quantity of output bits that may be obtained via one instance (e.g., iteration) of the v2f distribution dematching procedure at 620, $n_{remain}$ is a quantity of remaining interim symbols upon which distribution dematching has not yet been performed (e.g., $n_{remain}$ may initially be equal to n), l(s) is the length (e.g., fixed length) of each interim symbol sequence that may be input into one instance of the v2f distribution dematching procedure at 620, and M is the modulation order of each interim symbol in the set of interim symbols to be distribution dematched. Thus, the receiving device may determine whether the overflow condition is satisfied based on the quantity of remaining bits to obtain via the distribution dematching process 600, a minimum quantity of output bits for one instance of the v2f distribution dematching procedure at 620, a difference between a quantity of interim symbols in the set of interim symbols to be distribution dematched and a quantity of interim symbols obtained so far, a quantity of interim symbols produced from one iteration of a v2f distribution dematching procedure, a modulation order of the associated interim symbols, or any combination thereof.

If the overflow condition is satisfied as evaluated at 615, the receiving device may at 620 perform a v2f distribution dematching procedure on l(s) interim symbols, which may be at least a portion of the n interim symbols to be distribution dematched. The v2f distribution dematching procedure may, based on the l(s) interim symbols and a nonuniform probability distribution, generate (e.g., calculate or otherwise obtain) a corresponding set of output bits, which may be referred to as a bit group. The value of l(s) may be fixed such that every instance of the v2f distribution dematching procedure may take as an input a sequence of interim symbols of the same length l(s). The quantity of output bits corresponding to the sequence of interim symbols of length l(s) may, however, be variable (e.g., depending on which particular interim symbols are included in the sequence of interim symbols, a different quantity of output bits may be obtained). Thus, a v2f distribution dematching procedure may generate (e.g., calculate or otherwise obtain) a variable quantity of bits based on a fixed quantity of interim symbol. The quantity of output bits that are obtained via a most recent distribution dematching procedure may be referred to as $k_{recent}$.

At 625, after performing the v2f distribution dematching procedure at 620, the receiving device may calculate a remaining quantity of bits to be obtained via the distribution dematching process 600 (e.g., an updated value of $k_{remain}$). For example, the receiving device may calculate an updated remaining quantity of bits for as $k_{remain}=k_{remain}-k_{recent}$. In some cases, the receiving device may also (e.g., at 625) calculate an updated quantity of remaining interim symbols upon which distribution dematching is to be performed (e.g., as $n_{remain}=n_{remain}-l(s)$).

At 630, the receiving device may evaluate whether the target quantity of output bits has been obtained via distribution dematching process 600 (e.g., if $k_{remain}$ is still greater than zero). If so, then the distribution dematching process 600 may return to 615, and the receiving device may re-evaluate the overflow condition based on the current values of $k_{remain}$ and $n_{remain}$. If the overflow condition is satisfied, the distribution dematching process 600 may again proceed to 620. If, however, the overflow condition is not satisfied, the distribution dematching process 600 may proceed to 650.

At 650, the receiving device may perform an alternative distribution dematching procedure (e.g., a distribution dematching procedure of a different type than the v2f distribution dematching procedure performed at 620). The alternative distribution dematching procedure may be an f2f distribution dematching procedure. Additionally or alternatively, the alternative distribution dematching procedure may be based on a different probability distribution (e.g., a uniform probability distribution or a different non-uniform probability distribution) relative to the v2f distribution dematching procedure performed at 620.

At 655, after performing the alternative distribution dematching procedure at 650, the receiving device may calculate a remaining quantity of bits to be obtained via the distribution dematching process 600 (e.g., an updated value of $k_{remain}$). For example, the receiving device may calculate an updated remaining quantity of bits for distribution dematching as $k_{remain}=k_{remain}-k_{recent}$, where $k_{recent}$ is equal to the quantity of bits most recently obtained at 650 (e.g., which may be a fixed quantity). In some cases, the receiving device may also (e.g., at 655) calculate an updated quantity of remaining interim symbols to upon which to perform distribution dematching (e.g., as $n_{remain}=n_{remain}-l(s)$), where l(s) is equal to the quantity of interim symbols input to the alternative distribution dematching procedure most recently performed at 650 (e.g., which may be a fixed quantity).

At 660, the receiving device may evaluate whether the target quantity of output bits has been obtained via the distribution dematching process 600 (e.g., if $k_{remain}$ is still greater than zero). If more output bits are to be obtained, then the distribution dematching process 600 may return to 615, and the receiving device may re-evaluate the overflow condition based on the current values of $k_{remain}$ and $n_{remain}$. The distribution dematching process 600 may then proceed to either 620 or 650 again, depending on whether the overflow condition is satisfied.

If, at either 630 or 660, the target quantity of output bits has been obtained (e.g., if $k_{remain}$ is zero), then the distribution dematching process 600 may proceed to 635. At 635, the receiving device may integrate the bit groups obtained via each distribution dematching procedure performed at 620 or 650 to obtain a set of output bits (e.g., k output bits), which may correspond to the first subset of bits upon which a transmitting device performed distribution matching before transmitting the TB. The receiving device also may discard any remaining interim symbols (of the set of n interim symbols) upon which distribution dematching has not yet been performed. For example, if the target quantity of output bits has been obtained (e.g., $k_{remain}$ is zero), but $n_{remain}$ is not zero, the receiving device may identify any remaining interim symbols as dummy symbols and discard such symbols.

Figure 7:
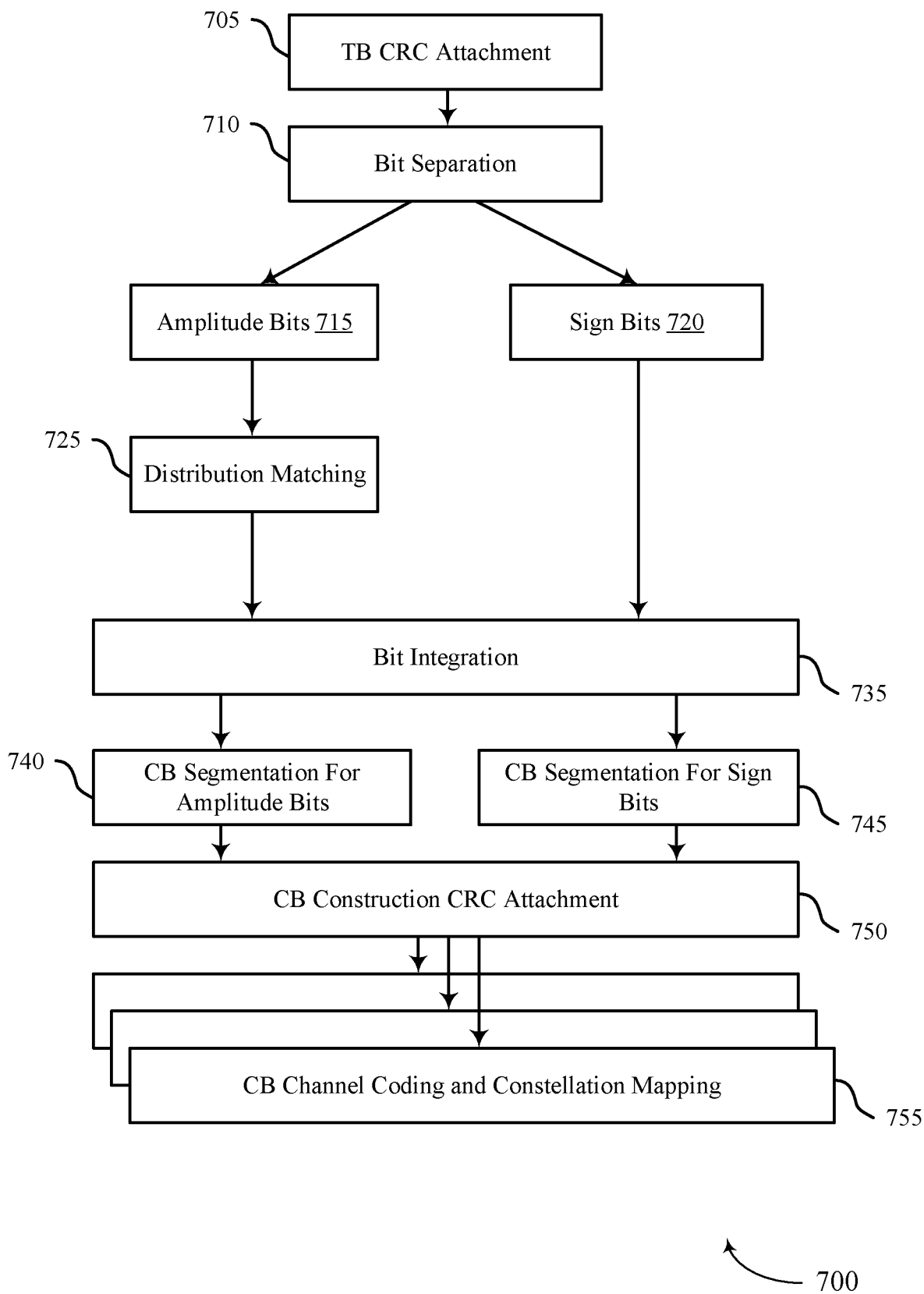
FIG. 7 illustrates an example of an encoding process that supports v2f distribution matching for PCS in wireless communications in accordance with aspects of the present disclosure.

FIG. 7 illustrates an example of an encoding process 700 that supports v2f distribution matching for PCS in wireless communications in accordance with aspects of the present disclosure. In some examples, encoding process 700 may be implemented by aspects of wireless communications system 100 or wireless communications system 200. For example, a transmitting device (e.g., a transmitting device 250) may encode a message for transmission to a receiving device (e.g., a receiving device 260) using PCS according to encoding process 700. In some examples, the receiving device may perform a decoding operation comprising inverse operations corresponding to the operations of encoding process 700. Encoding process 700 may include aspects of an encoding operation 215, an encoding process 300, an encoding process 400, a distribution matching process 500, or any combination thereof. The encoding process 700 may be an example of an encoding process in which a transmitting device generates and adds TB CRC bits prior to performing distribution matching for the TB.

Prior to performing the encoding process 700, the transmitting device may identify a set of bits of a TB (a set of TB bits) for communication to the receiving device. In some cases, a physical layer of a transmitting device may perform aspects of the encoding process 700. For example, the physical layer of the transmitting device may receive a set of TB bits from a MAC layer of the transmitting device. In some examples, a corresponding medium access control-control element (MAC-CE) may be included in the TB as received at the physical layer. If present, the corresponding MAC-CE may be considered part of the TB for the sake of determining a TB size as described herein.

At 705, the transmitting device may generate (e.g., calculate or otherwise obtain) a CRC based on the set of TB bits, which may be referred to as TB CRC. The transmitting device may subsequently treat the bits of the TB CRC as part of the TB (e.g., the set of TB bits may be expanded at 705 to include the TB CRC). Generating the TB CRC and including it in the TB may in some cases be referred to as TB CRC attachment. As described in greater detail elsewhere herein, a size of the TB (e.g., quantity of bits in the set of TB bits, either before or after CRC attachment) may be based on a quantity of resource elements to be used to transmit modulation symbols representative of the TB, a quantity of transmission layers to be used to transmit the modulation symbols, a modulation order for the modulation symbols, an FEC coding rate, a coding rate for the distribution matching, or any combination thereof.

In some cases, at 710, the transmitting device may divide the bits in the TB into two subsets. In some cases, the first subset may include amplitude bits 715, which may be bits upon which distribution matching is subsequently performed, while the second subset may include sign bits 720, upon which distribution matching may not be subsequently performed. The quantity of amplitude bits 715 may be based on the quantity of resource elements to be used to transmit modulation symbols representative of the TB, the quantity of transmission layers to be used to transmit the modulation symbols, the modulation order for the modulation symbols, or any combination thereof. The quantity of sign bits 720 may be based on the quantity of resource elements to be used to transmit modulation symbols representative of the TB, the quantity of transmission layers to be used to transmit the modulation symbols, the modulation order for the modulation symbols, the FEC coding rate, or any combination thereof.

In some cases, the bits included in the set of TB bits may be associated with a bit order, where each bit has an assigned location within the bit order (e.g., first bit, last bit, or some location in between). In some cases, the bit order may correspond to an order in which the TB bits are processed (e.g., an order in which the TB bits received at the physical layer of the transmitting device). The first subset of bits may in some cases be earlier within the bit order than the second subset of bits (e.g., bits received earlier at the physical layer may be processed as amplitude bits 715). Alternatively, the first subset of bits may be later within the bit order than the second subset of bits (e.g., bits received later at the physical layer may be processed as amplitude bits 715). As another alternative, the transmitting device may allocate each TB bits as an amplitude bit 715 or a sign bit 720 according to some interleaved pattern (e.g., TB bits allocated as amplitude bits 715 may be interleaved with TB bits allocated as sign bits 720). If the transmitting device attaches the TB CRC before distribution matching, as in the example of encoding process 700, then the TB CRC bits may be treated as amplitude bits 715, as sign bits 720, or as some combination (e.g., some TB CRC bits treated as amplitude bits 715, other TB CRC bits as sign bits 720).

At 725, the transmitting device may perform distribution matching on the amplitude bits 715. In some examples, the transmitting device may perform the distribution matching on the amplitude bits using the distribution matching process 500 described with reference to FIG. 5.

For each distribution matching procedure performed at 725 (e.g., each v2f distribution matching procedure or alternative distribution matching procedure described with reference to 520 or 550 of FIG. 5), the transmitting device may obtain a corresponding sequence of interim symbols based on a corresponding bit group within the amplitude bits 715. And for each sequence of interim symbols obtained by the transmitting device, the transmitting device may obtain a corresponding sequence of bits, which may be shaped bits. In some cases, a sequence of interim symbols associated with (e.g., obtained via) a single distribution matching procedure (e.g., a single v2f distribution matching procedure or alternative distribution matching procedure described with reference to 520 or 550 of FIG. 5) may be referred to as a subsequence of interim symbols, and a corresponding sequence of bits may be referred to as a bit subsequence.

At 735, the transmitting device may concatenate each length bit subsequence obtained at 730 to obtain a resulting bit sequence (of shaped bits) corresponding to all of the amplitude bits 715. At 735, either concurrent with or subsequent to concatenating each bit subsequence, the transmitting device may also concatenate the bit sequence with the sign bits 720. Operations at 735 may collectively be referred to as bit integration.

At 740, the transmitting device may divide the bit sequence obtained at 735 (e.g., the bit sequence comprising each bit subsequence obtained at 730) into a quantity of first CB portions, each of the first CB portions thus comprising shaped bits derived from a portion of the amplitude bits 715. The quantity of first CB portions may be equal to the quantity of CBs for the TB. A first CB portion may be an example of an amplitude bit segment 410 as described with reference to FIG. 4.

At 745, the transmitting device may divide the sign bits 720 into a quantity of second CB portions, each of the second CB portions thus comprising unshaped bits. The quantity of second CB portions may be equal to the quantity of CBs for the TB, and thus also equal to the quantity of first CB portions. A second CB portion may be an example of a sign bit segment 415 as described with reference to FIG. 4.

At 750, the transmitting device may construct a quantity of CBs for the TB. Each CB for the TB may include a respective first CB portion (comprising shaped bits) and a respective second CB portion (comprising unshaped bits). Also at 750, the transmitting device may generate (e.g., calculate or otherwise obtain) a CRC for each CB, which may be referred to as a CB CRC. The transmitting device may attach the generated CB CRC to the CB, and the attached CB CRC may thereafter be considered part of the CB for purposes of further processing the CB.

In some cases, at 750, the transmitting device may perform LDPC base graph selection on the CBs. Alternatively, the transmitting device may perform LDPC base graph selection on the integrated bits (e.g., the bit sequence and the sign bits 720) obtained at 735. The LDPC base graph selection may be an example of selecting or construction an FEC code. The selected or constructed FEC code may be applied or otherwise used as part of the channel coding (e.g., FEC encoding) at 755.

At 755, the transmitting device may separately perform channel coding and constellation mapping on each CB constructed at 750. For example, each CB constructed at 750 may be separately processed as described with reference to FIG. 4. The transmitting device may input each CB into an FEC encoder 440 and perform associated FEC encoding as described with reference to FIG. 4. Based on performing channel encoding on a CB, the transmitting device may obtain a corresponding encoded CB, which may include a first set of systematic bits 445-*a*, second set of systematic bits 445-*b*, third set of systematic bits 445-*c*, and one or more parity bits 450 as described with reference to FIG. 4. Thus, by performing channel on the set of CBs constructed at 750, the transmitting device may obtain a corresponding set of encoded CBs.

The transmitting device may also at 755 separately input each encoded CB into a constellation mapper 455 and perform associated constellation mapping as described with reference to FIG. 4. Each CB may thus correspond to a respective subset of the set of modulation symbols used to transmit the TB. Within the respective subset of modulation symbols for a CB, the modulation symbols may have amplitudes based on the first CB portion therein (e.g., the first set of systematic bits 445-*a*), along with signs based on the second CB portion therein (e.g., the second set of systematic bits 445-*b*), the corresponding CB CRC (e.g., the third set of systematic bits 445-*c*), and the one or more corresponding parity bits 450.

The receiving device may receive the module symbols for the TB over a wireless communications link. In some cases, the receiving device may perform a decoding process including one or more operations to undo the encoding process performed by the transmitting device (e.g., for each operation of encoding process 700, the receiving device may perform a corresponding inverse process), which may be an example of a decoding operation 235 as described with reference to FIG. 2. In examples such as the encoding process 700, in which the transmitting device attaches the TB CRC prior to performing distribution matching for the TB, the receiving device may perform distribution dematching (e.g., using distribution dematching process 600) before checking the TB CRC.

For example, the receiving device may map the received modulation symbols to a set of bits based on a symbol constellation. Within the set of bits, the receiving device may identify a bit sequence (e.g., of amplitude bits) and a set of sign bits. In some cases, the symbol constellation may be based on amplitude and sign, where they symbols may have amplitudes based on the bit sequence and signs based on the sign bits. The mapping may include dividing the symbols into subsets for respective CBs for the TB, or the respective subsets of symbols for the CBs may be received separately. The receiving device may map each subset of symbols to bits for respective CBs based on the symbol constellation, wherein each CB includes a respective portion of the bit sequence and a respective portion of the sign bits. For each CB, the receiving device may perform channel decoding on each (e.g., FEC decoding) and then may perform a CRC check based on the corresponding CB CRC.

Based on the amplitude bits associated with each CB, the receiving device obtain a bit sequence for the TB. The receiving device may perform distribution dematching on the bit sequence based on a non-uniform probability distribution to obtain the amplitude bits that were subjected to distribution dematching by the transmitting device. For example, the receiving device may perform distribution dematching on the bit sequence using distribution dematching process 600 as described with reference to FIG. 6. The distribution dematching may include dividing the bit sequence into multiple bit subsequences, each corresponding to a respective sequence of l(s) interim symbols. The receiving device may perform the distribution dematching separately on each sequence of l(s) interim symbols to obtain corresponding bit groups based on the multiple bit subsequences and the non-uniform probability distribution. In some cases, the receiving device may combine the bit groups to obtain the amplitude bits as previously identified by the transmitting device at 710. The receiving device may combine the amplitude bits and sign bits to obtain the bits of the TB, including the TB CRC, and the receiving device may then check the TB CRC.

Figure 8:
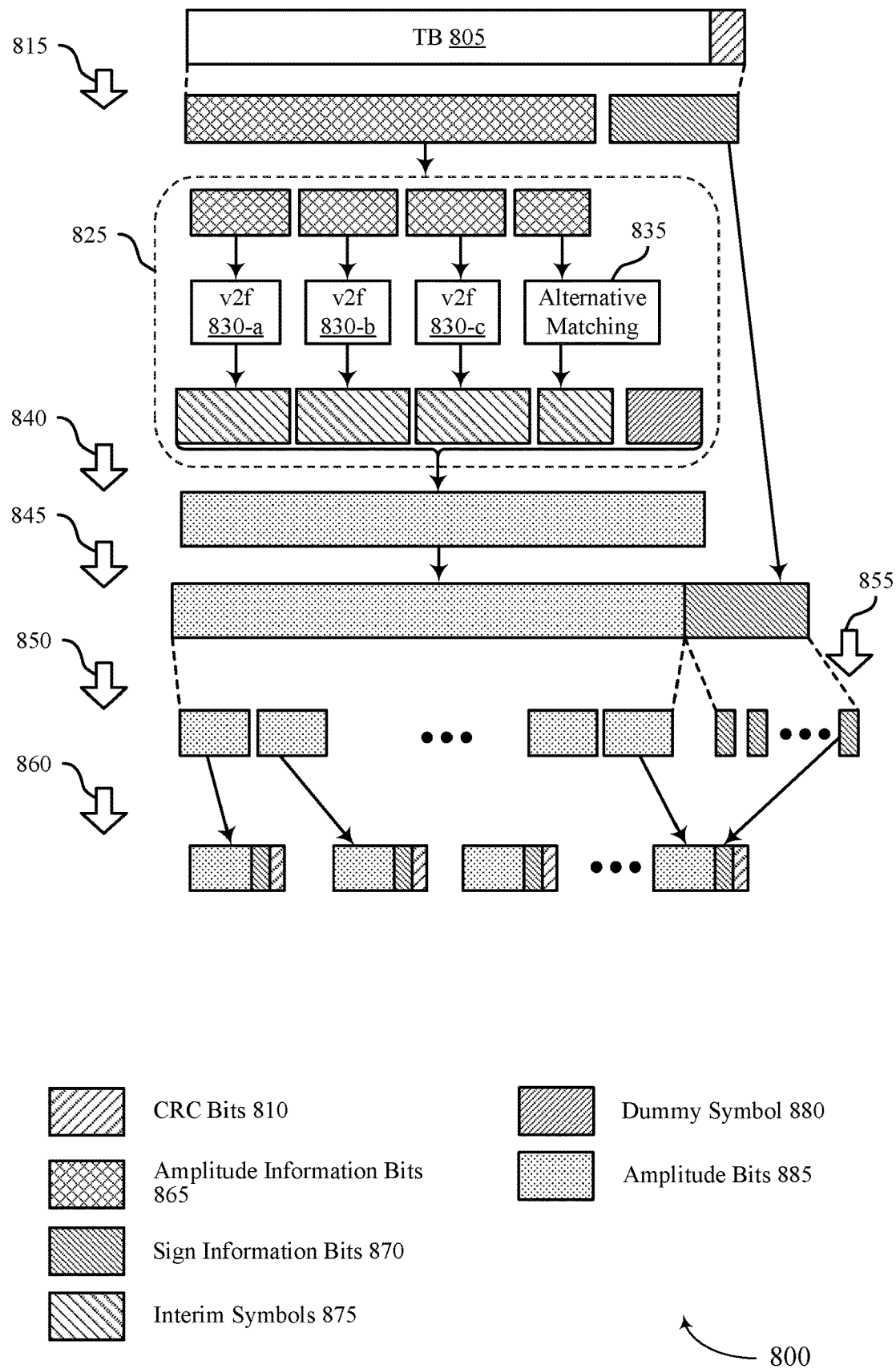
FIG. 8 illustrates an example of a processing flow that supports v2f distribution matching for PCS in wireless communications in accordance with aspects of the present disclosure.

FIG. 8 illustrates an example of a processing flow 800 that supports v2f distribution matching for PCS in wireless communications in accordance with aspects of the present disclosure. In some examples, processing flow 800 may be implemented by aspects of wireless communications system 100 or wireless communications system 200. For example, a transmitting device (e.g., a transmitting device 250) may encode a message for transmission to a receiving device (e.g., a receiving device 260) using PCS according to processing flow 800. In some examples, the receiving device may perform a decoding operation comprising inverse operations corresponding to the operations of processing flow 800. Processing flow 800 may include aspects of an encoding operation 215, an encoding process 300, an encoding process 400, a distribution matching process 500, an encoding process 700, or any combination thereof.

In some examples, a transmitting device may generate a TB CRC, which may include some quantity of CRC bits 810, based on the bits of a TB 805, which may be an example of a TB 210 as described with reference to FIG. 2. The transmitting device may attach the TB CRC to the TB 805 and treat the CRC bits 810 of the TB CRC as part of the TB 805 for purposes of the subsequent operations of the processing flow 800.

For example, at 815, the transmitting device may perform bit separation as described with reference to 710 of FIG. 7. The transmitting device may thereby split the set of bits comprising TB 805 and the TB CRC into a first subset (including amplitude information bits 865) and a second subset (including sign information bits 870). As used in this context, information bits may refer to an unshaped bits—e.g., amplitude information bits 865 may not yet be shaped, and sign information bits 870 may also be unshaped. The amplitude information bits 865 may be an example of the amplitude bits described with reference to 715 of FIG. 7. The sign information bits 870 may be an example of the sign bits described with reference to 720 of FIG. 7.

At 825, the transmitting device may perform distribution matching on the amplitude information bits 865 included in the first subset of bits obtained at 815, as described with reference to 725 of FIG. 7. For example, the transmitting device may perform distribution matching on the amplitude information bits 865 using distribution matching process 500. The transmitting device may thereby divide the amplitude information bits 820 into one or more bit groups, each bit group representing the input bits for a respective distribution matching procedure 830 (which may be an example of a v2f distribution matching procedure as described with reference to 520 of FIG. 5) or distribution matching procedure 835 (which may be an example of an alternative distribution matching procedure as described with reference to 550 of FIG. 5). Based on the distribution matching at 825, the transmitting device may obtain a respective sequence of interim symbols 875 for each bit group. The transmitting device may also, in some cases, insert one or more dummy symbols 880 as described with reference to 540 of FIG. 5.

At 840, the transmitting device may perform symbol-to-bit conversion on the interim symbols 875 (and dummy symbols 880, if any) obtained at 825. The transmitting device may thereby obtain a respective set of amplitude bits 885 (which may be shaped) for each bit group.

At 845, the transmitting device may perform bit integration on the sets of amplitude bits 885 and the sign information bits 870, as described with reference to 735 of FIG. 7.

At 850 and 855, the transmitting device may perform CB segmentation for the amplitude bits and sign bits, respectively, as described with reference to 740 and 745 of FIG. 7. The transmitting device may thereby obtain first CB portions that each include a portion of the amplitude bits 885, along with an equal quantity of second CB portions that each include a portion of the sign information bits 870.

At 860 the transmitting device may perform CB construction and CRC attachment, as described with reference to 750 of FIG. 7. The transmitting device may thereby obtain a set of CBs each including a first CB portion of amplitude bits 840, second CB portion of sign information bits 825, and a CB CRC comprising one or more CRC bits 810. Each CB may then be separately subjected to FEC encoding and constellation mapping, as describe with reference to FIG. 4, for example.

Figure 9:
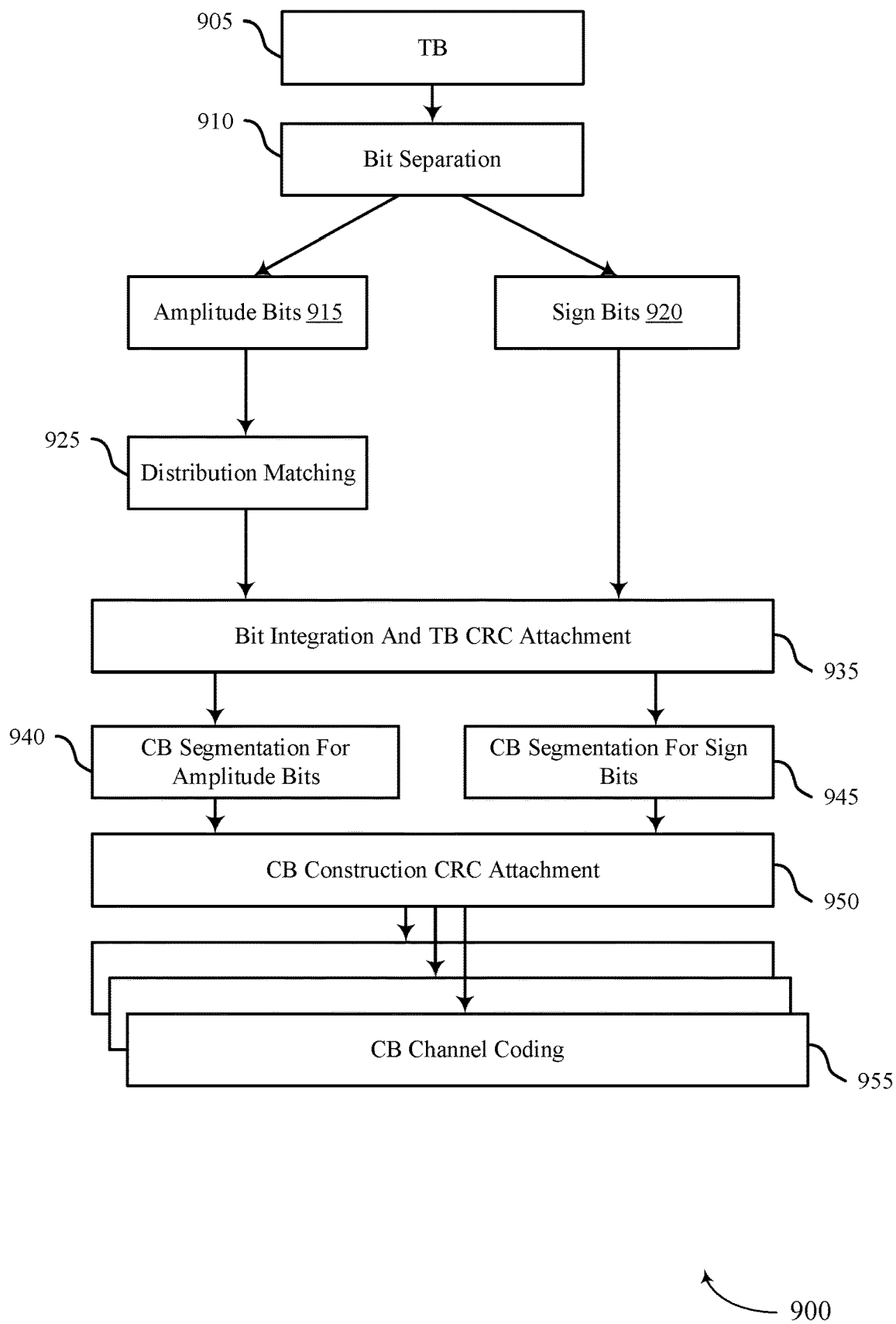
FIG. 9 illustrates an example of an encoding process that supports v2f distribution matching for PCS in wireless communications in accordance with aspects of the present disclosure.

FIG. 9 illustrates an example of an encoding process 900 that supports distribution matching for PCS in wireless communications in accordance with aspects of the present disclosure. In some examples, encoding process 900 may be implemented by aspects of wireless communications system 100 or wireless communications system 200. For example, a transmitting device (e.g., a transmitting device 250) may encode a message for transmission to a receiving device (e.g., a receiving device 260) using PCS according to encoding process 900. In some examples, the receiving device may perform a decoding operation comprising inverse operations corresponding to the operations of encoding process 900. Encoding process 700 may include aspects of an encoding operation 215, an encoding process 300, an encoding process 400, a distribution matching process 500, or any combination thereof. The encoding process 900 may be an example of an encoding process in which a transmitting device generates and adds TB CRC bits after performing distribution matching for the TB.

At 905, the transmitting device may identify a set of bits of a TB (a set of TB bits) for communication to the receiving device. In some cases, a physical layer of a transmitting device may perform aspects of the encoding process 900. For example, the physical layer of the transmitting device may receive a set of TB bits from a MAC layer of the transmitting device. In some examples, a corresponding medium access control-control element (MAC-CE) may be included in the TB as received at the physical layer. If present, the corresponding MAC-CE may be considered part of the TB for the sake of determining a TB size as described herein. As described in greater detail elsewhere herein, a size of the TB (e.g., quantity of bits in the set of TB bits, either before or after CRC attachment, which may occur as described with reference to 935) may be based on a quantity of resource elements to be used to transmit modulation symbols representative of the TB, a quantity of transmission layers to be used to transmit the modulation symbols, a modulation order for the modulation symbols, an FEC coding rate, a coding rate for the distribution matching, or any combination thereof.

In some cases, at 910, the transmitting device may divide the bits in the TB into two subsets. In some cases, the first subset may include amplitude bits 915, which may be bits upon which distribution matching is subsequently performed, while the second subset may include sign bits 920, upon which distribution matching may not be subsequently performed. The quantity of amplitude bits 915 may be based on the quantity of resource elements to be used to transmit modulation symbols representative of the TB, the quantity of transmission layers to be used to transmit the modulation symbols, the modulation order for the modulation symbols, or any combination thereof. The quantity of sign bits 920 may be based on the quantity of resource elements to be used to transmit modulation symbols representative of the TB, the quantity of transmission layers to be used to transmit the modulation symbols, the modulation order for the modulation symbols, the FEC coding rate, or any combination thereof.

In some cases, the bits included in the set of TB bits may be associated with a bit order, where each bit has an assigned location within the bit order (e.g., first bit, last bit, or some location in between). In some cases, the bit order may correspond to an order in which the TB bits are processed (e.g., an order in which the TB bits received at the physical layer of the transmitting device). The first subset of bits may in some cases be earlier within the bit order than the second subset of bits (e.g., bits received earlier at the physical layer may be processed as amplitude bits 915). Alternatively, the first subset of bits may be later within the bit order than the second subset of bits (e.g., bits received later at the physical layer may be processed as amplitude bits 915). As another alternative, the transmitting device may allocate each TB bits as an amplitude bit 915 or a sign bit 920 according to some interleaved pattern (e.g., TB bits allocated as amplitude bits 915 may be interleaved with TB bits allocated as sign bits 920).

At 925, the transmitting device may perform distribution matching on the amplitude bits 915. In some examples, the transmitting device may perform the distribution matching on the amplitude bits using the distribution matching process 500 described with reference to FIG. 5.

For each distribution matching procedure performed at 925 (e.g., each v2f distribution matching procedure or alternative distribution matching procedure described with reference to 520 or 550 of FIG. 5), the transmitting device may obtain a corresponding sequence of interim symbols based on a corresponding bit group within the amplitude bits 915. And for each sequence of interim symbols obtained by the transmitting device, the transmitting device may obtain a corresponding sequence of bits, which may be shaped bits. In some cases, a sequence of interim symbols associated with (e.g., obtained via) a single distribution matching procedure (e.g., a single v2f distribution matching procedure or alternative distribution matching procedure described with reference to 520 or 550 of FIG. 5) may be referred to as a subsequence of interim symbols, and a corresponding sequence of bits may be referred to as a bit subsequence.

At 735, the transmitting device may concatenate each length bit subsequence obtained at 730 to obtain a resulting bit sequence (of shaped bits) corresponding to all of the amplitude bits 715. At 735, either concurrent with or subsequent to concatenating each bit subsequence, the transmitting device may also concatenate the bit sequence with the sign bits 720. Operations at 735 may collectively be referred to as bit integration.

Also at 935, the transmitting device may generate (e.g., calculate or otherwise obtain) a CRC based on the integrated set of bits obtained at 935, which may be referred to as TB CRC. Thus, for example, the transmitting device may generate a CRC for the TB after performing distribution matching at 925. The transmitting device may subsequently treat the bits of the TB CRC as part of the sign bits 920. Generating the TB CRC and including it in the TB (e.g., in the set of bits obtained at 935) may in some cases be referred to as TB CRC attachment.

At 940, the transmitting device may divide the bit sequence obtained at 935 (e.g., the bit sequence comprising each bit subsequence obtained at 930) into a quantity of first CB portions, each of the first CB portions thus comprising shaped bits derived from a portion of the amplitude bits 915. The quantity of first CB portions may be equal to the quantity of CBs for the TB. A first CB portion may be an example of an amplitude bit segment 410 as described with reference to FIG. 4.

At 945, the transmitting device may divide the sign bits 920, including the TB CRC bits generated at 935, into a quantity of second CB portions, each of the second CB portions thus comprising unshaped bits. The quantity of second CB portions may be equal to the quantity of CBs for the TB, and thus also equal to the quantity of first CB portions. A second CB portion may be an example of a sign bit segment 415 as described with reference to FIG. 4.

At 950, the transmitting device may construct a quantity of CBs for the TB. Each CB for the TB may include a respective first CB portion (comprising shaped bits) and a respective second CB portion (comprising unshaped bits). Also at 950, the transmitting device may generate (e.g., calculate or otherwise obtain) a CRC for each CB, which may be referred to as a CB CRC. The transmitting device may attach the generated CB CRC to the CB, and the attached CB CRC may thereafter be considered part of the CB for purposes of further processing the CB.

In some cases, at 950, the transmitting device may perform LDPC base graph selection on the CBs. Alternatively, the transmitting device may perform LDPC base graph selection on the integrated bits obtained at 935 (e.g., the bit sequence and the sign bits 920, with the TB CRC included in the sign bits 920). The LDPC base graph selection may be an example of selecting or construction an FEC code. The selected or constructed FEC code may be applied or otherwise used as part of the channel coding (e.g., FEC encoding) at 955.

At 955, the transmitting device may separately perform channel coding and constellation mapping on each CB constructed at 950. For example, each CB constructed at 950 may be separately processed as described with reference to FIG. 4. The transmitting device may input each CB into an FEC encoder 440 and perform associated FEC encoding as described with reference to FIG. 4. Based on performing channel encoding on a CB, the transmitting device may obtain a corresponding encoded CB, which may include a first set of systematic bits 445-$a$, second set of systematic bits 445-$b$, third set of systematic bits 445-$c$, and one or more parity bits 450 as described with reference to FIG. 4.

Thus, by performing channel on the set of CBs constructed at 950, the transmitting device may obtain a corresponding set of encoded CBs.

The transmitting device may also at 955 separately input each encoded CB into a constellation mapper 455 and perform associated constellation mapping as described with reference to FIG. 4. Each CB may thus correspond to a respective subset of the set of modulation symbols used to transmit the TB. Within the respective subset of modulation symbols for a CB, the modulation symbols may have amplitudes based on the first CB portion therein (e.g., the first set of systematic bits 445-a), along with signs based on the second CB portion therein (e.g., the second set of systematic bits 445-b), the corresponding CB CRC (e.g., the third set of systematic bits 445-c), and the one or more corresponding parity bits 450.

The receiving device may receive the module symbols for the TB over a wireless communications link. In some cases, the receiving device may perform a decoding process including one or more operations to undo the encoding process performed by the transmitting device (e.g., for each operation of encoding process 900, the receiving device may perform a corresponding inverse process), which may be an example of a decoding operation 235 as described with reference to FIG. 2. In examples such as the encoding process 900, in which the transmitting device attaches the TB CRC after performing distribution matching for the TB, the receiving device may check the TB CRC before performing distribution dematching (e.g., using distribution dematching process 600) for the TB.

For example, the receiving device may map the received modulation symbols to a set of bits based on a symbol constellation. Within the set of bits, the receiving device may identify a bit sequence (e.g., of amplitude bits) and a set of sign bits. In some cases, the symbol constellation may be based on amplitude and sign, where they symbols may have amplitudes based on the bit sequence and signs based on the sign bits. The mapping may include dividing the symbols into subsets for respective CBs for the TB, or the respective subsets of symbols for the CBs may be received separately. The receiving device may map each subset of symbols to bits for respective CBs based on the symbol constellation, wherein each CB includes a respective portion of the bit sequence and a respective portion of the sign bits. For each CB, the receiving device may perform channel decoding on each (e.g., FEC decoding) and then may perform a CRC check based on the corresponding CB CRC. The receiving device may combine the bits of each CB to obtain the bits of the TB. The receiving device may also identify the TB CRC among the sign bits corresponding to the TB, and the receiving device may then check the TB CRC.

Based on the amplitude bits associated with each CB, the receiving device obtain a bit sequence for the TB. If the TB CRC check passes (the TB is identified as error-free), the receiving device may, after the TB CRC check, perform distribution dematching on the bit sequence based on a non-uniform probability distribution to obtain the amplitude bits that were subjected to distribution dematching by the transmitting device. For example, the receiving device may perform distribution dematching on the bit sequence using distribution dematching process 600 as described with reference to FIG. 6. The distribution dematching may include dividing the bit sequence into multiple bit subsequences, each corresponding to a respective sequence of l(s) interim symbols. The receiving device may perform the distribution dematching separately on each sequence of l(s) interim symbols to obtain corresponding bit groups based on the multiple bit subsequences and the non-uniform probability distribution. In some cases, the receiving device may combine the bit groups to obtain the amplitude bits as previously identified by the transmitting device at 910. The receiving device may combine the amplitude bits and sign bits to obtain the bits of the TB.

Figure 10:
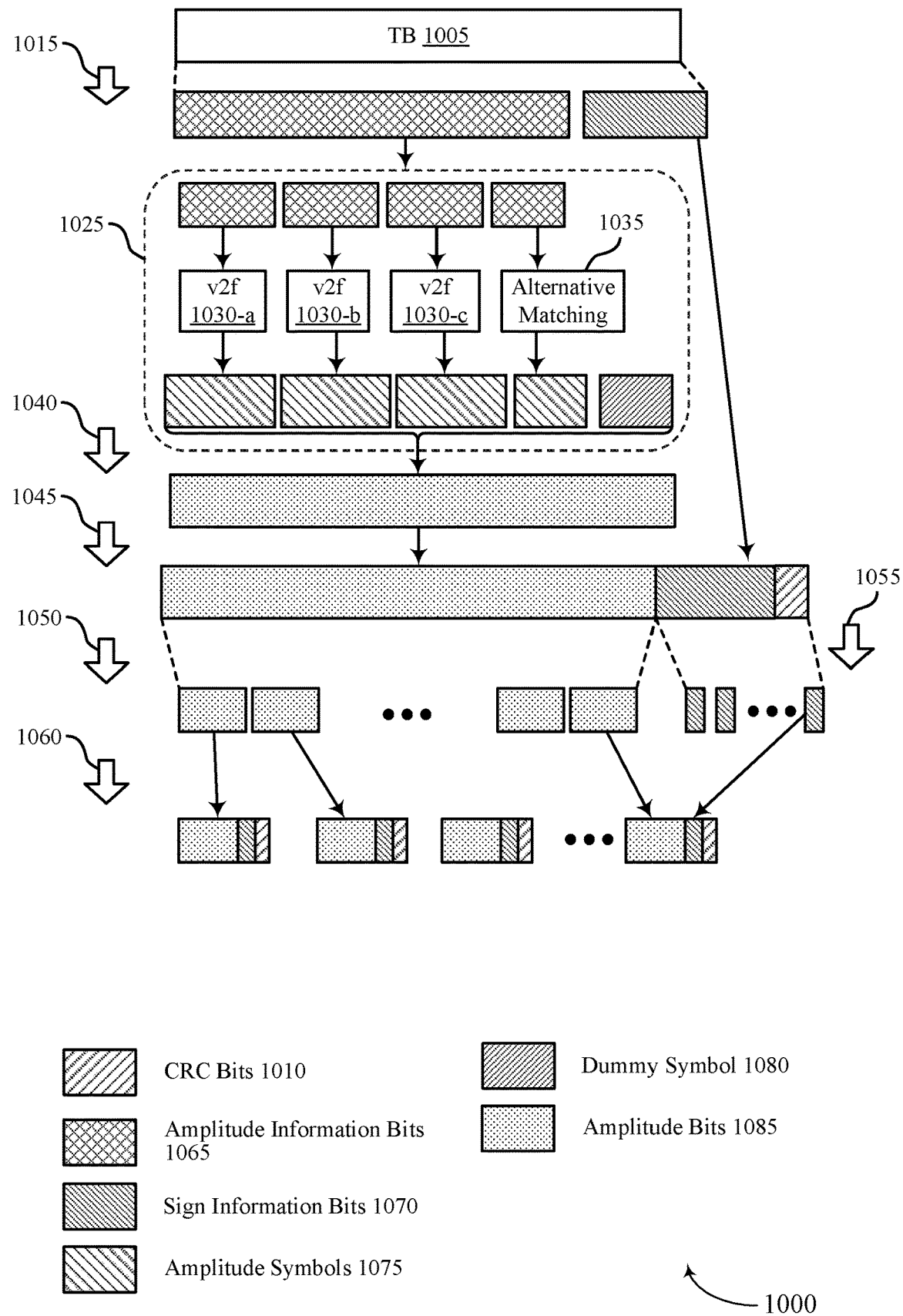
FIG. 10 illustrates an example of a processing flow that supports v2f distribution matching for PCS in wireless communications in accordance with aspects of the present disclosure.

FIG. 10 illustrates an example of a processing flow 1000 that that supports v2f distribution matching for PCS in wireless communications in accordance with aspects of the present disclosure. In some examples, processing flow 1000 may be implemented by aspects of wireless communications system 100 or wireless communications system 200. For example, a transmitting device (e.g., a transmitting device 250) may encode a message for transmission to a receiving device (e.g., a receiving device 260) using PCS according to processing flow 1000. In some examples, the receiving device may perform a decoding operation comprising inverse operations corresponding to the operations of processing flow 1000. Processing flow 1000 may include aspects of an encoding operation 215, an encoding process 300, an encoding process 400, a distribution matching process 500, an encoding process 700, a processing flow 800, an encoding process 900, or any combination thereof.

In some examples, a transmitting device may identify a TB CRC, which may be an example of a TB 210 as described with reference to FIG. 2. At 1015, the transmitting device may perform bit separation as described with reference to 910 of FIG. 9. The transmitting device may thereby split the bits of the TB 1005 into a first subset (including amplitude information bits 1020) and a second subset (including sign information bits 1025). As used in this context, information bits may refer to an unshaped bits—e.g., amplitude information bits 1020 may not yet be shaped, and sign information bits 1025 may also be unshaped. The amplitude information bits 1020 may be an example of the amplitude bits described with reference to 915 of FIG. 9. The sign information bits 1025 may be an example of the sign bits described with reference to 920 of FIG. 9.

At 1025, the transmitting device may perform distribution matching on the amplitude information bits 1065 included in the first subset of bits obtained at 1015, as described with reference to 925 of FIG. 9. For example, the transmitting device may perform distribution matching on the amplitude information bits 1065 using distribution matching process 500. The transmitting device may thereby divide the amplitude information bits 1020 into one or more bit groups, each bit group representing the input bits for a respective distribution matching procedure 1030 (which may be an example of a v2f distribution matching procedure as described with reference to 520 of FIG. 5) or distribution matching procedure 1035 (which may be an example of an alternative distribution matching procedure as described with reference to 550 of FIG. 5). Based on the distribution matching at 1025, the transmitting device may obtain a respective sequence of interim symbols 1075 for each bit group. The transmitting device may also, in some cases, insert one or more dummy symbols 1080 as described with reference to 540 of FIG. 5.

At 1040, the transmitting device may perform symbol-to-bit conversion on the interim symbols 1075 (and dummy symbols 1080, if any) obtained at 1025. The transmitting device may thereby obtain a respective set of amplitude bits 1085 (which may be shaped) for each bit group.

At 1045, the transmitting device may perform bit integration on the sets of amplitude bits 1085 and the sign information bits 1070, as described with reference to 935 of FIG. 9. In some examples, a transmitting device may generate a TB CRC, which may include some quantity of CRC bits 1010, based on the integrated bits obtained at 1045. The transmitting device may attach the TB CRC to the sign information bits 1025 and treat the CRC bits 1010 as sign information bits 1025 for purposes of the subsequent operations of the encoding process 1000.

At 1050 and 1055, the transmitting device may perform CB segmentation for the amplitude bits and sign bits, respectively, as described with reference to 940 and 945 of FIG. 9. The transmitting device may thereby obtain first CB portions that each include a portion of the amplitude bits 1085, along with an equal quantity of second CB portions that each include a portion of the sign information bits 1070.

At 1060 the transmitting device may perform CB construction and CRC attachment, as described with reference to 950 of FIG. 9. The transmitting device may thereby obtain a set of CBs each including a first CB portion of amplitude bits 1040, second CB portion of sign information bits 1025, and a CB CRC comprising one or more CRC bits 1010. Each CB may then be separately subjected to FEC encoding and constellation mapping, as describe with reference to FIG. 4, for example.

Figure 11:
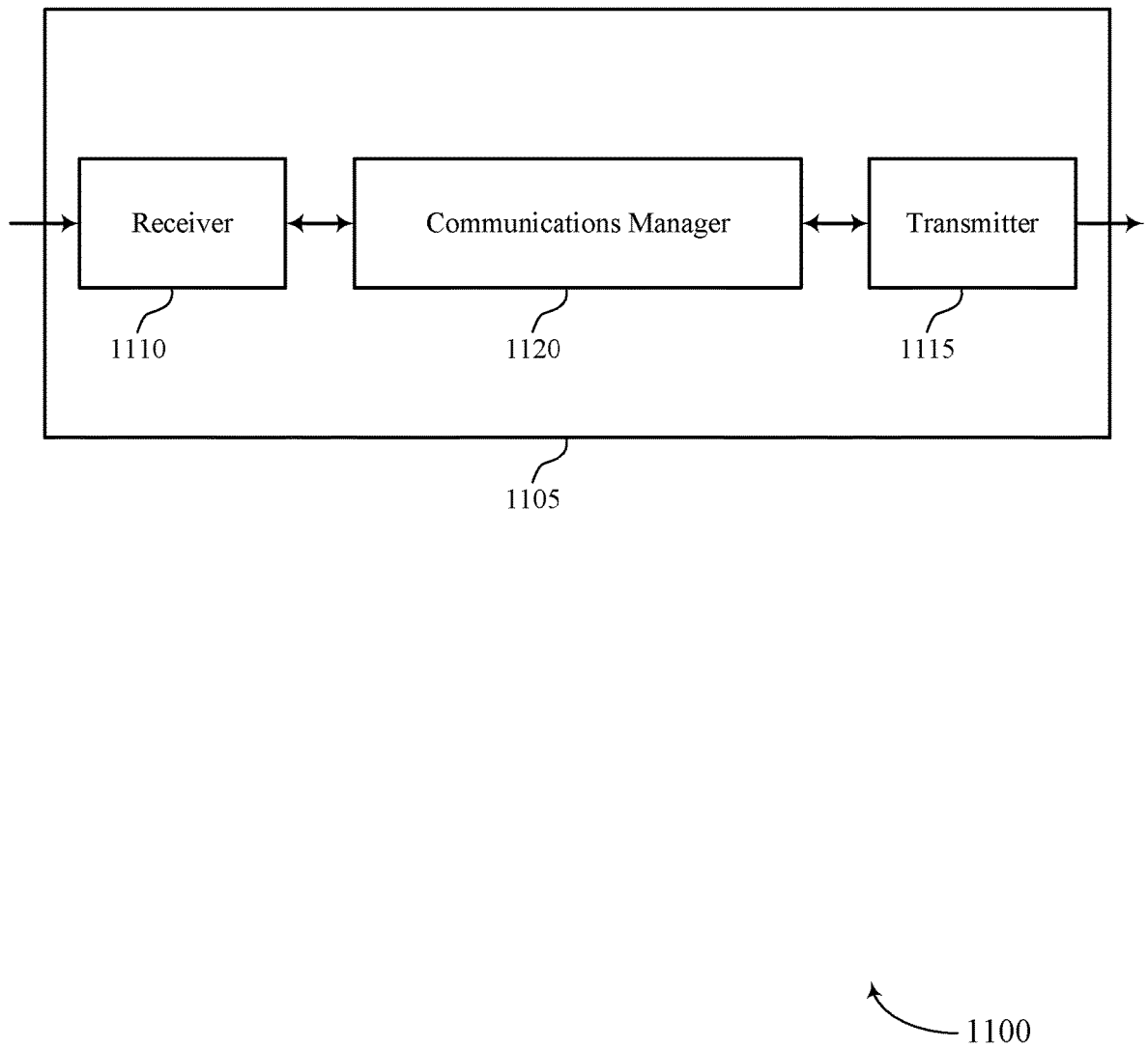
FIGS. 11 and 12 show block diagrams of devices that support v2f distribution matching for PCS in wireless communications in accordance with aspects of the present disclosure.

FIG. 11 shows a block diagram 1100 of a device 1105 that supports v2f distribution matching for PCS in wireless communications in accordance with aspects of the present disclosure. The device 1105 may be an example of aspects of a transmitting device as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to v2f distribution matching for PCS in wireless communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to v2f distribution matching for PCS in wireless communications). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of v2f distribution matching for PCS in wireless communications as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signaling processor (DSP), an application-specific integrated circuit (ASIC), a field-programmable gate-array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a transmitting device in accordance with examples as disclosed herein. For example, the communications manager 1120 may be configured as or otherwise support a means for identifying a set of bits corresponding to a TB for communication to a receiving device. The communications manager 1120 may be configured as or otherwise support a means for performing a first type of distribution matching on a first bit group within the set of bits to obtain a first sequence of interim symbols, where the first type of distribution matching is based on a first non-uniform probability distribution and is associated with a variable ratio of input bits to interim symbols. The communications manager 1120 may be configured as or otherwise support a means for determining, based on performing the first type of distribution matching on the first bit group, a quantity of remaining bits for distribution matching, the quantity of remaining bits included in the set of bits. The communications manager 1120 may be configured as or otherwise support a means for selecting, based on the quantity of remaining bits, a type of distribution matching from among at least the first type of distribution matching and a second type of distribution matching, where the second type of distribution matching is based on a second probability distribution and is associated with a fixed ratio of input bits to interim symbols. The communications manager 1120 may be configured as or otherwise support a means for performing the selected type of distribution matching on a second bit group within the set of bits to obtain a second sequence of interim symbols. The communications manager 1120 may be configured as or otherwise support a means for transmitting symbols representative of the TB to the receiving device, where the symbols are based on the first sequence of interim symbols and the second sequence of interim symbols.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for a transmitting device, such as a base station 105 or a UE 115, to perform iterative distribution matching on bits in a TB, which may cause reduced processing, reduced power consumption, more efficient utilization of communication resources, and the like.

Figure 12:
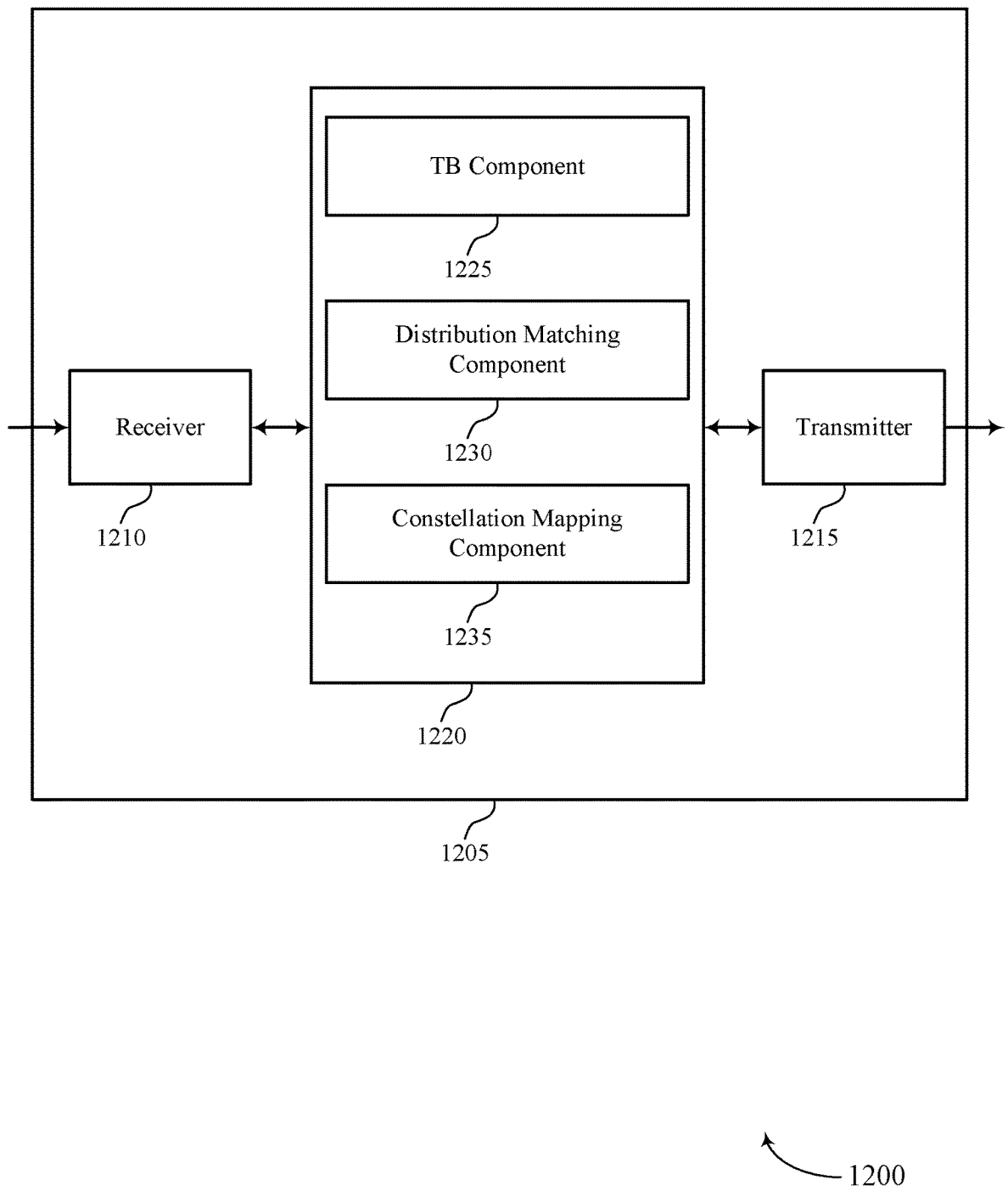

FIG. 12 shows a block diagram 1200 of a device 1205 that supports v2f distribution matching for PCS in wireless communications in accordance with aspects of the present disclosure. The device 1205 may be an example of aspects of a device 1105 or a transmitting device, such as a UE 115 or a base station 105, as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to v2f distribution matching for PCS in wireless communications). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to v2f distribution matching for PCS in wireless communications). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of v2f distribution matching for PCS in wireless communications as described herein. For example, the communications manager 1220 may include a TB component 1225, a distribution matching component 1230, a constellation mapping component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a transmitting device in accordance with examples as disclosed herein. The TB component 1225 may be configured as or otherwise support a means for identifying a set of bits corresponding to a TB for communication to a receiving device. The distribution matching component 1230 may be configured as or otherwise support a means for performing a first type of distribution matching on a first bit group within the set of bits to obtain a first sequence of interim symbols, where the first type of distribution matching is based on a first non-uniform probability distribution and is associated with a variable ratio of input bits to interim symbols. The distribution matching component 1230 may be configured as or otherwise support a means for determining, based on performing the first type of distribution matching on the first bit group, a quantity of remaining bits for distribution matching, the quantity of remaining bits included in the set of bits. The distribution matching component 1230 may be configured as or otherwise support a means for selecting, based on the quantity of remaining bits, a type of distribution matching from among at least the first type of distribution matching and a second type of distribution matching, where the second type of distribution matching is based on a second probability distribution and is associated with a fixed ratio of input bits to interim symbols. The distribution matching component 1230 may be configured as or otherwise support a means for performing the selected type of distribution matching on a second bit group within the set of bits to obtain a second sequence of interim symbols. The constellation mapping component 1235 may be configured as or otherwise support a means for transmitting symbols representative of the TB to the receiving device, where the symbols are based on the first sequence of interim symbols and the second sequence of interim symbols.

Figure 13:
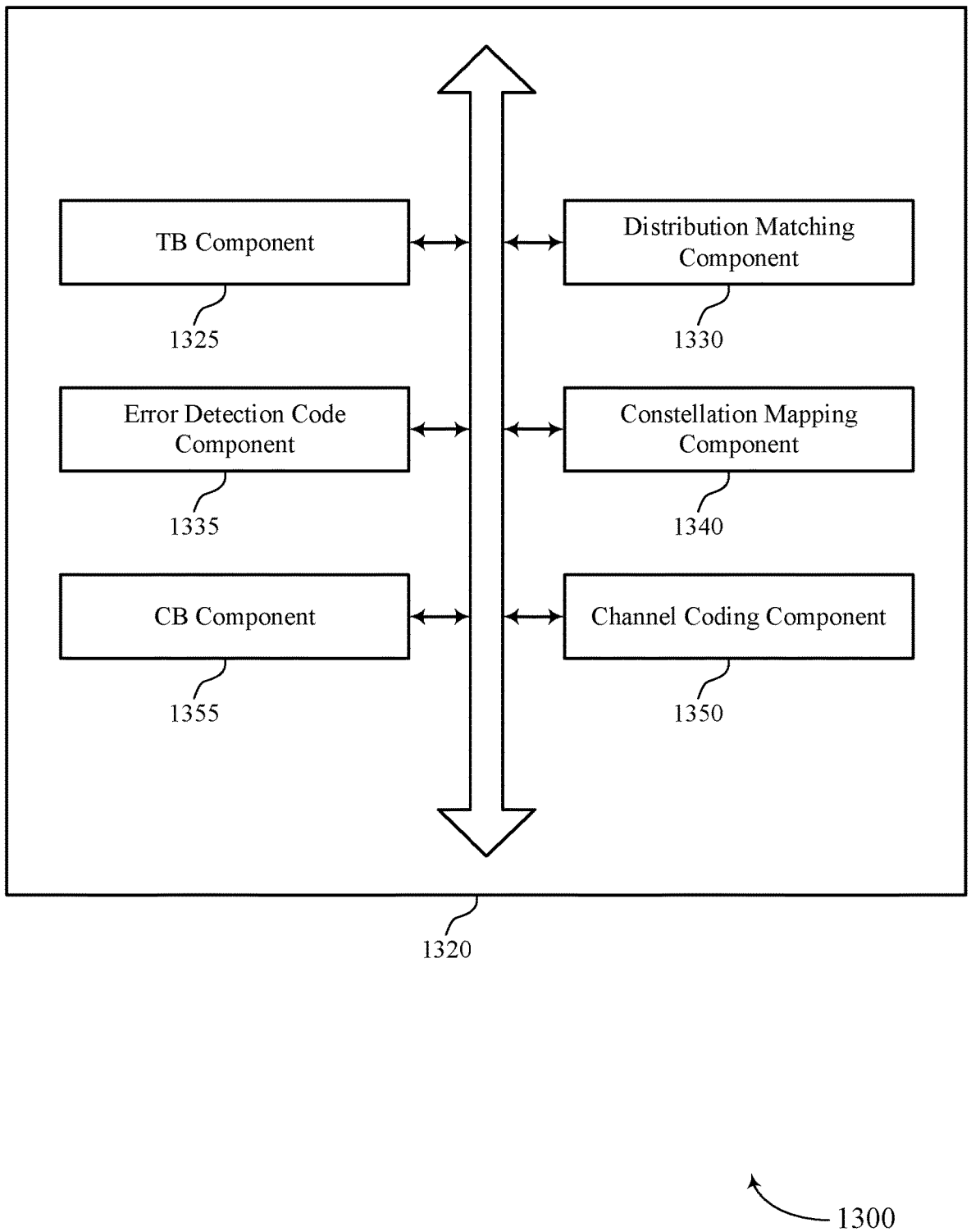
FIG. 13 shows a block diagram of a communications manager that supports v2f distribution matching for PCS in wireless communications in accordance with aspects of the present disclosure.

FIG. 13 shows a block diagram 1300 of a communications manager 1320 that supports v2f distribution matching for PCS in wireless communications in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of v2f distribution matching for PCS in wireless communications as described herein. For example, the communications manager 1320 may include a TB component 1325, a distribution matching component 1330, an error detection code component 1335, constellation mapping component 1340, a channel coding component 1350, a CB component 1355, or any combination thereof. Each of these components may communicate, directly or indirectly, with one another (e.g., via one or more buses).

The communications manager 1320 may support wireless communications at a transmitting device in accordance with examples as disclosed herein. The TB component 1325 may be configured as or otherwise support a means for identifying a set of bits corresponding to a TB for communication to a receiving device. The distribution matching component 1330 may be configured as or otherwise support a means for performing a first type of distribution matching on a first bit group within the set of bits to obtain a first sequence of interim symbols, where the first type of distribution matching is based on a first non-uniform probability distribution and is associated with a variable ratio of input bits to interim symbols. The distribution matching component 1330 may be configured as or otherwise support a means for determining, based on performing the first type of distribution matching on the first bit group, a quantity of remaining bits for distribution matching, the quantity of remaining bits included in the set of bits. In some examples, the distribution matching component 1330 may be configured as or otherwise support a means for selecting, based on the quantity of remaining bits, a type of distribution matching from among at least the first type of distribution matching and a second type of distribution matching, where the second type of distribution matching is based on a second probability distribution and is associated with a fixed ratio of input bits to interim symbols. In some examples, the distribution matching component 1330 may be configured as or otherwise support a means for performing the selected type of distribution matching on a second bit group within the set of bits to obtain a second sequence of interim symbols. The constellation mapping component 1340 may be configured as or otherwise support a means for transmitting symbols representative of the TB to the receiving device, where the symbols are based on the first sequence of interim symbols and the second sequence of interim symbols.

In some examples, the distribution matching component 1330 may be configured as or otherwise support a means for performing one or more additional distribution matching procedures on respective additional bit groups within the set of bits to obtain additional sequences of interim symbols. In some examples, the distribution matching component 1330 may be configured as or otherwise support a means for selecting each of the one or more additional distribution matching procedures based on a respective quantity of remaining bits for distribution matching, where selecting each of the one or more additional distribution matching procedures is from among at least the first type of distribution matching and the second type of distribution matching.

In some examples, to support selecting the type of distribution matching, the distribution matching component 1330 may be configured as or otherwise support a means for determining whether a condition is satisfied, the condition based on the quantity of remaining bits, a minimum quantity of input bits associated with the first type of distribution matching, a difference between a quantity of interim symbols obtained after performing the first type of distribution matching and a target quantity of interim symbols, a quantity of interim symbols associated with one iteration of the first type of distribution matching, a modulation order of the interim symbols, or any combination thereof.

In some examples, the distribution matching component 1330 may be configured as or otherwise support a means for determining, after performing the selected type of distribution matching, that a quantity of interim symbols in a set of interim symbols is less than a target quantity of interim symbols, the set of interim symbols including the first sequence of interim symbols and the second sequence of interim symbols. In some examples, the distribution matching component 1330 may be configured as or otherwise support a means for adding one or more additional interim symbols to the set of interim symbols to satisfy the target quantity of interim symbols.

In some examples, each of the one or more additional interim symbols includes a respective instance of a first candidate symbol included in a pool of candidate interim symbols. In some examples, the first candidate symbol has a smaller amplitude than each other candidate symbol included in the pool of candidate interim symbols.

In some examples, the target quantity of interim symbols is based on a quantity of resource elements used to transmit the symbols, a quantity of transmission layers used to transmit the symbols, a FEC coding rate, or any combination thereof.

In some examples, the TB component 1325 may be configured as or otherwise support a means for dividing the set of bits into a first subset of bits and a second subset of bits, the first subset of bits for distribution matching and including the first bit group and the second bit group. In some examples, the distribution matching component 1330 may be configured as or otherwise support a means for generating a bit sequence based on a sequence of interim symbols corresponding to the first subset of bits, the sequence of interim symbols including the first sequence of interim symbols and the second sequence of interim symbols. In some examples, the constellation mapping component 1340 may be configured as or otherwise support a means for mapping the bit sequence and the second subset of bits to the symbols based on a symbol constellation, where the symbol constellation is based on amplitude and sign, and where the symbols have amplitudes based on the bit sequence and signs based on the second subset of bits.

In some examples, the CB component 1355 may be configured as or otherwise support a means for dividing the bit sequence into a set of multiple first CB portions. In some examples, the CB component 1355 may be configured as or otherwise support a means for dividing the second subset of bits into a set of multiple second CB portions, where a quantity of first CB portions in the set of multiple first CB portions is equal to a quantity of second CB portions in the set of multiple second CB portions. In some examples, the CB component 1355 may be configured as or otherwise support a means for generating a set of CBs for the TB, where each CB of the set of CBs includes a respective first CB portion and a respective second CB portion.

In some examples, the channel coding component 1350 may be configured as or otherwise support a means for performing FEC encoding on each CB of the set of CBs to obtain a set of encoded CBs. In some examples, each encoded CB of the set of encoded CBs includes a respective first set of systematic bits corresponding to the respective first CB portion of a corresponding CB, a respective second set of systematic bits corresponding to the respective second CB portion of the corresponding CB, a respective third set of systematic bits corresponding to an error detection code for the corresponding CB, and one or more respective parity bits. In some examples, the constellation mapping component 1340 may be configured as or otherwise support a means for mapping each encoded CB of the set of encoded CBs to a respective subset of the symbols, symbols within the respective subset of the symbols having amplitudes based on the respective first set of systematic bits for the corresponding encoded CB and signs based on the respective second set of systematic bits for the corresponding encoded CB, the respective third set of systematic bits for the corresponding encoded CB, the one or more respective parity bits for the corresponding encoded CB, or any combination thereof.

In some examples, the error detection code component 1335 may be configured as or otherwise support a means for generating an error detection code for the TB before performing the first type of distribution matching, where the error detection code is based on a portion of the set of bits, and where the error detection code is included in the set of bits.

In some examples, the error detection code component 1335 may be configured as or otherwise support a means for generating an error detection code for the TB after performing the selected type of distribution matching, where the error detection code is based on a bit sequence that corresponds to a sequence of interim symbols, the sequence of interim symbols including the first sequence of interim symbols and the second sequence of interim symbols.

In some examples, the symbols have signs based on one or more bits included in the error detection code for the TB.

In some examples, a quantity of bits in the set of bits is based on a quantity of resource elements used to transmit the symbols, a quantity of transmission layers used to transmit the symbols, a modulation order for the symbols, a FEC coding rate, an average coding rate associated with the first type of distribution matching and the second type of distribution matching, or any combination thereof.

In some examples, the second probability distribution is a second non-uniform probability distribution.

In some examples, the second probability distribution is a uniform probability distribution.

Figure 14:
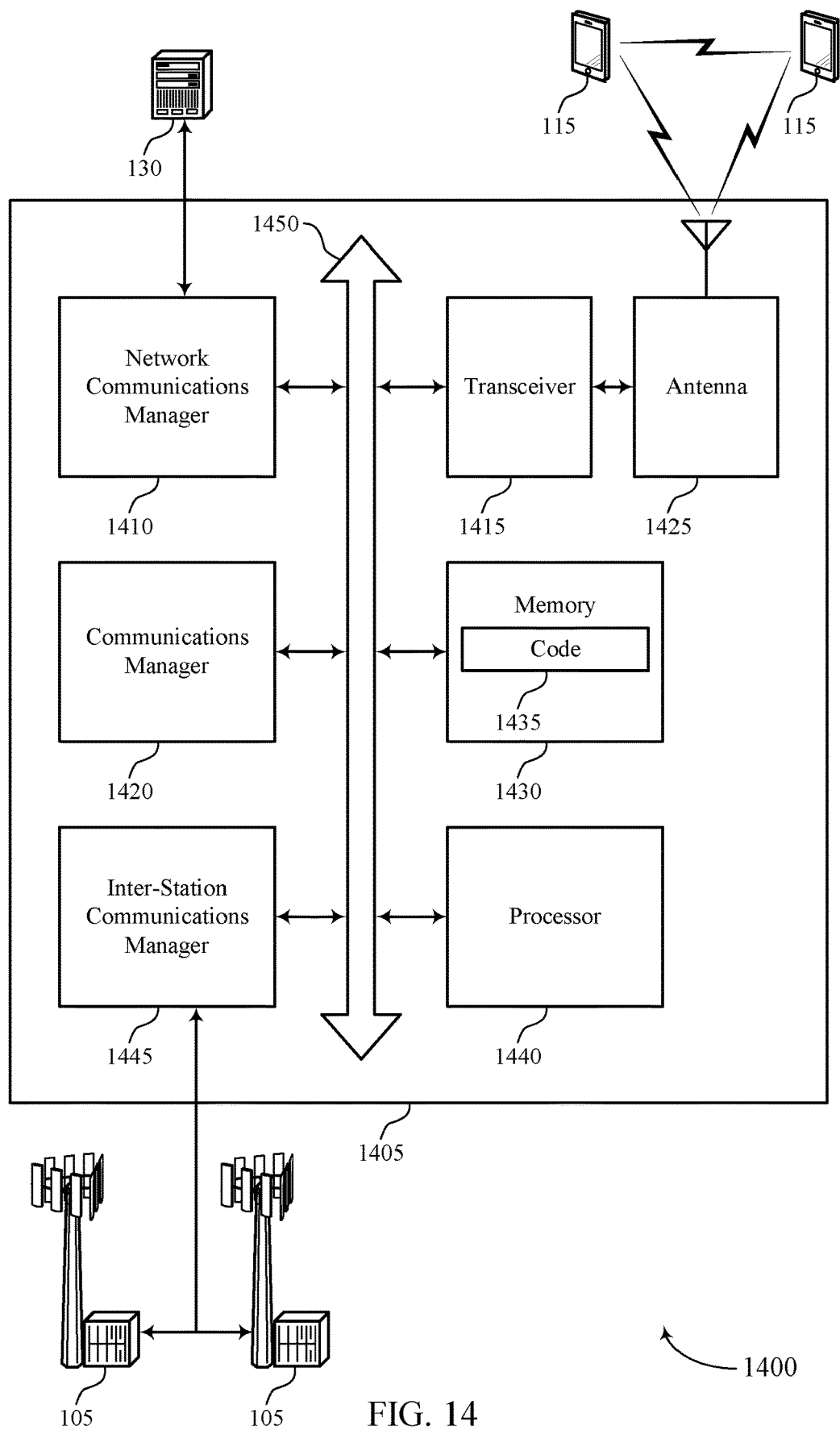
FIG. 14 shows a diagram of a system including a device that supports v2f distribution matching for PCS in wireless communications in accordance with aspects of the present disclosure.

FIG. 14 shows a diagram of a system 1400 including a device 1405 that supports v2f distribution matching for PCS in wireless communications in accordance with aspects of the present disclosure. The device 1405 may be an example of or include the components of a device 1105, a device 1205, or a transmitting device as described herein. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random-access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting v2f distribution matching for PCS in wireless communications). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a transmitting device in accordance with examples as disclosed herein. For example, the communications manager 1420 may be configured as or otherwise support a means for identifying a set of bits corresponding to a TB for communication to a receiving device. The communications manager 1420 may be configured as or otherwise support a means for performing a first type of distribution matching on a first bit group within the set of bits to obtain a first sequence of interim symbols, where the first type of distribution matching is based on a first non-uniform probability distribution and is associated with a variable ratio of input bits to interim symbols. The communications manager 1420 may be configured as or otherwise support a means for determining, based on performing the first type of distribution matching on the first bit group, a quantity of remaining bits for distribution matching, the quantity of remaining bits included in the set of bits. The communications manager 1420 may be configured as or otherwise support a means for selecting, based on the quantity of remaining bits, a type of distribution matching from among at least the first type of distribution matching and a second type of distribution matching, where the second type of distribution matching is based on a second probability distribution and is associated with a fixed ratio of input bits to interim symbols. The communications manager 1420 may be configured as or otherwise support a means for performing the selected type of distribution matching on a second bit group within the set of bits to obtain a second sequence of interim symbols. The communications manager 1420 may be configured as or otherwise support a means for transmitting symbols representative of the TB to the receiving device, where the symbols are based on the first sequence of interim symbols and the second sequence of interim symbols.

By including or configuring the communications manager 1420 in accordance with examples as described herein, the device 1405 may support techniques for a transmitting device, such as a base station 105 or a UE 115, to perform iterative distribution matching on bits in a TB, which may cause improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 1420 may be configured to perform various operations (e.g., receiving, monitoring, transmitting) using or otherwise in cooperation with the transceiver 1415, the one or more antennas 1425, or any combination thereof (e.g., the communications manager 1420 may be configured to transmit or receive signals or messages described herein via the transceiver 1415). Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of v2f distribution matching for PCS in wireless communications as described herein, or the processor 1440 and the memory 1430 may be otherwise configured to perform or support such operations.

Figure 15:
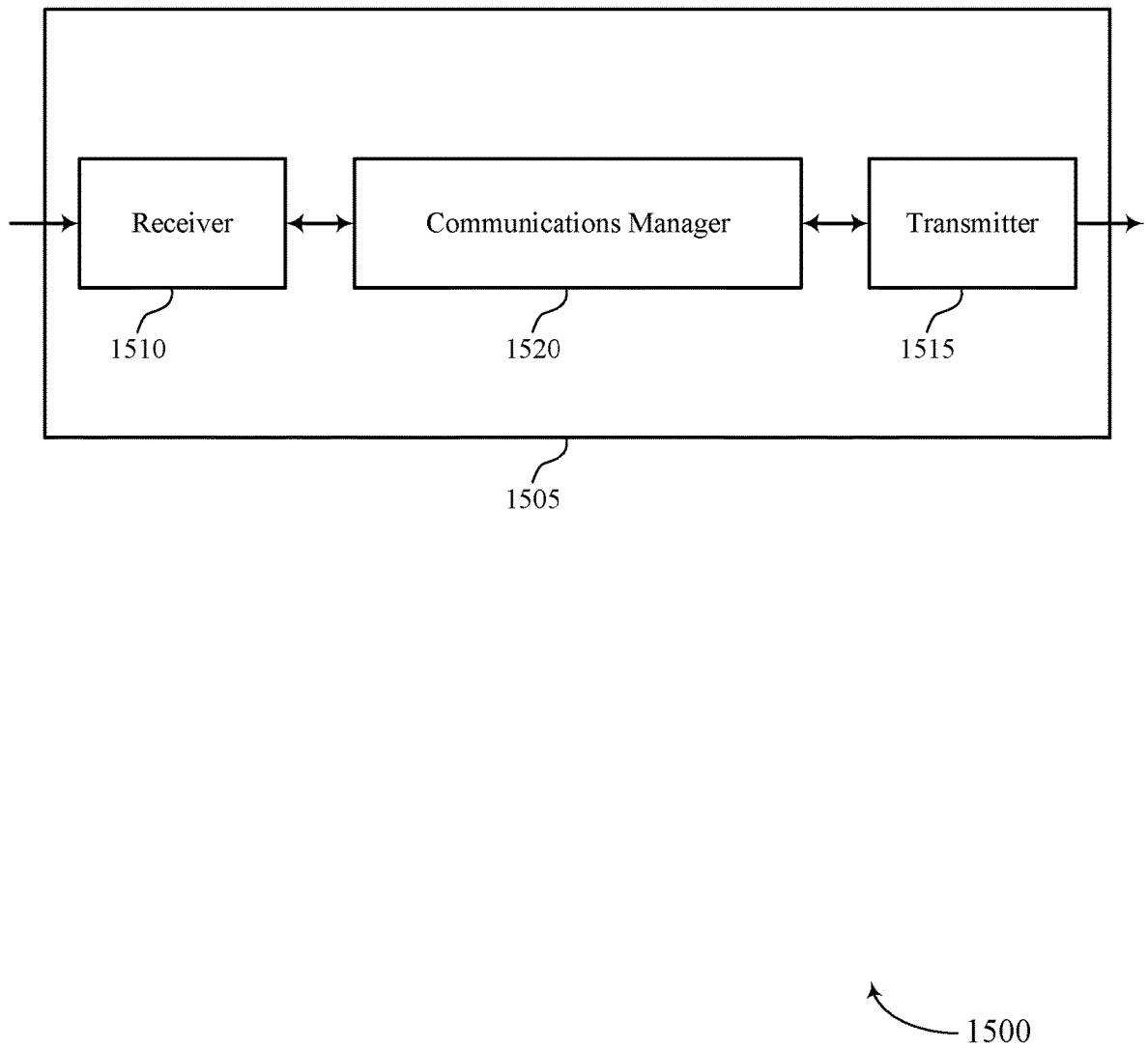
FIGS. 15 and 16 show block diagrams of devices that support v2f distribution matching for PCS in wireless communications in accordance with aspects of the present disclosure.

FIG. 15 shows a block diagram 1500 of a device 1505 that supports v2f distribution matching for PCS in wireless communications in accordance with aspects of the present disclosure. The device 1505 may be an example of aspects of a receiving device as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to v2f distribution matching for PCS in wireless communications). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to v2f distribution matching for PCS in wireless communications). In some examples, the transmitter 1515 may be co-located with a receiver 1510 in a transceiver module. The transmitter 1515 may utilize a single antenna or a set of multiple antennas.

The communications manager 1520, the receiver 1510, the transmitter 1515, or various combinations thereof or various components thereof may be examples of means for performing various aspects of v2f distribution matching for PCS in wireless communications as described herein. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1520, the receiver 1510, the transmitter 1515, or various combinations or components thereof may be implemented in code (e.g., as communications management software or firmware) executed by a processor. If implemented in code executed by a processor, the functions of the communications manager 1520, the receiver 1510, the transmitter 1515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1520 may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communications at a receiving device in accordance with examples as disclosed herein. For example, the communications manager 1520 may be configured as or otherwise support a means for receiving symbols corresponding to a TB, the TB corresponding to a set of bits. The communications manager 1520 may be configured as or otherwise support a means for mapping the symbols to a bit sequence and a second subset of bits. The communications manager 1520 may be configured as or otherwise support a means for converting the bit sequence to a sequence of interim symbols. The communications manager 1520 may be configured as or otherwise support a means for performing a first type of distribution dematching on a first sequence of interim symbols within the sequence of interim symbols to obtain a first bit group, where the first type of distribution dematching is based on a first non-uniform probability distribution and is associated with a variable ratio of interim symbols to output bits. The communications manager 1520 may be configured as or otherwise support a means for determining, based on performing the first type of distribution dematching on the first sequence of interim symbols, a quantity of remaining bits based on a difference between a target quantity of bits and a first quantity of bits within the first bit group. The communications manager 1520 may be configured as or otherwise support a means for selecting, based on the quantity of remaining bits, a type of distribution dematching from among at least the first type of distribution dematching and a second type of distribution dematching, where the second type of distribution dematching is based on a second probability distribution and is associated with a fixed ratio of interim symbols to output bits. The communications manager 1520 may be configured as or otherwise support a means for performing the selected type of distribution matching on a second sequence of interim symbols within the sequence of interim symbols to obtain a second bit group. The communications manager 1520 may be configured as or otherwise support a means for combining the first bit group and the second bit group with the second subset of bits to obtain at least a portion of the set of bits corresponding to the TB.

By including or configuring the communications manager 1520 in accordance with examples as described herein, the device 1505 (e.g., a processor controlling or otherwise coupled to the receiver 1510, the transmitter 1515, the communications manager 1520, or a combination thereof) may support techniques for a transmitting device, such as a base station 105 or a UE 115, to perform iterative distribution matching on bits in a TB, which may cause reduced processing, reduced power consumption, more efficient utilization of communication resources, and the like.

Figure 16:
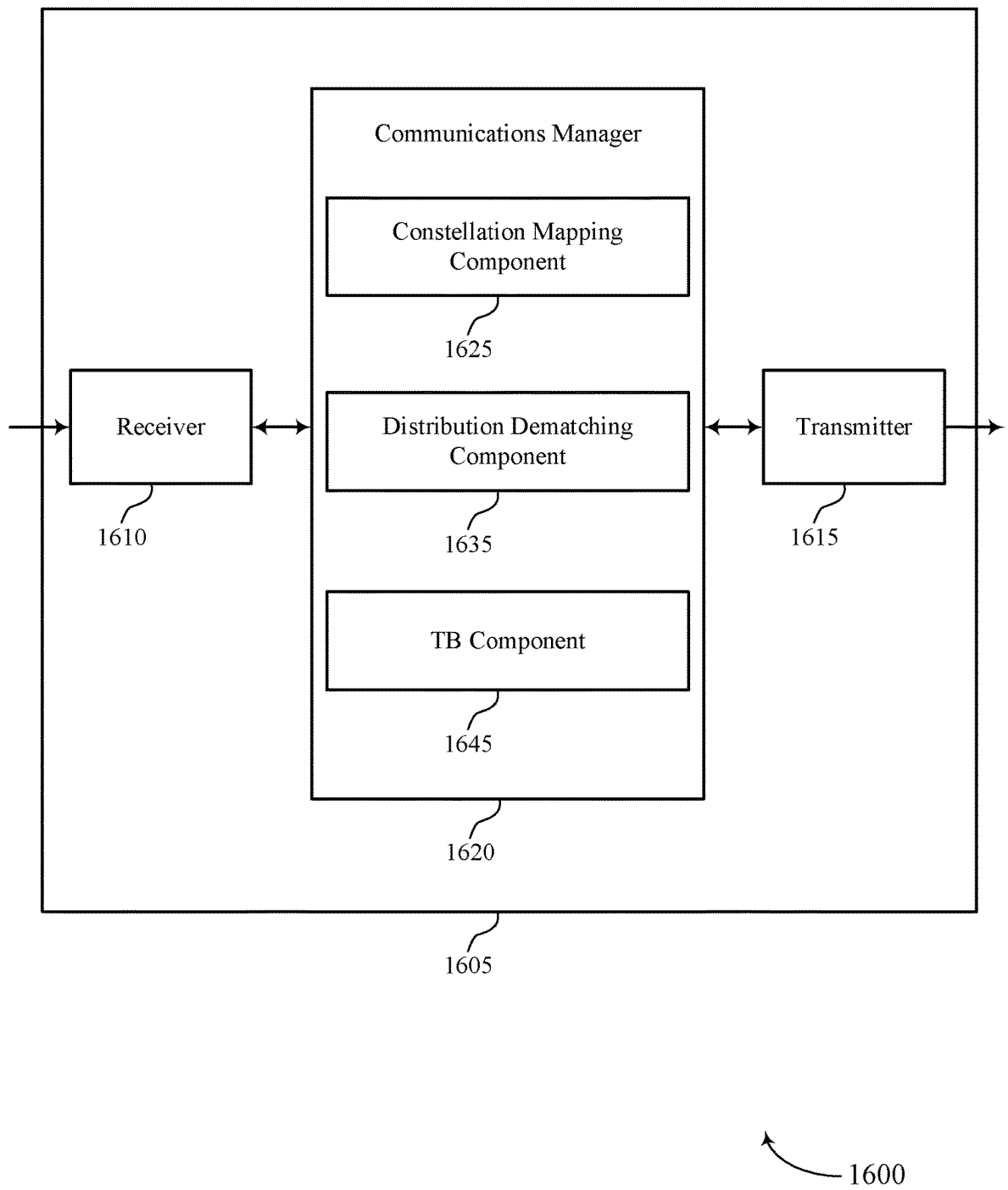

FIG. 16 shows a block diagram 1600 of a device 1605 that supports v2f distribution matching for PCS in wireless communications in accordance with aspects of the present disclosure. The device 1605 may be an example of aspects of a device 1505 or a receiving device, such as a UE 115 or a base station 105, as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to v2f distribution matching for PCS in wireless communications). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to v2f distribution matching for PCS in wireless communications). In some examples, the transmitter 1615 may be co-located with a receiver 1610 in a transceiver module. The transmitter 1615 may utilize a single antenna or a set of multiple antennas.

The device 1605, or various components thereof, may be an example of means for performing various aspects of v2f distribution matching for PCS in wireless communications as described herein. For example, the communications manager 1620 may include a constellation mapping component 1625, a distribution dematching component 1635, a TB component 1645, or any combination thereof. The communications manager 1620 may be an example of aspects of a communications manager 1520 as described herein. In some examples, the communications manager 1620, or various components thereof, may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The communications manager 1620 may support wireless communications at a receiving device in accordance with examples as disclosed herein. The constellation mapping component 1625 may be configured as or otherwise support a means for receiving symbols corresponding to a TB, the TB corresponding to a set of bits. The constellation mapping component 1625 may be configured as or otherwise support a means for mapping the symbols to a bit sequence and a second subset of bits. The distribution dematching component 1635 may be configured as or otherwise support a means for converting the bit sequence to a sequence of interim symbols. The distribution dematching component 1635 may be configured as or otherwise support a means for performing a first type of distribution dematching on a first sequence of interim symbols within the sequence of interim symbols to obtain a first bit group, where the first type of distribution dematching is based on a first non-uniform probability distribution and is associated with a variable ratio of interim symbols to output bits. The distribution dematching component 1635 may be configured as or otherwise support a means for determining, based on performing the first type of distribution dematching on the first sequence of interim symbols, a quantity of remaining bits based on a difference between a target quantity of bits and a first quantity of bits within the first bit group. The distribution dematching component 1635 may be configured as or otherwise support a means for selecting, based on the quantity of remaining bits, a type of distribution dematching from among at least the first type of distribution dematching and a second type of distribution dematching, where the second type of distribution dematching is based on a second probability distribution and is associated with a fixed ratio of interim symbols to output bits. The distribution dematching component 1635 may be configured as or otherwise support a means for performing the selected type of distribution matching on a second sequence of interim symbols within the sequence of interim symbols to obtain a second bit group. The TB component 1645 may be configured as or otherwise support a means for combining the first bit group and the second bit group with the second subset of bits to obtain at least a portion of the set of bits corresponding to the TB.

Figure 17:
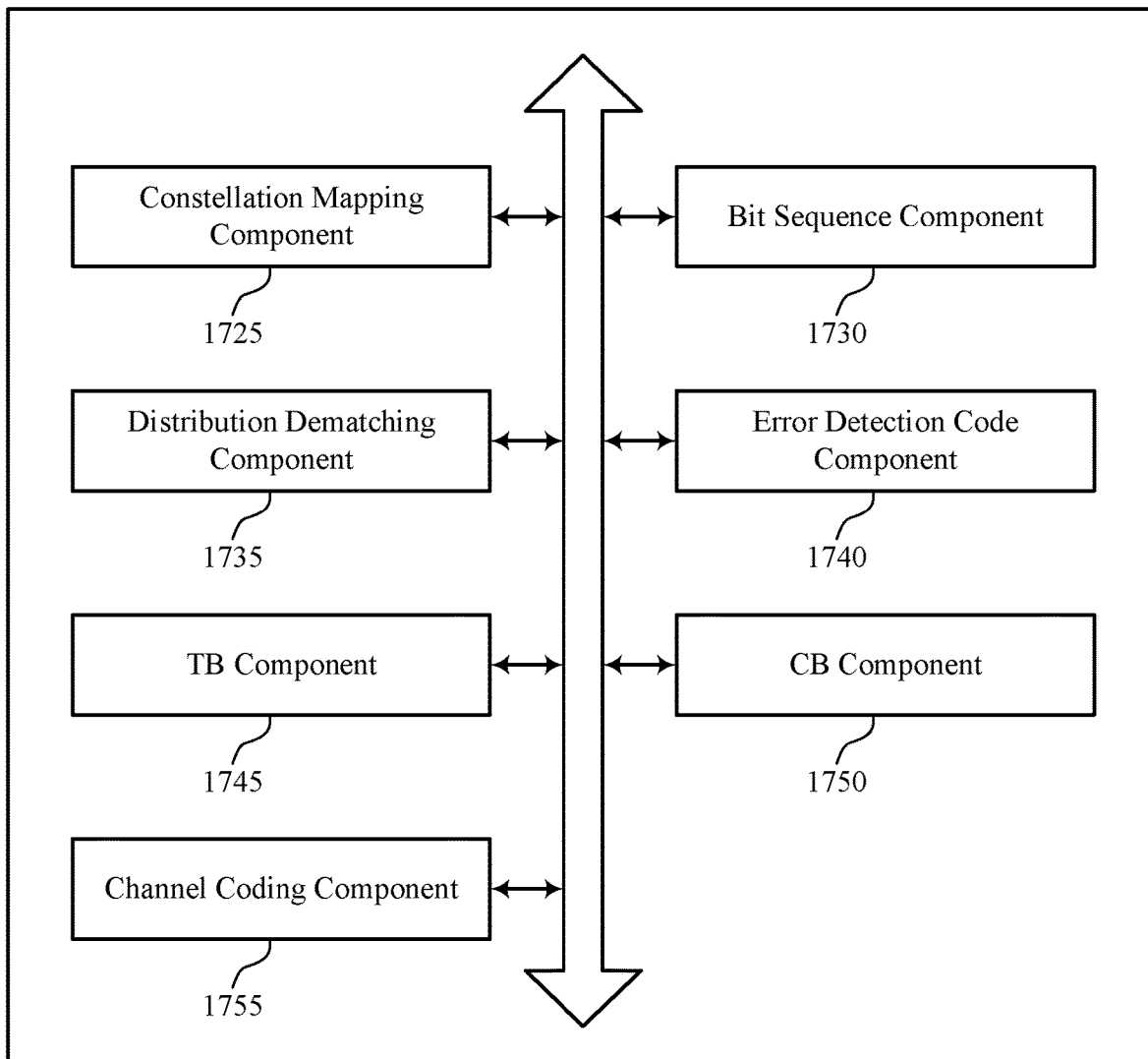
FIG. 17 shows a block diagram of a communications manager that supports v2f distribution matching for PCS in wireless communications in accordance with aspects of the present disclosure.

FIG. 17 shows a block diagram 1700 of a communications manager 1720 that supports v2f distribution matching for PCS in wireless communications in accordance with aspects of the present disclosure. The communications manager 1720 may be an example of aspects of a communications manager 1520, a communications manager 1620, or both, as described herein. The communications manager 1720, or various components thereof, may be an example of means for performing various aspects of v2f distribution matching for PCS in wireless communications as described herein. For example, the communications manager 1720 may include a constellation mapping component 1725, a bit sequence component 1730, a distribution dematching component 1735, an error detection code component 1740, a TB component 1745, a CB component 1750, a channel coding component 1755, or any combination thereof. Each of these components may communicate, directly or indirectly, with one another (e.g., via one or more buses).

The communications manager 1720 may support wireless communications at a receiving device in accordance with examples as disclosed herein. The constellation mapping component 1725 may be configured as or otherwise support a means for receiving symbols corresponding to a TB, the TB corresponding to a set of bits. The bit constellation mapping component 1725 may be configured as or otherwise support a means for mapping the symbols to a bit sequence and a second subset of bits. In some examples, the distribution dematching component 1735 may be configured as or otherwise support a means for converting the bit sequence to a sequence of interim symbols. The distribution dematching component 1735 may be configured as or otherwise support a means for performing a first type of distribution dematching on a first sequence of interim symbols within the sequence of interim symbols to obtain a first bit group, where the first type of distribution dematching is based on a first non-uniform probability distribution and is associated with a variable ratio of interim symbols to output bits. The distribution dematching component 1735 may be configured as or otherwise support a means for determining, based on performing the first type of distribution dematching on the first sequence of interim symbols, a quantity of remaining bits based on a difference between a target quantity of bits and a first quantity of bits within the first bit group. In some examples, the distribution dematching component 1735 may be configured as or otherwise support a means for selecting, based on the quantity of remaining bits, a type of distribution dematching from among at least the first type of distribution dematching and a second type of distribution dematching, where the second type of distribution dematching is based on a second probability distribution and is associated with a fixed ratio of interim symbols to output bits. In some examples, the distribution dematching component 1735 may be configured as or otherwise support a means for performing the selected type of distribution matching on a second sequence of interim symbols within the sequence of interim symbols to obtain a second bit group. The TB component 1745 may be configured as or otherwise support a means for combining the first bit group and the second bit group with the second subset of bits to obtain at least a portion of the set of bits corresponding to the TB.

In some examples, the distribution dematching component 1735 may be configured as or otherwise support a means for performing one or more additional distribution dematching procedures on one more additional sequences of interim symbols within the sequence of interim symbols to obtain one or more additional bit groups. In some examples, the distribution dematching component 1735 may be configured as or otherwise support a means for selecting each of the one or more additional distribution dematching procedures based on a respective quantity of remaining bits, where selecting each of the one or more additional distribution dematching procedures is from among at least the first type of distribution dematching and the second type of distribution dematching.

In some examples, to support selecting the type of distribution dematching, the distribution dematching component 1735 may be configured as or otherwise support a means for determining whether a condition is satisfied, the condition based on the quantity of remaining bits, a minimum quantity of output bits associated with the first type of distribution dematching, a difference between a quantity of interim symbols within the sequence of interim symbols and a quantity of interim symbols within the first sequence of interim symbols, a quantity of interim symbols associated with one iteration of the first type of distribution dematching, a modulation order of the sequence of interim symbols, or any combination thereof.

In some examples, the distribution dematching component 1735 may be configured as or otherwise support a means for determining, after performing the selected type of distribution matching, that a quantity of output bits in a set of output bits satisfies the target quantity of bits, the set of output bits including the first bit group and the second bit group. In some examples, the distribution dematching component 1735 may be configured as or otherwise support a means for discarding one or more additional interim symbols within the sequence of interim symbols based on the quantity of output bits satisfying the target quantity of bits.

In some examples, the bit sequence component 1730 may be configured as or otherwise support a means for combining the first bit group with the second bit group to obtain at least a portion of a first subset of bits, where. In some examples, the first subset of bits is within the set of bits and corresponds to the bit sequence. In some examples, combining the first bit group and the second bit group with the second subset of bits includes combining the first subset of bits with the second subset of bits based on a bit order for the set of bits.

In some examples, the mapping by the constellation mapping component 1725 is based on a symbol constellation that is based on amplitude and sign. In some examples, the symbols have amplitudes based on the bit sequence and signs based on the second subset of bits.

In some examples, the error detection code component 1740 may be configured as or otherwise support a means for checking an error detection code for the TB after the distribution dematching component 1735 performs the selected type of distribution dematching, where the error detection code is included in the set of bits.

In some examples, the error detection code component 1740 may be configured as or otherwise support a means for checking an error detection code for the TB before the distribution dematching component 1735 performs the first type of distribution dematching, where the symbols have signs based on the error detection code for the TB.

In some examples, to support mapping the symbols to the bit sequence and the second subset of bits, the CB component 1750 may be configured as or otherwise support a means for dividing the symbols into subsets of symbols each corresponding to a respective CB of a set of CBs for the TB. In some examples, to support mapping the symbols to the bit sequence and the second subset of bits, the CB component 1750 may be configured as or otherwise support a means for mapping each of the subsets of symbols to bits corresponding to the respective CB of the set of CBs, where each CB of the set of CBs includes a respective portion of the bit sequence and a respective portion of the second subset of bits.

In some examples, the channel coding component 1755 may be configured as or otherwise support a means for performing FEC decoding on each encoded CB of a set of encoded CBs to obtain the set of CBs. In some examples, each encoded CB of the set of encoded CBs includes a respective first set of systematic bits corresponding to the respective first CB portion of a corresponding CB, a respective second set of systematic bits corresponding to the respective second CB portion of the corresponding CB, a respective third set of systematic bits corresponding to an error detection code for the corresponding CB, and one or more respective parity bits.

Figure 18:
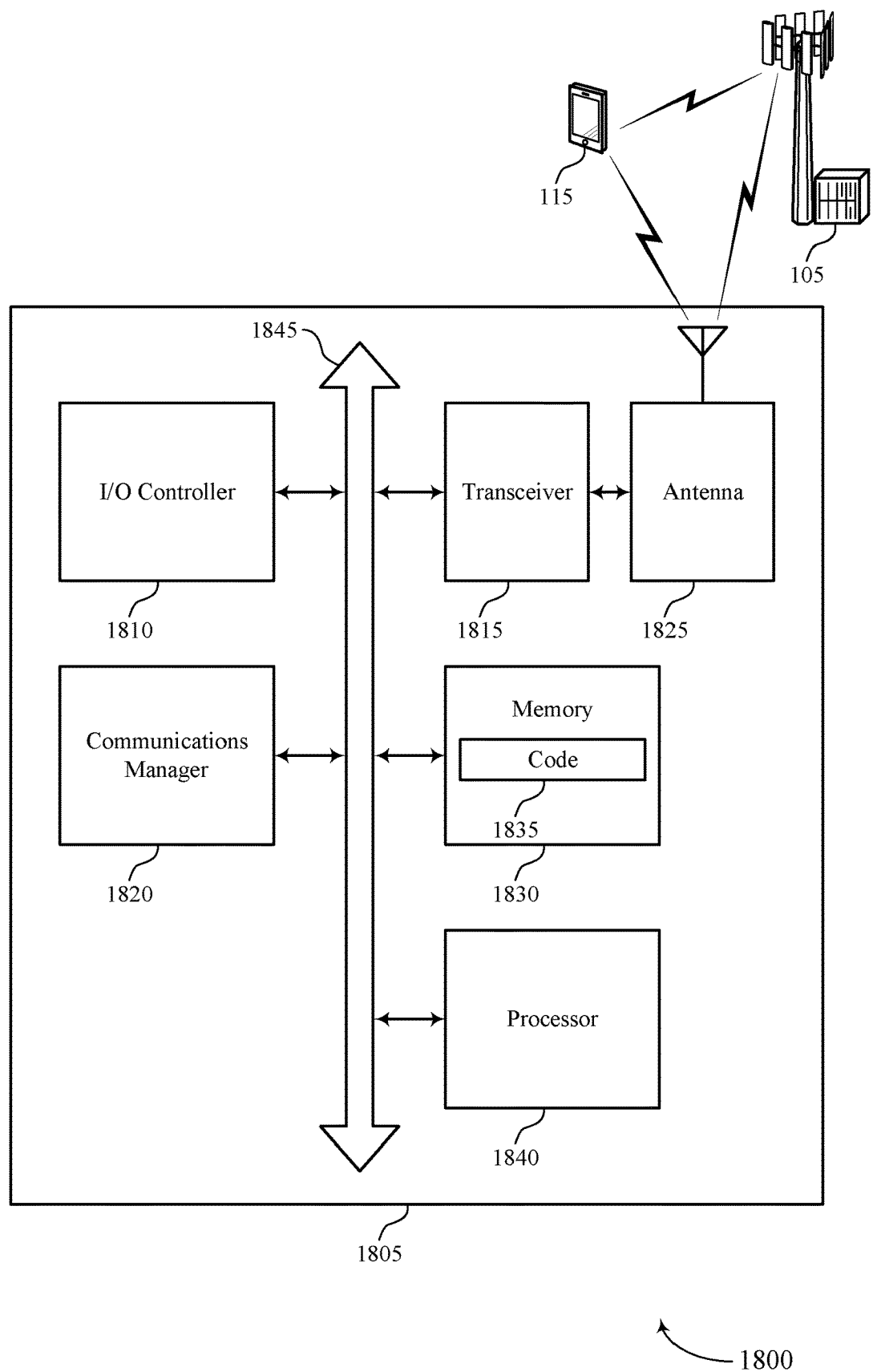
FIG. 18 shows a diagram of a system including a device that supports v2f distribution matching for PCS in wireless communications in accordance with aspects of the present disclosure.

FIG. 18 shows a diagram of a system 1800 including a device 1805 that supports v2f distribution matching for PCS in wireless communications in accordance with aspects of the present disclosure. The device 1805 may be an example of or include the components of a device 1505, a device 1605, or a receiving device as described herein. The device 1805 may include components for bi-directional voice and data communications including components for transmitting and receiving communications, such as a communications manager 1820, an I/O controller 1810, a transceiver 1815, an antenna 1825, a memory 1830, code 1835, and a processor 1840. These components may be in electronic communication or otherwise coupled (e.g., operatively, communicatively, functionally, electronically, electrically) via one or more buses (e.g., a bus 1845).

The I/O controller 1810 may manage input and output signals for the device 1805. The I/O controller 1810 may also manage peripherals not integrated into the device 1805. In some cases, the I/O controller 1810 may represent a physical connection or port to an external peripheral. In some cases, the I/O controller 1810 may utilize an operating system such as iOS®, ANDROID®, MS-DOS®, MS-WINDOWS®, OS/2®, UNIX®, LINUX®, or another known operating system. Additionally or alternatively, the I/O controller 1810 may represent or interact with a modem, a keyboard, a mouse, a touchscreen, or a similar device. In some cases, the I/O controller 1810 may be implemented as part of a processor, such as the processor 1840. In some cases, a user may interact with the device 1805 via the I/O controller 1810 or via hardware components controlled by the I/O controller 1810.

In some cases, the device 1805 may include a single antenna 1825. However, in some other cases, the device 1805 may have more than one antenna 1825, which may be capable of concurrently transmitting or receiving multiple wireless transmissions. The transceiver 1815 may communicate bi-directionally, via the one or more antennas 1825, wired, or wireless links as described herein. For example, the transceiver 1815 may represent a wireless transceiver and may communicate bi-directionally with another wireless transceiver. The transceiver 1815 may also include a modem to modulate the packets, to provide the modulated packets to one or more antennas 1825 for transmission, and to demodulate packets received from the one or more antennas 1825. The transceiver 1815, or the transceiver 1815 and one or more antennas 1825, may be an example of a transmitter 1515, a transmitter 1615, a receiver 1510, a receiver 1610, or any combination thereof or component thereof, as described herein.

The memory 1830 may include RAM and ROM. The memory 1830 may store computer-readable, computer-executable code 1835 including instructions that, when executed by the processor 1840, cause the device 1805 to perform various functions described herein. The code 1835 may be stored in a non-transitory computer-readable medium such as system memory or another type of memory. In some cases, the code 1835 may not be directly executable by the processor 1840 but may cause a computer (e.g., when compiled and executed) to perform functions described herein. In some cases, the memory 1830 may contain, among other things, a BIOS which may control basic hardware or software operation such as the interaction with peripheral components or devices.

The processor 1840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some other cases, a memory controller may be integrated into the processor 1840. The processor 1840 may be configured to execute computer-readable instructions stored in a memory (e.g., the memory 1830) to cause the device 1805 to perform various functions (e.g., functions or tasks supporting v2f distribution matching for PCS in wireless communications). For example, the device 1805 or a component of the device 1805 may include a processor 1840 and memory 1830 coupled to the processor 1840, the processor 1840 and memory 1830 configured to perform various functions described herein.

The communications manager 1820 may support wireless communications at a receiving device in accordance with examples as disclosed herein. For example, the communications manager 1820 may be configured as or otherwise support a means for receiving symbols corresponding to a TB, the TB corresponding to a set of bits. The communications manager 1820 may be configured as or otherwise support a means for mapping the symbols to a bit sequence and a second subset of bits. The communications manager 1820 may be configured as or otherwise support a means for converting the bit sequence to a sequence of interim symbols. The communications manager 1820 may be configured as or otherwise support a means for performing a first type of distribution dematching on a first sequence of interim symbols within the sequence of interim symbols to obtain a first bit group, where the first type of distribution dematching is based on a first non-uniform probability distribution and is associated with a variable ratio of interim symbols to output bits. The communications manager 1820 may be configured as or otherwise support a means for determining, based on performing the first type of distribution dematching on the first sequence of interim symbols, a quantity of remaining bits based on a difference between a target quantity of bits and a first quantity of bits within the first bit group. The communications manager 1820 may be configured as or otherwise support a means for selecting, based on the quantity of remaining bits, a type of distribution dematching from among at least the first type of distribution dematching and a second type of distribution dematching, where the second type of distribution dematching is based on a second probability distribution and is associated with a fixed ratio of interim symbols to output bits. The communications manager 1820 may be configured as or otherwise support a means for performing the selected type of distribution matching on a second sequence of interim symbols within the sequence of interim symbols to obtain a second bit group. The communications manager 1820 may be configured as or otherwise support a means for combining the first bit group and the second bit group with the second subset of bits to obtain at least a portion of the set of bits corresponding to the TB.

By including or configuring the communications manager 1820 in accordance with examples as described herein, the device 1805 may support techniques for a transmitting device, such as a base station 105 or a UE 115, to perform iterative distribution matching on bits in a TB, which may cause improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 1820 may be configured to perform various operations (e.g., receiving, monitoring, transmitting) using or otherwise in cooperation with the transceiver 1815, the one or more antennas 1825, or any combination thereof (e.g., the communications manager 1820 may be configured to transmit or receive signals or messages described herein via the transceiver 1815). Although the communications manager 1820 is illustrated as a separate component, in some examples, one or more functions described with reference to the communications manager 1820 may be supported by or performed by the processor 1840, the memory 1830, the code 1835, or any combination thereof. For example, the code 1835 may include instructions executable by the processor 1840 to cause the device 1805 to perform various aspects of v2f distribution matching for PCS in wireless communications as described herein, or the processor 1840 and the memory 1830 may be otherwise configured to perform or support such operations.

Figure 19:
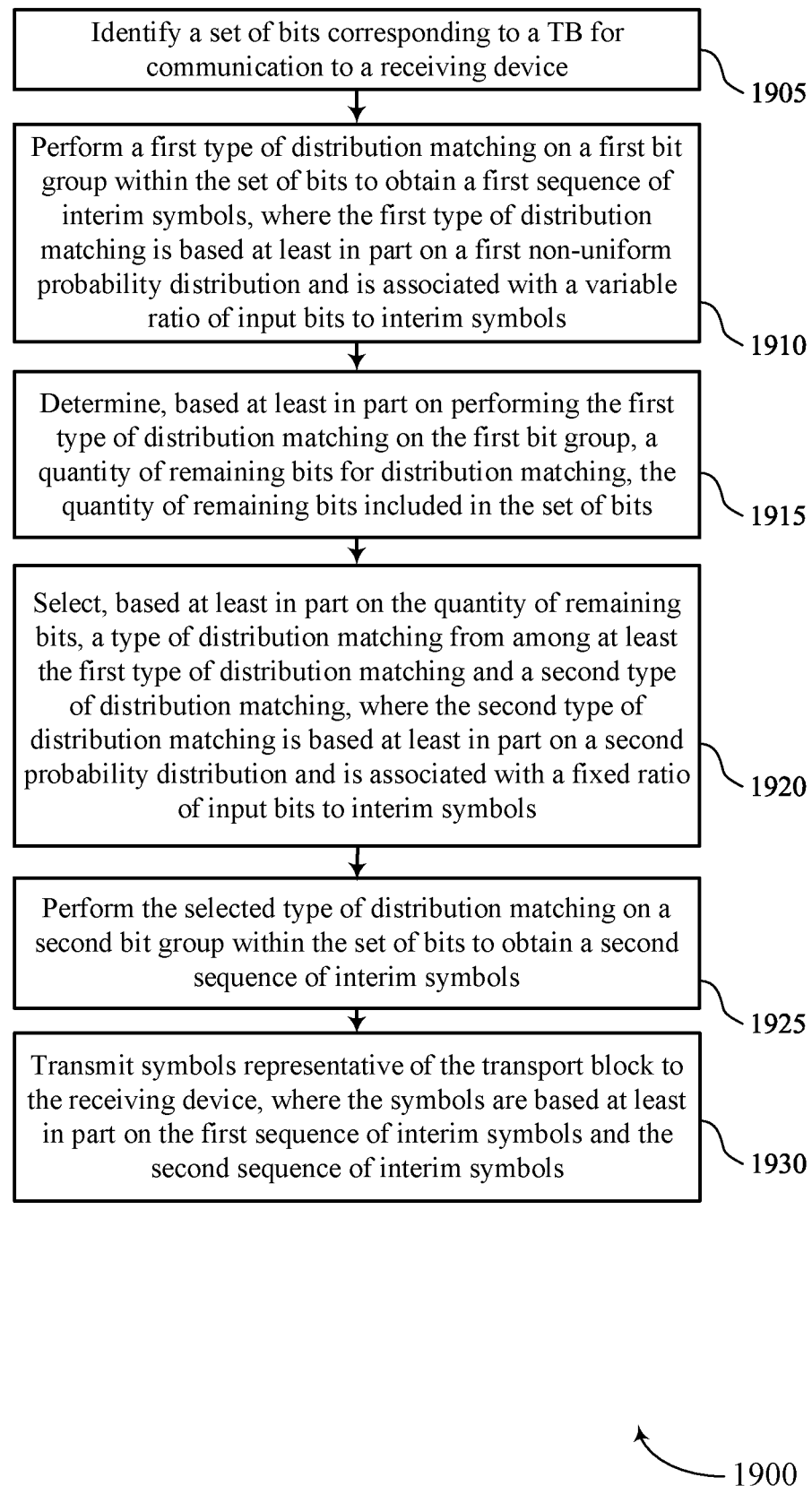
FIGS. 19 and 20 show flowcharts illustrating methods that support v2f distribution matching for PCS in wireless communications in accordance with aspects of the present disclosure.

FIG. 19 shows a flowchart illustrating a method 1900 that supports v2f distribution matching for PCS in wireless communications in accordance with aspects of the present disclosure. The operations of the method 1900 may be implemented by a transmitting device or its components as described herein. For example, the operations of the method 1900 may be performed by a transmitting device as described with reference to FIGS. 1 through 14. In some examples, a transmitting device may execute a set of instructions to control the functional elements of the transmitting device to perform the described functions. Additionally or alternatively, the transmitting device may perform aspects of the described functions using special-purpose hardware.

At 1905, the method may include identifying a set of bits corresponding to a TB for communication to a receiving device. The operations of 1905 may be performed in accordance with examples as disclosed herein. In some examples, aspects of the operations of 1905 may be performed by a TB component 1325 as described with reference to FIG. 13. Additionally or alternatively, means for performing 1905 may, but not necessarily, include, for example, antenna 1425, transceiver 1415, communications manager 1420, memory 1430 (including code 1435), processor 1440 and/or bus 1450.

At 1910, the method may include performing a first type of distribution matching on a first bit group within the set of bits to obtain a first sequence of interim symbols, where the first type of distribution matching is based on a first non-uniform probability distribution and is associated with a variable ratio of input bits to interim symbols. The operations of 1910 may be performed in accordance with examples as disclosed herein. In some examples, aspects of the operations of 1910 may be performed by a distribution matching component 1330 as described with reference to FIG. 13. Additionally or alternatively, means for performing 1910 may, but not necessarily, include, for example, antenna 1425, transceiver 1415, communications manager 1420, memory 1430 (including code 1435), processor 1440 and/or bus 1450.

At 1915, the method may include determining, based on performing the first type of distribution matching on the first bit group, a quantity of remaining bits for distribution matching, the quantity of remaining bits included in the set of bits. The operations of 1915 may be performed in accordance with examples as disclosed herein. In some examples, aspects of the operations of 1915 may be performed by a distribution matching component 1330 as described with reference to FIG. 13. Additionally or alternatively, means for performing 1915 may, but not necessarily, include, for example, antenna 1425, transceiver 1415, communications manager 1420, memory 1430 (including code 1435), processor 1440 and/or bus 1450.

At 1920, the method may include selecting, based on the quantity of remaining bits, a type of distribution matching from among at least the first type of distribution matching and a second type of distribution matching, where the second type of distribution matching is based on a second probability distribution and is associated with a fixed ratio of input bits to interim symbols. The operations of 1920 may be performed in accordance with examples as disclosed herein. In some examples, aspects of the operations of 1920 may be performed by a distribution matching component 1330 as described with reference to FIG. 13. Additionally or alternatively, means for performing 1920 may, but not necessarily, include, for example, antenna 1425, transceiver 1415, communications manager 1420, memory 1430 (including code 1435), processor 1440 and/or bus 1450.

At 1925, the method may include performing the selected type of distribution matching on a second bit group within the set of bits to obtain a second sequence of interim symbols. The operations of 1925 may be performed in accordance with examples as disclosed herein. In some examples, aspects of the operations of 1925 may be performed by a distribution matching component 1330 as described with reference to FIG. 13. Additionally or alternatively, means for performing 1925 may, but not necessarily, include, for example, antenna 1425, transceiver 1415, communications manager 1420, memory 1430 (including code 1435), processor 1440 and/or bus 1450.

At 1930, the method may include transmitting symbols representative of the TB to the receiving device, where the symbols are based on the first sequence of interim symbols and the second sequence of interim symbols. The operations of 1930 may be performed in accordance with examples as disclosed herein. In some examples, aspects of the operations of 1930 may be performed by a constellation mapping component 1340 as described with reference to FIG. 13. Additionally or alternatively, means for performing 1930 may, but not necessarily, include, for example, antenna 1425, transceiver 1415, communications manager 1420, memory 1430 (including code 1435), processor 1440 and/or bus 1450.

Figure 20:
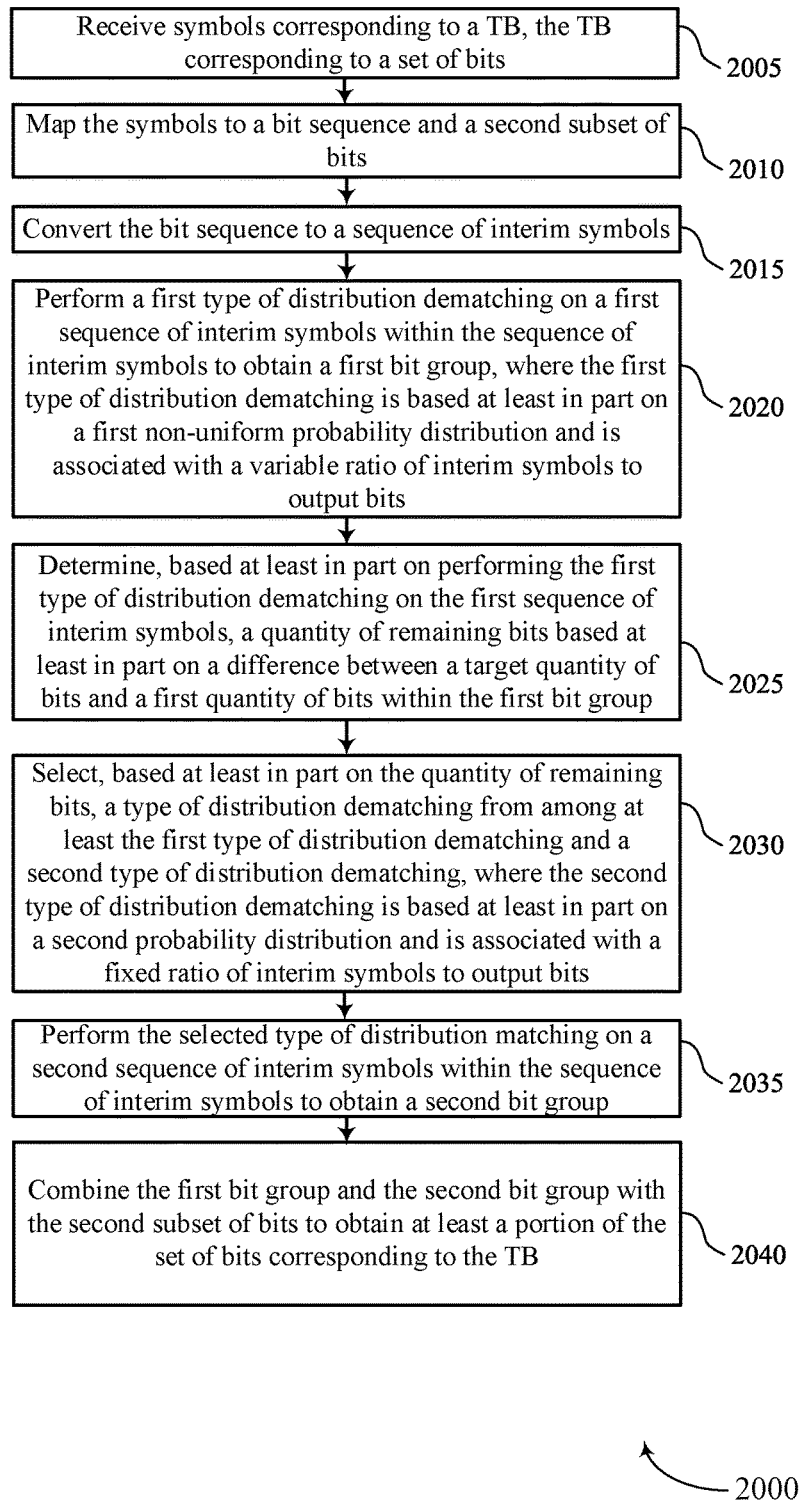

FIG. 20 shows a flowchart illustrating a method 2000 that supports v2f distribution matching for PCS in wireless communications in accordance with aspects of the present disclosure. The operations of the method 2000 may be implemented by a receiving device or its components as described herein. For example, the operations of the method 2000 may be performed by a receiving device as described with reference to FIGS. 1 through 10 and 15 through 18. In some examples, a receiving device may execute a set of instructions to control the functional elements of the receiving device to perform the described functions. Additionally or alternatively, the receiving device may perform aspects of the described functions using special-purpose hardware.

At 2005, the method may include receiving symbols corresponding to a TB, the TB corresponding to a set of bits. The operations of 2005 may be performed in accordance with examples as disclosed herein. In some examples, aspects of the operations of 2005 may be performed by a constellation mapping component 1725 as described with reference to FIG. 17. Additionally or alternatively, means for performing 2105 may, but not necessarily, include, for example, antenna 1825, transceiver 1815, communications manager 1820, memory 1830 (including code 1835), processor 1840 and/or bus 1845.

At 2010, the method may include mapping the symbols to a bit sequence and a second subset of bits. The operations of 2010 may be performed in accordance with examples as disclosed herein. In some examples, aspects of the operations of 2010 may be performed by a constellation mapping component 1725 as described with reference to FIG. 17. Additionally or alternatively, means for performing 2110 may, but not necessarily, include, for example, antenna 1825, transceiver 1815, communications manager 1820, memory 1830 (including code 1835), processor 1840 and/or bus 1845.

At 2015, the method may include converting the bit sequence to a sequence of interim symbols. The operations of 2015 may be performed in accordance with examples as disclosed herein. In some examples, aspects of the operations of 2015 may be performed by a distribution dematching component 1735 as described with reference to FIG. 17. Additionally or alternatively, means for performing 2115 may, but not necessarily, include, for example, antenna 1825, transceiver 1815, communications manager 1820, memory 1830 (including code 1835), processor 1840 and/or bus 1845.

At 2020, the method may include performing a first type of distribution dematching on a first sequence of interim symbols within the sequence of interim symbols to obtain a first bit group, where the first type of distribution dematching is based on a first non-uniform probability distribution and is associated with a variable ratio of interim symbols to output bits. The operations of 2020 may be performed in accordance with examples as disclosed herein. In some examples, aspects of the operations of 2020 may be performed by a distribution dematching component 1735 as described with reference to FIG. 17. Additionally or alternatively, means for performing 2120 may, but not necessarily, include, for example, antenna 1825, transceiver 1815, communications manager 1820, memory 1830 (including code 1835), processor 1840 and/or bus 1845.

At 2025, the method may include determining, based on performing the first type of distribution dematching on the first sequence of interim symbols, a quantity of remaining bits based on a difference between a target quantity of bits and a first quantity of bits within the first bit group. The operations of 2025 may be performed in accordance with examples as disclosed herein. In some examples, aspects of the operations of 2025 may be performed by a distribution dematching component 1735 as described with reference to FIG. 17. Additionally or alternatively, means for performing 2125 may, but not necessarily, include, for example, antenna 1825, transceiver 1815, communications manager 1820, memory 1830 (including code 1835), processor 1840 and/or bus 1845.

At 2030, the method may include selecting, based on the quantity of remaining bits, a type of distribution dematching from among at least the first type of distribution dematching and a second type of distribution dematching, where the second type of distribution dematching is based on a second probability distribution and is associated with a fixed ratio of interim symbols to output bits. The operations of 2030 may be performed in accordance with examples as disclosed herein. In some examples, aspects of the operations of 2030 may be performed by a distribution dematching component 1735 as described with reference to FIG. 17. Additionally or alternatively, means for performing 2130 may, but not necessarily, include, for example, antenna 1825, transceiver 1815, communications manager 1820, memory 1830 (including code 1835), processor 1840 and/or bus 1845.

At 2035, the method may include performing the selected type of distribution matching on a second sequence of interim symbols within the sequence of interim symbols to obtain a second bit group. The operations of 2035 may be performed in accordance with examples as disclosed herein. In some examples, aspects of the operations of 2035 may be performed by a distribution dematching component 1735 as described with reference to FIG. 17. Additionally or alternatively, means for performing 2135 may, but not necessarily, include, for example, antenna 1825, transceiver 1815, communications manager 1820, memory 1830 (including code 1835), processor 1840 and/or bus 1845.

At 2040, the method may include combining the first bit group and the second bit group with the second subset of bits to obtain at least a portion of the set of bits corresponding to the TB. The operations of 2040 may be performed in accordance with examples as disclosed herein. In some examples, aspects of the operations of 2040 may be performed by a TB component 1745 as described with reference to FIG. 17. Additionally or alternatively, means for performing 2140 may, but not necessarily, include, for example, antenna 1825, transceiver 1815, communications manager 1820, memory 1830 (including code 1835), processor 1840 and/or bus 1845.

The following provides an overview of aspects of the present disclosure:

Aspect 1: A method for wireless communications at a transmitting device, comprising: identifying a set of bits corresponding to a transport block for communication to a receiving device; performing a first type of distribution matching on a first bit group within the set of bits to obtain a first sequence of interim symbols, wherein the first type of distribution matching is based at least in part on a first non-uniform probability distribution and is associated with a variable ratio of input bits to interim symbols; determining, based at least in part on performing the first type of distribution matching on the first bit group, a quantity of remaining bits for distribution matching, the quantity of remaining bits included in the set of bits; selecting, based at least in part on the quantity of remaining bits, a type of distribution matching from among at least the first type of distribution matching and a second type of distribution matching, wherein the second type of distribution matching is based at least in part on a second probability distribution and is associated with a fixed ratio of input bits to interim symbols; and performing the selected type of distribution matching on a second bit group within the set of bits to obtain a second sequence of interim symbols; and transmitting symbols representative of the transport block to the receiving device, wherein the symbols are based at least in part on the first sequence of interim symbols and the second sequence of interim symbols.

Aspect 2: The method of aspect 1, further comprising: performing one or more additional distribution matching procedures on respective additional bit groups within the set of bits to obtain additional sequences of interim symbols; and selecting each of the one or more additional distribution matching procedures based at least in part on a respective quantity of remaining bits for distribution matching, wherein selecting each of the one or more additional distribution matching procedures is from among at least the first type of distribution matching and the second type of distribution matching.

Aspect 3: The method of any of aspects 1 through 2, wherein selecting the type of distribution matching comprises: determining whether a condition is satisfied, the condition based at least in part on the quantity of remaining bits, a minimum quantity of input bits associated with the first type of distribution matching, a difference between a quantity of interim symbols obtained after performing the first type of distribution matching and a target quantity of interim symbols, a quantity of interim symbols associated with one iteration of the first type of distribution matching, a modulation order of the interim symbols, or any combination thereof.

Aspect 4: The method of any of aspects 1 through 3, further comprising: determining, after performing the selected type of distribution matching, that a quantity of interim symbols in a set of interim symbols is less than a target quantity of interim symbols, the set of interim symbols comprising the first sequence of interim symbols and the second sequence of interim symbols; and adding one or more additional interim symbols to the set of interim symbols to satisfy the target quantity of interim symbols.

Aspect 5: The method of aspect 4, wherein each of the one or more additional interim symbols comprises a respective instance of a first candidate symbol included in a pool of candidate interim symbols; and the first candidate symbol has a smaller amplitude than each other candidate symbol included in the pool of candidate interim symbols.

Aspect 6: The method of any of aspects 4 through 5, wherein the target quantity of interim symbols is based at least in part on a quantity of resource elements used to transmit the symbols, a quantity of transmission layers used to transmit the symbols, a forward error correction coding rate, or any combination thereof.

Aspect 7: The method of any of aspects 1 through 6, further comprising: dividing the set of bits into a first subset of bits and a second subset of bits, the first subset of bits for distribution matching and comprising the first bit group and the second bit group; generating a bit sequence based at least in part on a sequence of interim symbols corresponding to the first subset of bits, the sequence of interim symbols comprising the first sequence of interim symbols and the second sequence of interim symbols: mapping the bit sequence and the second subset of bits to the symbols based at least in part on a symbol constellation, wherein the symbol constellation is based at least in part on amplitude and sign, and wherein the symbols have amplitudes based at least in part on the bit sequence and signs based at least in part on the second subset of bits.

Aspect 8: The method of aspect 7, further comprising: dividing the bit sequence into a plurality of first code block portions; dividing the second subset of bits into a plurality of second code block portions, wherein a quantity of first code block portions in the plurality of first code block portions is equal to a quantity of second code block portions in the plurality of second code block portions; and generating a set of code blocks for the transport block, wherein each code block of the set of code blocks comprises a respective first code block portion and a respective second code block portion.

Aspect 9: The method of aspect 8, further comprising: performing forward error correction encoding on each code block of the set of code blocks to obtain a set of encoded code blocks, wherein: each encoded code block of the set of encoded code blocks comprises a respective first set of systematic bits corresponding to the respective first code block portion of a corresponding code block, a respective second set of systematic bits corresponding to the respective second code block portion of the corresponding code block, a respective third set of systematic bits corresponding to an error detection code for the corresponding code block, and one or more respective parity bits; and mapping the bit sequence and the second subset of bits to the set of symbols comprises mapping each encoded code block of the set of encoded code blocks to a respective subset of the symbols, symbols within the respective subset of the symbols having: amplitudes based at least in part on the respective first set of systematic bits for the corresponding encoded code block; and signs based at least in part on the respective second set of systematic bits for the corresponding encoded code block, the respective third set of systematic bits for the corresponding encoded code block, the one or more respective parity bits for the corresponding encoded code block, or any combination thereof.

Aspect 10: The method of any of aspects 1 through 9, further comprising: generating an error detection code for the transport block before performing the first type of distribution matching, wherein the error detection code is based at least in part on a portion of the set of bits, and wherein the error detection code is included in the set of bits.

Aspect 11: The method of any of aspects 1 through 9, further comprising: generating an error detection code for the transport block after performing the selected type of distribution matching, wherein the error detection code is based at least in part on a bit sequence that corresponds to a sequence of interim symbols, the sequence of interim symbols comprising the first sequence of interim symbols and the second sequence of interim symbols.

Aspect 12: The method of aspect 11, wherein the symbols have signs based at least in part on one or more bits included in the error detection code for the transport block.

Aspect 13: The method of any of aspects 1 through 12, wherein a quantity of bits in the set of bits is based at least in part on a quantity of resource elements used to transmit the symbols, a quantity of transmission layers used to transmit the symbols, a modulation order for the symbols, a forward error correction coding rate, an average coding rate associated with the first type of distribution matching and the second type of distribution matching, or any combination thereof.

Aspect 14: The method of any of aspects 1 through 13, wherein the second probability distribution comprises a second non-uniform probability distribution.

Aspect 15: The method of any of aspects 1 through 13, wherein the second probability distribution comprises a uniform probability distribution.

Aspect 16: A method for wireless communications at a receiving device, comprising: receiving symbols corresponding to a transport block, the transport block corresponding to a set of bits; mapping the symbols to a bit sequence and a second subset of bits; converting the bit sequence to a sequence of interim symbols; performing a first type of distribution dematching on a first sequence of interim symbols within the sequence of interim symbols to obtain a first bit group, wherein the first type of distribution dematching is based at least in part on a first non-uniform probability distribution and is associated with a variable ratio of interim symbols to output bits; determining, based at least in part on performing the first type of distribution dematching on the first sequence of interim symbols, a quantity of remaining bits based at least in part on a difference between a target quantity of bits and a first quantity of bits within the first bit group; selecting, based at least in part on the quantity of remaining bits, a type of distribution dematching from among at least the first type of distribution dematching and a second type of distribution dematching, wherein the second type of distribution dematching is based at least in part on a second probability distribution and is associated with a fixed ratio of interim symbols to output bits; performing the selected type of distribution matching on a second sequence of interim symbols within the sequence of interim symbols to obtain a second bit group; and combining the first bit group and the second bit group with the second subset of bits to obtain at least a portion of the set of bits corresponding to the transport block.

Aspect 17: The method of aspect 16, further comprising: performing one or more additional distribution dematching procedures on one more additional sequences of interim symbols within the sequence of interim symbols to obtain one or more additional bit groups; and selecting each of the one or more additional distribution dematching procedures based at least in part on a respective quantity of remaining bits, wherein selecting each of the one or more additional distribution dematching procedures is from among at least the first type of distribution dematching and the second type of distribution dematching.

Aspect 18: The method of any of aspects 16 through 17, wherein selecting the type of distribution dematching comprises: determining whether a condition is satisfied, the condition based at least in part on the quantity of remaining bits, a minimum quantity of output bits associated with the first type of distribution dematching, a difference between a quantity of interim symbols within the sequence of interim symbols and a quantity of interim symbols within the first sequence of interim symbols, a quantity of interim symbols associated with one iteration of the first type of distribution dematching, a modulation order of the sequence of interim symbols, or any combination thereof.

Aspect 19: The method of any of aspects 16 through 18, further comprising: determining, after performing the selected type of distribution matching, that a quantity of output bits in a set of output bits satisfies the target quantity of bits, the set of output bits comprising the first bit group and the second bit group; and discarding one or more additional interim symbols within the sequence of interim symbols based at least in part on the quantity of output bits satisfying the target quantity of bits.

Aspect 20: The method of any of aspects 16 through 19, further comprising: combining the first bit group with the second bit group to obtain at least a portion of a first subset of bits, wherein: the first subset of bits is within the set of bits and corresponds to the bit sequence; and combining the first bit group and the second bit group with the second subset of bits comprises combining the first subset of bits with the second subset of bits based at least in part on a bit order for the set of bits.

Aspect 21: The method of any of aspects 16 through 20, wherein the mapping is based at least in part on a symbol constellation that is based at least in part on amplitude and sign; and the symbols have amplitudes based at least in part on the bit sequence and signs based at least in part on the second subset of bits.

Aspect 22: The method of any of aspects 16 through 21, further comprising: checking an error detection code for the transport block after performing the selected type of distribution dematching, wherein the error detection code is included in the set of bits.

Aspect 23: The method of any of aspects 16 through 21, further comprising: checking an error detection code for the transport block before performing the first type of distribution dematching, wherein the symbols have signs based at least in part on the error detection code for the transport block.

Aspect 24: The method of any of aspects 16 through 23, wherein mapping the symbols to the bit sequence and the second subset of bits comprises: dividing the symbols into subsets of symbols each corresponding to a respective code block of a set of code blocks for the transport block; mapping each of the subsets of symbols to bits corresponding to the respective code block of the set of code blocks, wherein each code block of the set of code blocks comprises a respective portion of the bit sequence and a respective portion of the second subset of bits.

Aspect 25: The method of aspect 24, further comprising: performing forward error correction decoding on each encoded code block of a set of encoded code blocks to obtain the set of code blocks, wherein: each encoded code block of the set of encoded code blocks comprises a respective first set of systematic bits corresponding to the respective first code block portion of a corresponding code block, a respective second set of systematic bits corresponding to the respective second code block portion of the corresponding code block, a respective third set of systematic bits corresponding to an error detection code for the corresponding code block, and one or more respective parity bits.

Aspect 26: An apparatus for wireless communications at a transmitting device, comprising a processor; memory coupled with the processor; and instructions stored in the memory and executable by the processor to cause the apparatus to perform a method of any of aspects 1 through 15.

Aspect 27: An apparatus for wireless communications at a transmitting device, comprising at least one means for performing a method of any of aspects 1 through 15.

Aspect 28: A non-transitory computer-readable medium storing code for wireless communications at a transmitting device, the code comprising instructions executable by a processor to perform a method of any of aspects 1 through 15.

Aspect 29: An apparatus for wireless communications at a receiving device, comprising a processor; memory coupled with the processor; and instructions stored in the memory and executable by the processor to cause the apparatus to perform a method of any of aspects 16 through 25.

Aspect 30: An apparatus for wireless communications at a receiving device, comprising at least one means for performing a method of any of aspects 16 through 25.

Aspect 31: A non-transitory computer-readable medium storing code for wireless communications at a receiving device, the code comprising instructions executable by a processor to perform a method of any of aspects 16 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a transmitting device, comprising:
    identifying a set of bits corresponding to a transport block for communication to a receiving device;
    performing a first type of distribution matching on a first bit group within the set of bits to obtain a first sequence of interim symbols, wherein the first type of distribution matching is based at least in part on a first non-uniform probability distribution and is associated with a variable ratio of input bits to interim symbols;
    determining, based at least in part on performing the first type of distribution matching on the first bit group, a quantity of remaining bits for distribution matching, the quantity of remaining bits included in the set of bits;
    selecting, based at least in part on the quantity of remaining bits, a type of distribution matching from among at least the first type of distribution matching and a second type of distribution matching, wherein the second type of distribution matching is based at least in part on a second probability distribution and is associated with a fixed ratio of input bits to interim symbols; and performing the selected type of distribution matching on a second bit group within the set of bits to obtain a second sequence of interim symbols; and transmitting symbols representative of the transport block to the receiving device, wherein the symbols are based at least in part on the first sequence of interim symbols and the second sequence of interim symbols.

2. The method of claim 1, further comprising:
performing one or more additional distribution matching procedures on respective additional bit groups within the set of bits to obtain additional sequences of interim symbols; and selecting each of the one or more additional distribution matching procedures based at least in part on a respective quantity of remaining bits for distribution matching, wherein selecting each of the one or more additional distribution matching procedures is from among at least the first type of distribution matching and the second type of distribution matching.

3. The method of claim 1, wherein selecting the type of distribution matching comprises:
determining whether a condition is satisfied, the condition based at least in part on the quantity of remaining bits, a minimum quantity of input bits associated with the first type of distribution matching, a difference between a quantity of interim symbols obtained after performing the first type of distribution matching and a target quantity of interim symbols, a quantity of interim symbols associated with one iteration of the first type of distribution matching, a modulation order of the interim symbols, or any combination thereof.

4. The method of claim 1, further comprising:
determining, after performing the selected type of distribution matching, that a quantity of interim symbols in a set of interim symbols is less than a target quantity of interim symbols, the set of interim symbols comprising the first sequence of interim symbols and the second sequence of interim symbols; and adding one or more additional interim symbols to the set of interim symbols to satisfy the target quantity of interim symbols.

5. The method of claim 4, wherein:
each of the one or more additional interim symbols comprises a respective instance of a first candidate symbol included in a pool of candidate interim symbols; and the first candidate symbol has a smaller amplitude than each other candidate symbol included in the pool of candidate interim symbols.

6. The method of claim 4, wherein the target quantity of interim symbols is based at least in part on a quantity of resource elements used to transmit the symbols, a quantity of transmission layers used to transmit the symbols, a forward error correction coding rate, or any combination thereof.

7. The method of claim 1, further comprising:
dividing the set of bits into a first subset of bits and a second subset of bits, the first subset of bits for distribution matching and comprising the first bit group and the second bit group;

generating a bit sequence based at least in part on a sequence of interim symbols corresponding to the first subset of bits, the sequence of interim symbols comprising the first sequence of interim symbols and the second sequence of interim symbols:

mapping the bit sequence and the second subset of bits to the symbols based at least in part on a symbol constellation, wherein the symbol constellation is based at least in part on amplitude and sign, and wherein the symbols have amplitudes based at least in part on the bit sequence and signs based at least in part on the second subset of bits.

8. The method of claim 7, further comprising:
dividing the bit sequence into a plurality of first code block portions;

dividing the second subset of bits into a plurality of second code block portions, wherein a quantity of first code block portions in the plurality of first code block portions is equal to a quantity of second code block portions in the plurality of second code block portions; and generating a set of code blocks for the transport block, wherein each code block of the set of code blocks comprises a respective first code block portion and a respective second code block portion.

9. The method of claim 8, further comprising:
performing forward error correction encoding on each code block of the set of code blocks to obtain a set of encoded code blocks, wherein:
each encoded code block of the set of encoded code blocks comprises a respective first set of systematic bits corresponding to the respective first code block portion of a corresponding code block, a respective second set of systematic bits corresponding to the respective second code block portion of the corresponding code block, a respective third set of systematic bits corresponding to an error detection code for the corresponding code block, and one or more respective parity bits; and mapping the bit sequence and the second subset of bits to the set of symbols comprises mapping each encoded code block of the set of encoded code blocks to a respective subset of the symbols, symbols within the respective subset of the symbols having:
amplitudes based at least in part on the respective first set of systematic bits for the corresponding encoded code block; and signs based at least in part on the respective second set of systematic bits for the corresponding encoded code block, the respective third set of systematic bits for the corresponding encoded code block, the one or more respective parity bits for the corresponding encoded code block, or any combination thereof.

10. The method of claim 1, further comprising:
generating an error detection code for the transport block before performing the first type of distribution matching, wherein the error detection code is based at least in part on a portion of the set of bits, and wherein the error detection code is included in the set of bits.

11. The method of claim 1, further comprising:
generating an error detection code for the transport block after performing the selected type of distribution matching, wherein the error detection code is based at least in part on a bit sequence that corresponds to a sequence of interim symbols, the sequence of interim symbols comprising the first sequence of interim symbols and the second sequence of interim symbols.

12. The method of claim 11, wherein the symbols have signs based at least in part on one or more bits included in the error detection code for the transport block.

13. The method of claim 1, wherein a quantity of bits in the set of bits is based at least in part on a quantity of resource elements used to transmit the symbols, a quantity of transmission layers used to transmit the symbols, a modulation order for the symbols, a forward error correction coding rate, an average coding rate associated with the first type of distribution matching and the second type of distribution matching, or any combination thereof.

14. The method of claim 1, wherein the second probability distribution comprises a second non-uniform probability distribution.

15. The method of claim 1, wherein the second probability distribution comprises a uniform probability distribution.

16. A method for wireless communications at a receiving device, comprising:
   receiving symbols corresponding to a transport block, the transport block corresponding to a set of bits;
   mapping the symbols to a bit sequence and a second subset of bits;
   converting the bit sequence to a sequence of interim symbols;
   performing a first type of distribution dematching on a first sequence of interim symbols within the sequence of interim symbols to obtain a first bit group, wherein the first type of distribution dematching is based at least in part on a first non-uniform probability distribution and is associated with a variable ratio of interim symbols to output bits;
   determining, based at least in part on performing the first type of distribution dematching on the first sequence of interim symbols, a quantity of remaining bits based at least in part on a difference between a target quantity of bits and a first quantity of bits within the first bit group;
   selecting, based at least in part on the quantity of remaining bits, a type of distribution dematching from among at least the first type of distribution dematching and a second type of distribution dematching, wherein the second type of distribution dematching is based at least in part on a second probability distribution and is associated with a fixed ratio of interim symbols to output bits;
   performing the selected type of distribution matching on a second sequence of interim symbols within the sequence of interim symbols to obtain a second bit group; and
   combining the first bit group and the second bit group with the second subset of bits to obtain at least a portion of the set of bits corresponding to the transport block.

17. The method of claim 16, further comprising:
   performing one or more additional distribution dematching procedures on one more additional sequences of interim symbols within the sequence of interim symbols to obtain one or more additional bit groups; and
   selecting each of the one or more additional distribution dematching procedures based at least in part on a respective quantity of remaining bits, wherein selecting each of the one or more additional distribution dematching procedures is from among at least the first type of distribution dematching and the second type of distribution dematching.

18. The method of claim 16, wherein selecting the type of distribution dematching comprises:
   determining whether a condition is satisfied, the condition based at least in part on the quantity of remaining bits, a minimum quantity of output bits associated with the first type of distribution dematching, a difference between a quantity of interim symbols within the sequence of interim symbols and a quantity of interim symbols within the first sequence of interim symbols, a quantity of interim symbols associated with one iteration of the first type of distribution dematching, a modulation order of the sequence of interim symbols, or any combination thereof.

19. The method of claim 16, further comprising:
   determining, after performing the selected type of distribution matching, that a quantity of output bits in a set of output bits satisfies the target quantity of bits, the set of output bits comprising the first bit group and the second bit group; and
   discarding one or more additional interim symbols within the sequence of interim symbols based at least in part on the quantity of output bits satisfying the target quantity of bits.

20. The method of claim 16, further comprising:
   combining the first bit group with the second bit group to obtain at least a portion of a first subset of bits, wherein:
      the first subset of bits is within the set of bits and corresponds to the bit sequence; and
      combining the first bit group and the second bit group with the second subset of bits comprises combining the first subset of bits with the second subset of bits based at least in part on a bit order for the set of bits.

21. The method of claim 16, wherein:
   the mapping is based at least in part on a symbol constellation that is based at least in part on amplitude and sign; and
   the symbols have amplitudes based at least in part on the bit sequence and signs based at least in part on the second subset of bits.

22. The method of claim 16, further comprising:
   checking an error detection code for the transport block after performing the selected type of distribution dematching, wherein the error detection code is included in the set of bits.

23. The method of claim 16, further comprising:
   checking an error detection code for the transport block before performing the first type of distribution dematching, wherein the symbols have signs based at least in part on the error detection code for the transport block.

24. The method of claim 16, wherein mapping the symbols to the bit sequence and the second subset of bits comprises:
   dividing the symbols into subsets of symbols each corresponding to a respective code block of a set of code blocks for the transport block;
   mapping each of the subsets of symbols to bits corresponding to the respective code block of the set of code blocks, wherein each code block of the set of code blocks comprises a respective portion of the bit sequence and a respective portion of the second subset of bits.

25. The method of claim 24, further comprising:
   performing forward error correction decoding on each encoded code block of a set of encoded code blocks to obtain the set of code blocks, wherein:
   each encoded code block of the set of encoded code blocks comprises a respective first set of systematic bits corresponding to the respective first code block portion of a corresponding code block, a respective second set of systematic bits corresponding to the respective second code block portion of the corresponding code block, a respective third set of systematic bits corresponding to an error detection code for the corresponding code block, and one or more respective parity bits.

26. An apparatus for wireless communications, comprising:
a processor of a transmitting device;
memory coupled with the processor, the memory and the processor configured to cause the apparatus to:
identify a set of bits corresponding to a transport block for communication to a receiving device;
perform a first type of distribution matching on a first bit group within the set of bits to obtain a first sequence of interim symbols, wherein the first type of distribution matching is based at least in part on a first non-uniform probability distribution and is associated with a variable ratio of input bits to interim symbols;
determine, based at least in part on performing the first type of distribution matching on the first bit group, a quantity of remaining bits for distribution matching, the quantity of remaining bits included in the set of bits;
select, based at least in part on the quantity of remaining bits, a type of distribution matching from among at least the first type of distribution matching and a second type of distribution matching, wherein the second type of distribution matching is based at least in part on a second probability distribution and is associated with a fixed ratio of input bits to interim symbols; and
perform the selected type of distribution matching on a second bit group within the set of bits to obtain a second sequence of interim symbols; and
transmit symbols representative of the transport block to the receiving device, wherein the symbols are based at least in part on the first sequence of interim symbols and the second sequence of interim symbols.

27. The apparatus of claim 26, wherein, to select the type of distribution matching, the memory and the processor are configured to cause the apparatus to:
determine whether a condition is satisfied, the condition based at least in part on the quantity of remaining bits, a minimum quantity of input bits associated with the first type of distribution matching, a difference between a quantity of interim symbols obtained after performing the first type of distribution matching and a target quantity of interim symbols, a quantity of interim symbols associated with one iteration of the first type of distribution matching, a modulation order of the interim symbols, or any combination thereof.

28. The apparatus of claim 26, the memory and the processor further configured to cause the apparatus to:
determine, after performing the selected type of distribution matching, that a quantity of interim symbols in a set of interim symbols is less than a target quantity of interim symbols, the set of interim symbols comprising the first sequence of interim symbols and the second sequence of interim symbols; and
add one or more additional interim symbols to the set of interim symbols to satisfy the target quantity of interim symbols.

29. An apparatus for wireless communications, comprising:
a processor of a receiving device;
memory coupled with the processor, the memory and the processor configured to cause the apparatus to:
receive symbols corresponding to a transport block, the transport block corresponding to a set of bits;
map the symbols to a bit sequence and a second subset of bits;
convert the bit sequence to a sequence of interim symbols;
perform a first type of distribution dematching on a first sequence of interim symbols within the sequence of interim symbols to obtain a first bit group, wherein the first type of distribution dematching is based at least in part on a first non-uniform probability distribution and is associated with a variable ratio of interim symbols to output bits;
determine, based at least in part on performing the first type of distribution dematching on the first sequence of interim symbols, a quantity of remaining bits based at least in part on a difference between a target quantity of bits and a first quantity of bits within the first bit group;
select, based at least in part on the quantity of remaining bits, a type of distribution dematching from among at least the first type of distribution dematching and a second type of distribution dematching, wherein the second type of distribution dematching is based at least in part on a second probability distribution and is associated with a fixed ratio of interim symbols to output bits;
perform the selected type of distribution matching on a second sequence of interim symbols within the sequence of interim symbols to obtain a second bit group; and
combine the first bit group and the second bit group with the second subset of bits to obtain at least a portion of the set of bits corresponding to the transport block.

30. The apparatus of claim 29, wherein, to select the type of distribution dematching, the memory and the processor are configured to cause the apparatus to:
determine whether a condition is satisfied, the condition based at least in part on the quantity of remaining bits, a minimum quantity of output bits associated with the first type of distribution dematching, a difference between a quantity of interim symbols within the sequence of interim symbols and a quantity of interim symbols within the first sequence of interim symbols, a quantity of interim symbols associated with one iteration of the first type of distribution dematching, a modulation order of the sequence of interim symbols, or any combination thereof.

* * * * *